United States Patent [19]

Drakul et al.

[11] Patent Number: 5,583,892
[45] Date of Patent: Dec. 10, 1996

[54] METHOD AND SYSTEM FOR PERFORMING TRANSMISSION OF DIGITAL DATA BY CODING BIT INFORMATION INTO THE SHAPE OF A PULSE AND DECODING THE BIT INFORMATION FROM THE SHAPE OF THE PULSE

[75] Inventors: Spase Drakul, Ljubljana, Slovenia; Ezio Biglieri, Turin, Italy

[73] Assignee: Vasko Drakul, Brønshøj, Denmark

[21] Appl. No.: 184,064

[22] Filed: Jan. 21, 1994

[30] Foreign Application Priority Data

Jan. 21, 1993 [SI] Slovenia .................................. 9300025

[51] Int. Cl.$^6$ .............................. H03K 7/02; H03K 9/02
[52] U.S. Cl. ........................... 375/353; 375/242; 341/179
[58] Field of Search .................................... 375/286, 289, 375/290, 293, 353, 242, 261, 263, 264, 279, 280, 281, 308, 331, 332; 370/19–21; 341/179

[56] References Cited

U.S. PATENT DOCUMENTS

| | | | |
|---|---|---|---|
| 3,847,732 | 11/1974 | Perreault .................................. | 375/22 |
| 4,135,057 | 1/1979 | Bayless, Sr. et al. . | |
| 4,204,163 | 5/1980 | de Jager .................................... | 375/25 |
| 4,680,777 | 7/1987 | Saha . | |
| 4,730,344 | 3/1988 | Saha ......................................... | 375/86 |
| 4,967,164 | 10/1990 | Sari . | |
| 5,105,446 | 4/1992 | Ravoalavoson et al. . | |
| 5,107,520 | 4/1992 | Karam et al. . | |
| 5,230,008 | 7/1993 | Duch et al. ............................... | 375/19 |

FOREIGN PATENT DOCUMENTS

| | | |
|---|---|---|
| 0518835 | 5/1992 | European Pat. Off. . |
| 0530912 | 9/1992 | European Pat. Off. . |
| 628993 | 3/1988 | Germany . |
| 2096424 | 3/1982 | United Kingdom . |
| 15558 | 8/1993 | WIPO . |

OTHER PUBLICATIONS

"Principles of Communication Engineering". Wozencraft et al 1965, pp. 223–245, fig. 4.12 & 4.16, John Wiley & Sons, Inc.
Shannon, "A Mathematical Theory Of Communication", Bell Syst. Tech. J., vol. 27, pp. 5–83 (1948).
Shannon, "Communication in the Presence of Noise", Proc. IRE, 37, No. 1 (10–21 Jan. 1949) pp. 160–173.
Proakis, "Digital Communications", McGraw–Hill, New York (1989) p. 286.
Williams et al., "The Theory of Error–Correcting Codes", North–Holland Publishing Company, Amsterdam (1977) pp. 26–35.
Viterbi et al., "Principles of Digital Communication and Coding", McGraw–Hill, New York (1979) pp. 46–75.
Blahut, "Digital Transmission of Information", Addison–Wesley (1990) pp. 188–267.

(List continued on next page.)

Primary Examiner—Stephen Chin
Assistant Examiner—Don Vo

[57] ABSTRACT

Digital information is transmitted by generating coded signals in the form of pulses on the basis of binary digital information and decoding the coded signals into the binary digital information, the pulses being coded in the time domain and being of at least two distinctly different shapes with respect to their numerical amplitude variation along the time axis of the pulses, the pulses comprising two bits of information in each pulse having energy one, but coded in the way that one bit of information is in the polarity and one bit in the shape, or two bits are in the shape. Communications systems utilizing the coding design combine the advantageous properties of the systems of the power-limited region and the systems of the bandwidth-limited region, in other words, the technique of the system which use multiorthogonal signal constellation and the technique of the systems which use multilevel signal constellation are combined into one new class of systems with good power efficiency and good spectral efficiency. Error performance of the new class of systems is very close to the Shannon bound.

81 Claims, 21 Drawing Sheets

OTHER PUBLICATIONS

Drakul et al., "An Eight–Dimensional Signaling Scheme for Bandlimited Channels" presented Jan. 22, 1993 at ISIT '93 in San Antonio.

JS Seo et al., IEEE Trans. on Commun, vol. COM–33, No. 3, Mar. 1985, pp. 296–300.

D. Saha, IEEE Trans. On Commun., vol. 38, No. 4, Apr. 1990, pp. 409–417.

M. Visintin et al., Int. Symp. on Information Theory, ISIT '91, Budapest, p. 3.

Feher et al., International Journal of Satellite Communications, vol. 9, 137–147 (1991).

Drakul et al., "An Eight–Dimensional Signaling Scheme for Bandlimited Channels" published 23–26 May 1993 at a conference in Geneva.

Saha et al., IEEE Transactions on Communications, vol. 37, No. 5, pp. 437–448 (May 1989).

Ungerboeck, IEEE Trans. on Information Theory, vol. IT–28, No. 1, pp. 55–67 (Jan. 1982).

Ungerboeck, IEEE Communication Magazine, vol. 25, No. 2, pp. 5–21 (Feb. 1987).

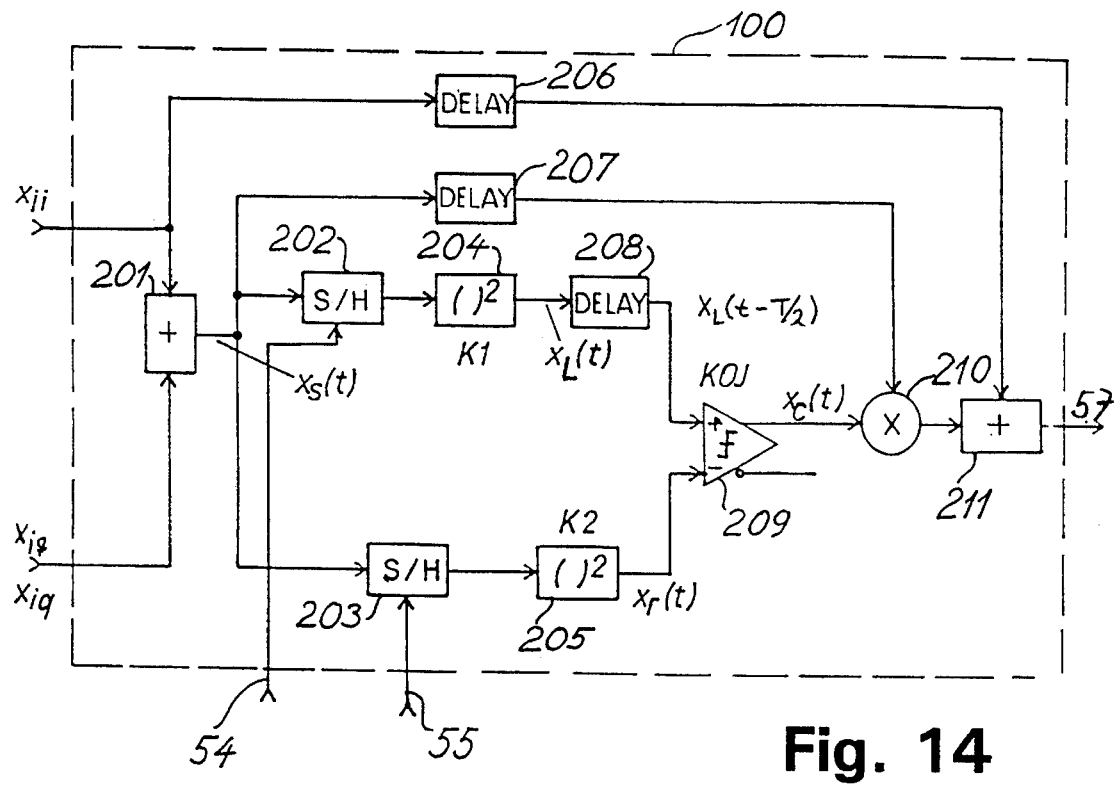
Fig. 14
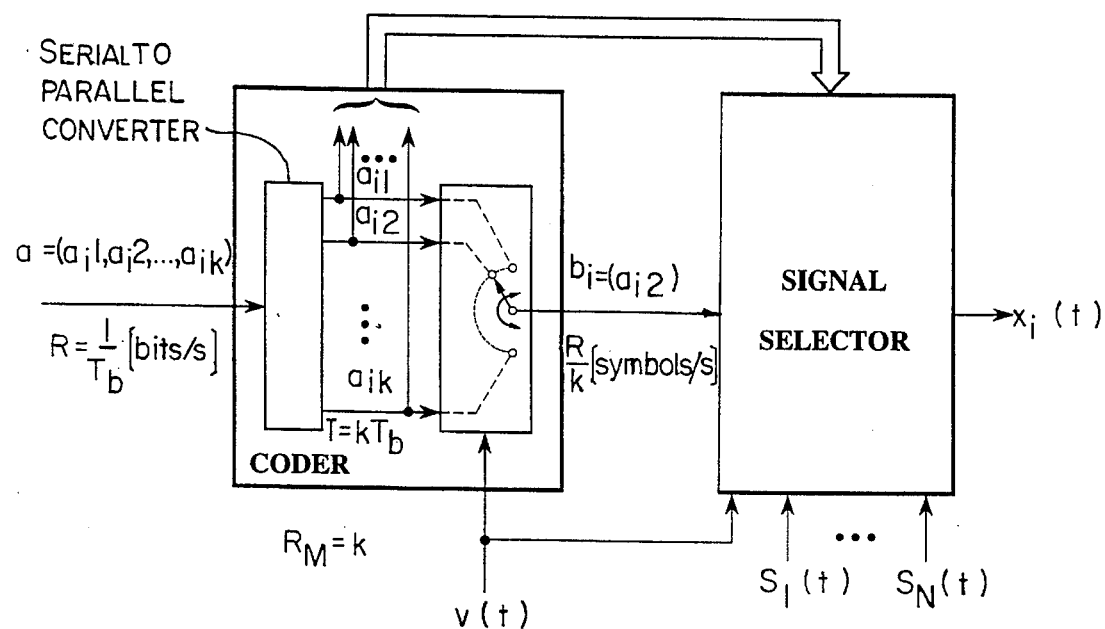
Fig. 19  The signal waveforms of duration $KT_b$ seconds

METHOD AND SYSTEM FOR PERFORMING TRANSMISSION OF DIGITAL DATA BY CODING BIT INFORMATION INTO THE SHAPE OF A PULSE AND DECODING THE BIT INFORMATION FROM THE SHAPE OF THE PULSE

FIELD OF INVENTION

The present invention relates to the field of data transmission, such as digital communication using radio relay systems, modems, optical transmission systems, and to coding techniques, modulation and demodulation. In particular, the invention relates to a method for performing transmission of digital information by generating coded signals in the form of pulses on the basis of binary digital information in the form of one or more input signals and decoding the coded signals into the binary digital information, and to a system for performing the method.

DESCRIPTION OF THE PRIOR ART

The old problem in communication theory and practice is to combine a good power efficiency with a good spectral efficiency when communicating through the additive white Gaussian noise (AWGND channels and other impairments, such as non-linearity and intersymbol interference (ISI). A communication system (S1) using a transmitter and a receiver is said to have a better power efficiency than another system (S2) working at the same information rate if the same error probability is obtained at a lower power output from the transmitter in system S1 than in system S2. A communication system (S1) using a transmitter and a receiver is said to have a better spectral efficiency than another system (S2) working at the same transmitter power and with same error probability if system (S1) permits a higher information rate than the other system (S2). Thus, at a fixed bandwidth in the channel and a fixed error probability, one system (S1) is better than another system (S2) if, for the same capacity in the channel, the system (S1) needs a lower output (transmitter) power. A theoretical description for solution of the problems associated with transmission of information through AWGN channels was given by Claude E. Shannon in 1948 ("A Mathematical Theory of Communication," Bell Syst. Tech. J., vol. 27, 1948, pp. 379–423, 623–657) and in 1949 ("Communication in the Presence of Noise," Proc. IRE, 37, No. 1, 10–21 Jan., 1949). Shannon showed that in the presence of AWGN a channel capacity C (bits/sec) could be calculated so that if the rate of information R (bits/sec) was less than C, the probability of error would approach zero. The equation for C is $$C = W \cdot \log_2[1 + (CE_b)/(WN_0)] \quad \text{(a)}$$

where W is the channel bandwidth (in Hz), $N_O$ is the power spectral density of white Gaussian noise and $E_b$ is average energy per bit. FIG. 1 (which will be discussed in greater detail in the following and which is a version of a diagram shown in the book entitled "Digital Communications," by J. G. Proakis, McGraw-Hill, New York, 1989) shows a comparison of different known modulation methods. From this diagram it appears that there exist two regions in the right side of the Shannon bound (left of which it is not possible to realize any communication system), one region being the Power-Limited region, the other region being the Bandwidth-limited region. The bound between the regions is the ratio C/W=1. In the power-limited region are the systems designed using an N-dimensional orthogonal signal space, which systems are herein called the *Systems with Multi-Orthogonal Signal Constellation* (SMOSC), and in the bandwidth-limited region are the systems designed using a 1-dimensional (1D) or 2-dimensional (2D) signal space, which are herein called the *Systems with Multilevel Signal Constellation* (SMLSC).

The SMOSC systems have good power efficiency, but the price for this is a lower spectral efficiency (the capacity in the channel decreases) which is highly undesirable as modern communication demands necessitates efficient utilization of a given frequency bandwidth. If the number of the basic vectors in the Euclidinn space is increased, then for the same bit error probability the required ratio $E_b/N_0$ (average energy per bit to the power spectral density of white Gaussian noise) is decreased. In this case, also the spectral efficiency is decreased.

The SMLSC systems are characteristic in that for the same bit error probability, if the number of the levels M is increased, then the spectral efficiency is increased, but also the ratio $E_b/N_0$ is increased, which is a disadvantage of this system.

Therefore, the basic problem in the field of digital communication is how to make a digital communication system which has both a good spectral efficiency and a good power efficiency.

The progress of coding techniques and the results which have been obtained can be found in "The Theory of Error-Correcting Codes," by Mac Williams and N. J. A. Sloane, North-Holland Publishing Company, Amsterdam, 1977, "Principles of Digital Communication and Coding," by A. J. Viterbi and J. K. Omura, McGraw-Hill, New York, 1979, and "Digital Transmission of Information," by R. E. Blahut, Addison-Wesley, 1990. In 1982, Gottfried Ungerboeck reported a new coding technique, called TCM (Trellis Coded Modulation), which combines multilevel modulation and coding to achieve coding gain (CG) without bandwidth expansion. More details are included in the paper "Channel Coding with Multilevel/Phase Signals," by G. Ungerboeck, IEEE Trans. on Information Theory, vol. IT-28, no. 1, January 1982, pp 55–67, and "Trellis Coded Modulation with redundant Signal Sets," by G. Ungerboeck, IEEE Communication Magazine, vol. 25, no. 2, February 1987, pp 5–21.

The techniques widely used in practice for improving the error performance of communication systems are block coding and convolutional coding. When k bits are transformed into N output binary symbols, the code rate, $R_c = k/N$, N>k, is a measure of the mount of redundance introduced by the coder. In this manner, coding gain is obtained, but the price is increased bandwidth of the channel. This disadvantage was overcome by Ungerboecks TCM method, but the price is a highly complex receiver.

After Ungerboecks invention, the question remained: Is it possible to obtain coding gain at equal data rate and bandwidth with coding techniques which do not require a complex receiver?

DESCRIPTION OF INVENTION

The present invention answers the question in the affirmative and solves the basic problem of digital communication, in that it combines the good energy performance of the SMOSC with the good spectral efficiency or higher capacity of the SMLSC.

The invention is based on an approach which is different in principle from all known methods for performing transmission of digital information. According to the invention, digital information is coded into the shape of the pulses and is decoded from the shape of the pulses by using detection during the time duration of the pulse, but with properly selected (coded) points inside the time duration. This principle is contrary to the general understanding in the field, as expressed, e.g. by Wozencraft and Jacobs in "Principles of Communication Engineering", John Wiley & Sons, Inc., New York, 1965, page 224: "We shall soon see that the error performance which can be achieved with signal sets generated in this way is completely independent of the actual waveshapes chosen for the {FI(t)}; only the coefficients {$S_{ij}$} and the noise power density $N_0/2$ affect the minimum attainable P(E)." and page 233: "In addition, we now note that the derivation of $P_{-n}$ relies only on the fact that the {$FI_j(t)$} are orthonormal and depends in no way on the specific waveshapes of these functions." This understanding, although relatively old, still dominates the field, such as is also evident from the fact that the only major progress until now was the above-mentioned TCM which gave coding gain for the same information rate and the same bandwidth in the channel, but which introduced a high complexity in the receiver design.

One attempt to utilize available signal space is the method proposed by Debabrata Saha and Theodore G. Birdsall in "Quadrature-Quadrature Phase-Shift Keying, IEEE Trans. on Commun., vol. 37, no. 5, May 1989, pp 437–448, see also U.S. Pat. No. 4,680,777, July 1987. This system is based on design of a vector space with 2 pulses, each of which with energy 1. In this system, decoding of the information in the signal is performed by multiplying the detected signal with the basis function originally used. Therefore, the detection of the QQPSK signal is based on the properties of the SMOSC system.

As will be understood from the following explanation of the method of the invention, the concept of coding digital information into the shape of the pulses makes it possible to use receiver designs which are much simpler than the best designs presently used and at the same time obtain lower probability of error with respect to signal to noise ratio at a given bandwidth.

In its broadest aspect, the invention relates to a method for performing transmission of digital information by generating coded signals in the form of pulses on the basis of binary digital information and decoding the coded signals into the binary digital information, comprising generating pulses of at least two distinctly different shapes, coding in each pulse at least two bits of information, at least one bit of information being coded in the shape of the pulse, and decoding from each pulse the at least two bits of information, the at least one bit of information being decoded from the shape of the pulse.

Before entering into a more detailed explanation of features of the method of the invention, a few definitions will be given:

In the present context, the term "pulse" is used in its normal meaning in the field of digital transmission.

The term "shape" designates any arbitrary time-varying function (which is time-limited or not time-limited) and which, within a given time interval $T_p$, has a distinctly different amplitude level in comparison with the amplitude level outside the interval. Thus, $T_p$ is the duration of the shape function when the shape function is time-limited, or the duration of the part of the function which has a distinctly different amplitude level in comparison with the amplitude level outside the time interval. As will be understood, the identification of the shape of a pulse is suitably performed by observing the amplitude of the pulse along the time axis of the pulse, typically by a minimum number of samplings as indicated above, although it is within the scope to identify the shape of the pulse by other means, e.g. by pattern recognition and computer analysis.

As will be understood from the present description, the number of bits which can be coded into the shape of the pulses is directly related to the number of distinctly different shapes which can be identified in the decoding. It will also be understood from the following discussion that the presently preferred identification method is based on amplitude sampling using a minimum number of samplings suitably chosen along the time axis. This means that a variant which is used in digital communication, that is, the inverse of a pulse or the polarity of a pulse, could be conceived in two ways: as a shape distinct from the shape of which it is the inverse, or as an opposite polarity of one and the same shape. However, when the available collection of shapes comprises only one shape and its inverse (the same shape of opposite polarity), these do per definition not fulfil the criterion: "at least two distinctly different shapes"—and this collection could not be used in the method of the invention. Thus, in the context of the present invention, "two distinctly different shapes" indicates a coding designing two shapes which are distinctly different with respect to their numerical amplitude variation along the time axis of the pulses—and possibly with additional information coded in variation of their polarity along the time axis of the pulses.

When there are two distinctly different shapes, the polarity of the shapes is an obviously useful additional distinguishing parameter which can contain one bit of information, and in most preferred embodiments of the invention, the polarity is utilized in the coding and decoding for containing and delivering one bit of information. In these cases, the inverse shapes (the shapes of opposite polarity) could, from a semantic point of view, be considered shapes in their own right, but this is not in accordance with normal usage in the art. In the present description and claims, polarity is referred to wherever this is possible in the context of the definitions of the invention and in accordance with usage in the art.

On the other hand, as will appear from the following discussion, there are shapes for which it has little meaning to talk about polarity, e.g. the "camel shape" defined below. This shape has a maximum amplitude and a minimum amplitude of the same numerical size, and provided that the above condition is fulfilled- that there are two such shapes which are distinctly different with respect to their numerical amplitude variation along the time axis of the pulse—bit information is directly extractable from these amplitudes—which makes a determination of any polarity superfluous for this shape.

Thus, in one broad aspect, the invention relates to a method for performing transmission of digital information by generating coded signals in the form of pulses on the basis of binary digital information and decoding the coded signals into the binary digital information, comprising generating pulses of at least two distinctly different shapes, coding in each pulse one bit of information in its polarity and further bit information in its shape and decoding from each pulse the one bit information from its polarity and the further bit information from its shape.

As explained above, the decoding of the bit information from the shape of the pulse is normally based on observation of the amplitude of the pulses, e.g. by sampling. To make such sampling as efficient as possible, the shape should be adapted to facilitate sampling in a minimum number of points in the time interval defined by a pulse. For this reason, it is preferred that the shape of each pulse defines at least two different amplitudes which are distinguishable from each other. As will be understood from the following, the case where one bit is coded in the polarity of each pulse and one other bit is coded in the shape of each pulse so that each pulse carries two bits of information is very important embodiment, which means that a very important pulse shape is one in which the shape of each pulse defines two different amplitudes which are distinguishable from each other in the decoding of the pulse.

A preferred embodiment of this is where the shapes of the pulses are so adapted that one shape has a substantially maximum amplitude where mother shape has an amplitude which is substantially zero, as this represents an excellent solution for distinguishing the two shapes from each other in one sampling. A further preferred embodiment is where the shapes of the pulses are so adapted that they have substantially maximum amplitude at the same point, as this permits determination of polarity in one sampling and, combined with the above-mentioned feature of one shaping having a maximum amplitude where another shape has an amplitude which is substantially zero, preferably zero, represents an optimum. This optimum gives a hitherto unattainable bound for bit error probability for multi-orthogonal signal constellation, e.g. in the 8D-4P2C system according to the invention (which will be explained below) in comparison with standard orthogonal signal constellation at the same number of dimensions of basis functions (8), but the 8D-4P2C system has more than twice the capacity of the standard system.

A further improvement, which, for a capacity of 4 bits/s/Hz makes it possible for the invention to reach the Shannon bound, is where there are two different shapes of energy one which are time reverses of each other, where one shape has a substantially maximum where the other shape has a substantially minimum, and the two shapes have a substantially maximum at the same point, because this pair of shapes permit the direct extraction of two bits of information with two sampling values, one where both shapes have substantially maximum, the other one being where one shape has substantially maximum and the other shape has substantially minimum. It will be understood that the direct extraction of two bits of information means that the sample values obtained correspond directly to the coding in the transmitter, without any comparison or calculation between the values: As an example, an amplitude of $+A_0$ measured in point $\tau_{1a}$ and of $+A_0$ measured in point $\tau'_{2a}$ is one shape $\gamma_1$, an amplitude of $+A_0$ measured in point $\tau_{1a}$ and of $-A_0$ measured in point $\tau'_{2a}$ is another shape $\gamma_2$ (preferably time reverse of $\gamma_1$), an amplitude of $-A_0$ measured in point $\tau_{1a}$ and of $-A_0$ measured in point $\tau'_{2a}$ is shape $-\gamma_1$, and an amplitude of $-A_0$ measured in point $\tau_{1a}$ and of $+A_0$ measured in point $\tau'_{2a}$ is shape $-\gamma_2$. This will be further described in connection with FIG. 3.

In the preferred embodiments of the invention, the pulses are normalized to energy one. It is one of the remarkable advantages of the invention that the highest degree of reliability of information transmission can be obtained on the basis of pulses of different pulse shape, comprising two bits of information in each pulse having energy one, but coded in the way that one bit of information is in the polarity and one bit in the shape, or two bits are in the shape, which is equivalent to the sum of two orthogonal pulses in the known art, each of which with energy one, which in the known art would mean energy two.

Each pulse will normally be so constructed that k begins or ends with an amplitude of zero or substantially zero and preferably both begins and ends with an amplitude of zero or substantially zero; this kind of shape will assist in keeping the power spectrum density of the pulse as narrow as possible. It is also an advantage with respect to keeping a narrow power spectrum density that two shapes are so adapted that they constitute each others time reverse, as time-reversed pulses do not change the power spectrum.

Suitable functions from which the pulse shapes can be constructed are sine- and/or cosine-like functions, as these functions give lower side lobes of the power density spectrum of the pulses. As will be explained in the following, each pulse may be obtained, e.g., by addition or subtraction of sine- and/or cosine-like functions. Thus, in one preferred embodiment which is explained in detail in the following, each pulse is obtained by addition or subtraction of a sine- and a cosine-like function, the frequency of one function being substantially twice that of the other function. The sine and cosine-like functions are suitable a sine- and a cosine-function proper.

In addition to construction from the above-mentioned functions which are conventionally used in digital transmission systems, the shapes of the pulses may also be synthesized in any desired shape, e.g. by means of gate area logics.

In the preferred embodiments which will be illustrated in detail in the following and which are presently preferred embodiments, the time point of sampling is the same time point within the (identical) time durations of the two shapes. A simple way to obtain such pattern is to use two shapes of which one is a time reverse of the other one, as only such sets of differently shaped pulses will give exactly the same spectrum, without, however, the time reverse of the first shape having to be of the same energy to ensure the same spectrum.

One kind of shape which is highly preferred according to the present invention is a shape with energy one which has at least one maximum and at least one zero value inside the time duration of the pulse, $T_p$, and in the present context, the term "basic shape" designates any such shape with energy one which has at least one maximum and one zero value inside the time duration of the pulse, $T_p$. A kind of shape which is the most preferred shape according to the present invention is a shape with energy one which has at least one maximum and at least one minimum value of substantially the same amplitude inside the time duration of the pulse, $T_p$, and where the shape and its time reverse have a maximum (again of substantially the same amplitude) at the same point, and in the present context, the term "camel shape" designates any such shape with energy one, this term being used to indicate the extreme value of the shape which resides in the fact that it permits the direct conversion of two samples obtained from the shape in different time instances into information bits, and thus permits reaching very close to the Shannon bound.

If two shapes have the same number of maximum, the same number of minimum and the same number of zero in the time interval $T_p$, the two shapes are said to be of the same type. Among pulse shapes of one and the same type, it preferred to generate a pulse shape which for fixed energy one have maximum amplitude and maximum difference between the point of time where they have maximum amplitude and a point of time where they have amplitude zero, and to use, as another pulse shape, the time reverse thereof. All pulse shapes which fulfill the above criteria with respect to maximum amplitude and zero amplitude will result in the same probability of error using the decoding principles disclosed herein.

In the embodiments of the invention which are presently believed to be the most important, two will be a sufficient and preferred number of different amplitudes permitting the construction of a large number of suitable pulse shapes with the same error performance. Thus, in the camel shape, the two amplitudes are +A and −A which are very easy to optimize according to the requirement that the energy of the pulse should be one (the distance between the maximum and the minimum should be as large as possible, and the distance between the two crossing point between maximum and minimum for a shape and its time reverse should be as large as possible).

As mentioned above, the method and systems of the invention are useful in radio relay systems, modems, and optical transmission systems. One particular field in which the invention will be extremely advantageous is data transmission using modems, such as computer networks and optical networks, as this is a field in which the attainment of the highest possible capacity is crucial.

In the method of the invention, each pulse is generated by converting a set of k bits from one or more input signals into a pulse having a polarity corresponding to the information of one bit of the set and having one shape out of at least k possible shapes which corresponds to the information of the other k−1 bits of the set of k bits. To increase the spectral efficiency, it is preferred, especially for modem and radio transmission, that before being transformed into the pulses, each set of the k bits are converted into k pulses having a duration time of substantially k times the time duration of the information bits in the one or more input signals.

As mentioned above, the most important cases are believed to be where k is 2. The conversion may suitably be performed by transforming a couple of two bits with two even functions into two pulses, transforming the two resulting pulses with two orthogonal functions into two orthogonal pulses and subsequently adding or subtracting the two orthogonal pulses to form a final pulse. The two even functions are preferably substantially identical, and examples of very useful orthogonal functions are a sine- and a cosine-like function, respectively, in particular a sine and a cosine function, respectively.

The orthogonal pulses suitably have at least twice the bit duration of the information bits when the information bits are input in one input signal and at least one bit duration when the information bits are input in two input signals.

The conversion is normally performed by converting one bit of each couple of bits into a pulse with at least twice the bit duration of the information bits when the information bits are input in one signal and at least one bit duration when the information bits are input in two input signals and having a polarity corresponding to the information of that bit and a shape corresponding to the information of the other bit of the couple.

As will be understood, additional information may be coded into the shape of each pulse by generating a higher number of different shapes. However, a preferred method of coding additional bit information in the shape of each pulse, in particular for modem communication, such as computer networks, is by generating pulses of additional shapes corresponding to the basic shapes of energy one, each of which additional shapes differs by at least one amplitude level from the amplitude level of its corresponding basic shape, and the additional bit information is decoded from each shape. As an example of this, one additional bit information may be coded in the shape of each pulse by generating pulses of additional shapes corresponding to the basic shapes of energy one, each of which additional shapes differs by one amplitude level from the amplitude level of its corresponding basic shape, and the additional one bit information may be decoded from each shape. When one additional bit information is coded in the shape, the difference between the amplitude of the basic shape and the amplitude of the additional shape is preferably larger than one, the difference usually being two, and when more than one additional bit information is coded in the shape, the difference between two additional shapes is larger than one, also this difference usually being two. A more detailed explanation of this method of increasing the bit information (or increasing the capacity of the channel) is given below, where a system theoretically transmitting 6 bits/s/Hz is described.

The pulses are normally continuous functions which are produced in various manners as electrical pulses. In optical systems, the electrical pulses are used to control the carrier of the laser diode.

When it is desired to increase the utilization of a given frequency band, m orthogonal carriers are introduced in one system (m is an integer, typically in the range of 1–20). In this case, which is suitable for multicarrier modem systems, an input information of mk bits is converted into m information inputs of each k symbols (k is an integer of at least 2), and each input is transformed into coded pulses in accordance with the invention, each stream of pulses modulating one carrier signal of a set of m sine- and cosine-like carrier signals, and the m modulated signals are added in the form of a single signal to be transmitted. The signals are preferably so adapted that pairs of sine- and cosine-like signals, respectively, of the m sine- and cosine-like signals are mutually orthogonal, the sine- and cosinelike signals preferably being sine and cosine signals.

In radio relay systems, m is normally 2. It will be understood that it is possible in this case to make two principally different kinds of systems according to the invention, one system being k information bits in k shapes corresponding to one carrier, and normally a second set of k information bits in the same k shapes corresponding to the second carrier, which means transmission of 2k bits/s/Hz in the channel, the other system being k information bits which are divided in two shapes and 2(k−1) amplitude levels per each carrier. In the following, both of these systems are described in detail.

Thus, e.g., an input information of 4 bits is converted into 2 information inputs of each 2 symbols, and each input is transformed into coded pulses, each stream of pulses modulating an orthogonal set of sine- and cosine signals, and the 2 modulated signals are added in the form of a single signal to be transmitted.

While the different possibilities for designing pulse shapes are primarily aimed at establishing shapes which can be easily decoded, they are not necessarily optimized with respect to obtaining a constant envelope of the final signal transmitted. However, a constant envelope of the final signal may be obtained in a number of ways. One interesting and simple way according to the invention is where a nonconstant envelope signal of an output transmitter from which the signal comprising two added modulated signals is transmitted is converted into a constant envelope signal by means of a limiter at the output of the transmitter.

In the method of the invention, the decoding of a pulse comprises identifying its shape and convening information contained in its shape into the corresponding input information bit or bits. The term "identifying its shape" is to be understood in a broad sense; it is only necessary to identify the shape to the extent that the correct bit information is extracted in the decoding.

As explained above, one bit of information is normally decoded from the polarity of the pulse. The conversion of the polarity and the shape of a pulse into the corresponding input information bits may be obtained by comparing the polarity and the shape of the pulse with a predefined relationship between each particular combination of polarity and shape and the corresponding set of values of the information bits. Again, the term "comparing" should be understood in a broad sense; there are several ways in which this establishment of the relationship between the determined shape/polarity information and the corresponding bit information may be performed. As an example, the predefined relationship may be stored in memory in hardware having a number of inputs for inputting information relating to the shape and polarity of the pulses and a number of outputs for outputting information on the bits, the number of inputs and outputs being at least equal to the number of information bits carried in the coded pulse.

The polarity and the shape of each pulse are normally identified by sampling the amplitude of the pulse in a time interval represented by the duration of the pulse. In such case, the sampling is performed at least as many times per time interval as there are bits coded in each pulse, and as the number of samplings should be kept as low as possible, the sampling is preferably performed exactly as many times per time interval as there are bits coded in each pulse.

One way of extracting two bits of information from the polarity/shape of each pulse of energy one is where a first sampling result is obtained at a first point of time and a second sampling result is obtained at a second point of time, the polarity being determined by comparing the first and second samples, and the shape of the pulse being identified by comparing the absolute values of the first and second samples. This is, e.g., a suitable way of processing in the time domain in the one preferred case wherein the coded signal pulses comprises two different shapes being a first and a second shape with each shape having two possible polarities, the two shapes being so adapted that the first shape has a maximum amplitude where the second shape has an amplitude which is substantially zero, and the second shape has a maximum amplitude where the first shape has an amplitude which is substantially zero. In this case, the first sample is obtained at a point in time corresponding to the point in time where the first shape has substantially maximum amplitude, and the second sample is obtained at a point in time corresponding to the point in time where the second shape has substantially maximum value. Then, the polarity is determined as positive when the sum of the first and the second sample values is positive, the polarity is determined as negative when the sum is negative, the shape of the pulse is determined as being the first shape when the absolute value of the second sample is greater that the absolute value of the first sample, and the shape of the pulse is determined as being the second shape when the absolute value of the first sample is greater that the absolute value of the second sample.

An added advantage is obtained when the shapes of the pulses are so adapted that all shapes have substantially maximum amplitude at the same point; in this case, the polarity of each pulse can be determined by a single sampling at that point. An example of this is where the shapes of the pulses are so adapted that all shapes have substantially maximum amplitude at the same point (A) and the shapes of the pulses are so adapted that one shape has a maximum amplitude at a point (B) where the other shape has an amplitude which is substantially zero, and wherein the polarity and the shape are determined on the basis of two samplings, one sampling determining the amplitude in the point (A) where both shapes have substantially maximum amplitude, the other sampling determining the amplitude in the point (B) where one shape has a maximum amplitude at a point where the other shape has an amplitude which is substantially zero, and the polarity is determined from sample (A) and the shape is determined from the absolute values of sample (A) and sample (B). This embodiment gives an additional coding gain of more than 0.5 dB compared to the shapes illustrated in FIG. 5 when the polarity is determined from the sign of sample (A) and the shape is determined from the sign of the difference between the absolute values of sample (A) and sample (B).

The most preferred decoding conditions are obtained when decoding of a pulse is performed by directly converting information contained in its shape into the corresponding input information bits. This is the case where the "camel shape" is used, in other words where the pulses have energy one and the shapes of the pulses are so adapted that all shapes have substantially maximum amplitude at the same point (A) and the shapes of the pulses are furthermore so adapted that one shape has a substantially maximum amplitude at a point (B) where the other shape has a substantially minimum amplitude, and wherein two bits of information are determined on the basis of two samplings, one sampling determining the amplitude in the point (A), and the other sampling determining the amplitude in the point (B), the information from the two samplings directly representing two bits of information. This proposed type of shape and decoding is very easily optimized to give optimum error performance, and it is contemplated that the performance of a system using this type of shape and decoding will come very dose to the Shannon bound.

The invention also relates to a system for performing transmission of digital information by generating coded signals in the form of pulses on the basis of binary digital information of bits and decoding the coded signals into the binary digital information of bits, the system comprising coding means adapted to receive as input sets of at least two bits of information and to generate as output pulses of at least two distinctly different shapes, coding into each pulse at least two bits of information, at least one bit information being coded in the shape of the pulse, transmitter means for transmitting the pulses, receiving means for receiving the transmitted pulses, decoding means adapted to decode from each received pulse two bits of information, at least one bit of information being decoded from the shape of the pulse.

Embodiments and details of the system appear from the claims and the detailed discussion of a number of embodiments of the system given in connection with the figures and a mathematical description of an embodiment of the system.

In the following, a number of applications of the method and system of the invention are briefly discussed.

When the system of the invention is an optical system, in other words where the bit information is first transformed into pulse information which is then used in a standard optical system for modulating a light source, e.g. a system including a laser diode, and the light emitted by the light source is transmitted to and through an optical fibre and is received by a light detector, the output of which is decoded according to the invention, the capacity of the optical system is will be increased, typically by a factor of two where each pulse contains two bits of information. The optical system is typically operated at a rate of information in the range from 140 Mb/s to 20 Gb/s or even higher. Typical rates presently used are in the range of 2.5–20 Gb/s, although somewhat lower rates of 140 to 560 Mb/s or 1.2 Gb/s are also of interest. In all events, the capacity of the system will inherently be doubled when each pulse contains two bits of information in its polarity/shape or its shape. Another advantage is a coding gain is obtained compared to standard optical systems, which means that part of the amplifier stages used in conventional optical links may be omitted.

Another type of optical system is a multi-level optical system wherein multilevel PSK and QAM methods are used for transmitting the information in optical fibers. In these systems a reference carrier is transmitted at a polarization orthogonal to that of the information. In this way, the fluctuations induced by the laser (laser phase noise) and induced in the optical fibre (polarization fluctuations induced by imperfections in the cross section of the fibre such as by bending/pressing thereof) influence both the signal and the reference carrier. At the receiver end, the fluctuations in the reference carrier may be tracked and compensated for in the received signal containing the information, as the reference carrier has been influenced by the same fluctuations as the signal containing the information. Thus, at least part of the fluctuations induced in the system are compensated for. This type of system has a good error performance and may, thus, preferably be used in the future in systems requiring good error performance, such as LAN, MAN networks, high-capacity Frequency Division Multiplexing (FDM) networks and telecommunications. However, the error performance of the system is not the only important feature of optical systems of this type. Also the single channel bandwidth is important as it is limited by the detectors and electronic components used in the systems. This single channel bandwidth defines the maximum information rate that can be obtained with this type of system. At present, the bandwidth of the channel is the capacity limiting factor in this type of system.

This means that the method according to the invention is highly suited for use in this type of system as it may increase capacity of the single optical channel in more than one way: by providing pulses containing at least two bits of information and, thus, joining two channels into a single channel, or even further increasing the capacity by also coding information in the amplitude of the pulses. In addition, it is contemplated that a coding gain of at least 3 dB may be obtained using the coding/decoding principle according to the invention. This means that half the amplifier stages in the present optical links may be omitted in the future. This is especially preferable when manufacturing and positioning the large optical links between the continents, as these amplifier stages should be fitted to the optical links on the sea.

In the case of modem systems, the information is transmitted through lines typically having a signal-to-noise ratio of 28–36 dB and a bandwidth of 2.4–3.2 kHz. Thus, this system is a bandlimited system where, as will be described in the following, the system according to the invention is highly suited. Using the equation for the Shannon bound, the capacity of this type of data transmission in the present state of the art is 9–12 bit/s/Hz, which means that the data rate of the communication should be 20–30 kbits/s. In modem systems, the present maximum limit in the state of the art is 19.2 kb/s, and a new proposal has been made for the next generation of modems (V.fast) operating as high as 24 kb/s. This new generation of modems may e.g. be used for LAN interconnections, videophones and faximile.

It is contemplated that in a modem system based on the present invention, that is, where the data transmission is performed by coding bit information into the shape of the pulses and decoding the bit information therefrom, rates beyond 24 kb/s, such as 30 kb/s, may readily be obtained with about 5 dB gain in performance, because the present invention makes it possible to obtain a spectral efficiency of 8 bits/s/Hz by e.g. coding two bits of information into the shape of a pulse and two bits of information in the amplitude (which may be obtained using 6 different amplitude levels) of the pulses. Using the known QAM method for the same purpose would include providing pulses with 16 different amplitude levels which means that the very complex 256QAM method would be required.

The advantages of the utilization of the present invention in such modems is also illustrated by the fact that if coding gain of e.g. about 5 dB is desired using the 256QAM method, such as will be obtained when using the TCM method in connection with the 256QAM method, at least a 64-stage code is required in the TCM method. This means that the complexity of the corresponding Viterbi decoder will be too high for practical implementation.

On the other hand, using the system and method according to the invention, a coding gain of 5 dB may easily be obtained with a hardware implementation of this high-performance system only requiring attention as to the equalization of the pulses in the receiver, such as is explained above in connection with the coding of additional bit information in distinctly different amplitude levels.

Another type of modulation conventionally performed in modems is multi-carrier modulation (MCM) using a large number of carriers for transmitting the information. The number of carriers used will depend on the bandwidth of the channel and the bandwidth of the signals of the individual carriers. This method is usually used in connection with cellular radios, such as for communication with taxis, frequency-division multiplexed group-bands, and general switched telephone networks (GSTN). One of the advantages of this type of modems in the possibility of baseband processing of the signals to be transmitted and received using e.g. Fast Fourier Transformation (FFT) which may be implemented in the hardware in the receiver. A large number of channels may be realized by implementing a coding/decoding stage according to the invention in conjunction with each carrier. By using, at the same time, a large number of carriers, the spectral efficiency of the system may be increased by at least a factor of 2, as the coding according to the invention codes at least two bits of information in each pulse to be transmitted. In this type of modems, it is usual that the pulses to be transmitted are processed in digital signal processing means. As will be described below, this way of synthesizing the pulses to be transmitted may also be used according to the invention so as to easily generate any preferred pulse shape.

In free space communication, two major goals for manufacturers and developers are reduction of the power consumption of the transmitters (mostly for cost reasons) and increase of the spectral efficiency in order to have a larger number of channels to satisfy the communication requirements of the world. It should be noted that in free space, no wave guides are available to assure freedom from interference between two signals. This means that a large number of channels will interact unless positioned sufficiently far from each other.

Free space communication is, e.g., satellite communication, such as ground-to-satellite, satellite-to-user, etc., digital cellular mobile system, mobile telephones, and ground-to-ground communication, e.g. via digital radio relay systems.

In free space communication, the coding/decoding principle of the present invention readily provides a 5–6 dB gain in performance which permits either a 4 times decrease in the transmitter power and/or a decrease in the requirements to the antenna and receivers, permitting, e.g., that parabolas used may have a considerably smaller radius. In a conventional 16QAM system, a complex equalization of the signal has to be performed to compensate for the degradation introduced by the TWTA (Travelling Wave Tube Amplifier) stage of the transmitter. Furthermore, such a system does not have a constant envelope, which means that the TWTA stage has to be driven at a lower output power compared to the output power made possible when using a system with a constant envelope, such as is readily provided by the present invention. Compared to the conventional 16QAM system, the gain in performance using the present invention is therefore contemplated to be in the order of 10 dB in satellite communication, which is very important from an economic point of view, as a 1–2 dB gain in performance is normally considered to reduce the cost of a single transmission/receiver system by 1 million USD.

For mobile telephone communication, the requirements as to the error performance are modest compared to those of modem communication. Presently, digital telephony over Europe with cellular coverage uses Frequency Division Multiple Access/Time Division Multiple Access and has a bit rate of 45 kbit/s per carrier in a 1.6 GHz band. The currently used systemming the so-called $\pi/4$-PSK modulation method has a spectral efficiency of $\eta=45/30.3=1.48$ bits/s/Hz, where 30.3 kHz is the channel spacing.

In this system, the speech coding rate is 9.6 kbits/s, whereby each radio channel is able to carry four voice channels. To further increase the number of voice channels in the system either the speech coding rate should be decreased or the spectral efficiency of the modulation technique should be increased in order to maintain the channel spacing. Increasing the bit rate to 90 kbit/s provides a possible increase in the spectral efficiency to 3 bits/s/Hz. However, increasing the spectral efficiency usually also increases the $E_b/N_0$ required to obtain a given Bit Error Rate (BER) of $10^{-5}$. Thus, for the $\pi/4$-PSK system, the $E_b/N_0$ should be 8–10 dB at BER of $10^{-5}$.

Using the coding/decoding principle according to the invention, a $E_b/N_0$ of 7.8 at a BER of $10^{-5}$ is obtained for a spectral efficiency of 4 bit/s/Hz. Thus, the required $E_b/N_0$ is smaller for the system according to the invention, and in addition, the spectral efficiency is better (actually twice) than for the presently used system. Thus, using the method and system according to the invention, the capacity of the mobile telephone system may be increased by a factor of at least 3 using simple hardware and using the preferred speech coding rate of 9.6 kbits/s.

Another interesting use of the highly efficient communication system according to the invention is for transmission of information for High Definition TeleVision (HDTV), where advanced modulation and channel coding is required in order to obtain the required error performance of the system.

An improved satellite system proposed in the art for this purpose comprises: forward error-correction coder, a TWTA amplifier, a Viterbi decoder and a forward error-correction decoder. The coder and decoder are used in order to obtain a coding gain of 3–6 dB and the TWTA is used in order to obtain high output powers (near the point of saturation of the amplifier). A system of this type would usually be based on the QPSK method having a spectral efficiency of 2 bits/s/Hz or an 8PSK method having a spectral efficiency of 3 bits/s/Hz. However, modern demands to this type of communication systems are higher than those obtainable by the above system. In order to obtain a spectral efficiency of 4 bits/s/Hz, a 16PSK method or a 16QAM method is required, of which especially the last is very sensitive to non-linear distortion introduced by the TWTA.

Using the method according to the invention, the forward error-correction coder and decoder and the Viterbi detector are superfluous, as coding and decoding according to the invention may be performed using simple hardware to obtain a coding gain of about 5 dB compared to the theoretical Bit Error Rate at $10^{-5}$ of a 16QAM system. In addition, as will be described below, the signal coded according to the invention may be converted to have a constant envelope which means that this signal is optimal for amplification in a TWTA stage. In this case, the coding gain obtained using the method and system according to the invention will be at least 8 dB compared to a 16QAM system using a TWTA stage.

BRIEF DESCRIPTION OF THE DRAWINGS

The invention will now be described in further detail in connection with a mathematical description of an embodiment of a system according to the invention and in connection with the drawing.

FIG. 14 is a block diagram of a corrector according to the invention, FIG. 19 illustrates a preferred embodiment of a modulational coder.

Figure 5:
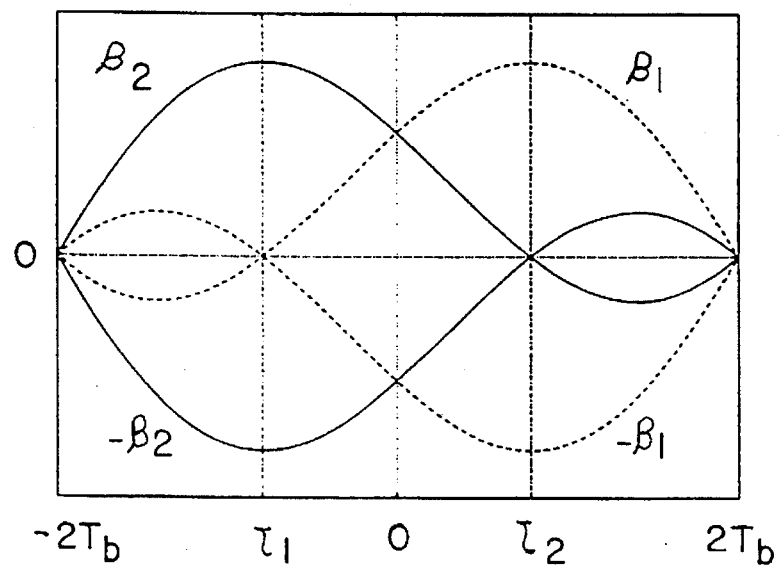
FIG. 5 illustrates an eye pattern of a preferred embodiment of an optimised pulse shape for use in a preferred 8D-4P2C (8 Dimensions, 4 Pulses, 2 Carriers) system.
Figure 10:
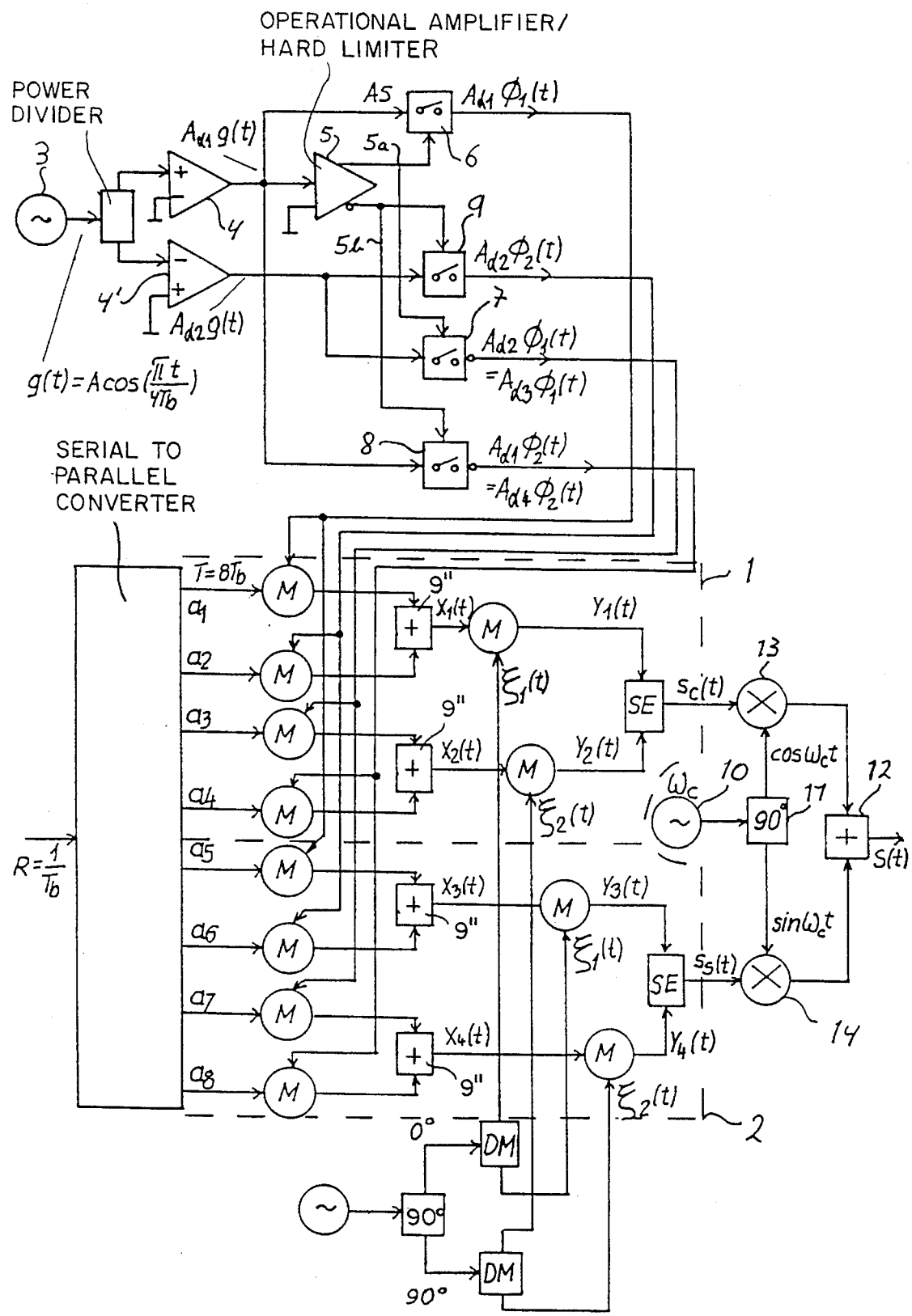
FIG. 10 is a block diagram of a first embodiment of a transmitter according to the invention.

Before entering into a detailed explanation of the physical details and features of the method of the invention and of an apparatus useful in performing the method, a mathematical explanation of the principles of the invention is given, with particular reference to one system according to the invention using pulses of the kind shown in FIG. 5 and to a hardware realization of a transmitter illustrated in FIG. 10.

DETAILED DESCRIPTION OF THE INVENTION

The analysis deals with the very important aspect of the invention constituted by a digital communication system in an N-dimensional vector space for transmission of coded signals over a bandlimited channel.

One of the primary problems encountered in e.g. space communications is the transmission of information or data at as high a rate as possible and with a minimum of errors through a channel perturbed by stationary Gaussian noise. This means that it is desirable to be able to design a transmitter which is able to transmit a maximum number of k bits per channel waveform and to design a receiver which gives an error performance as close as possible to the Shannon limit ($E_b/N_0 = -1.59$ dB). To solve this old problem, the technique which in the present specification is called TVS (Transformation of the Vector Space) is used for the above purpose. Before explaining the TVS technique, some additional information will be given which will help to illustrate the present embodiment of the coding technique according to the invention. The problem of improving a communication system of the above type may be illustrated by the following demands:

1. The transmitter stage is selected from an N-dimensional signal space, which is defined with a set of N orthogonal basis functions, with the following constraints:

that the bandwidth occupation of the signal at the output of the transmitter is convenient for bandlimited channels, that the required signal to noise ratio for a given bit error probability is lower than the bit error probability for SMLSC designs for the transmission of information of k bits per channel waveform, and that the probability of error is close to that of SMOSC designs in an ND signal space or better with additional coding gain CG when the systems are of the same dimension N.

2. In the receiver only a two dimensional space is considered for evaluation of the error performance so as to avoid the complex circuits of the correlation or matched filter receiver. This means that a criterion for minimizing the bit error probability on the basis of the 2D signal constellation diagram obtained as a projection of an N-dimensional signal space oreo a 2D-dimensional space is used.

The present analysis of data transmission systems is based on a model of an N-dimensional vector communication system. One consequence of this model is that all problems are simplified for consideration if a geometric presentation of the signal as vectors in an N-dimensional signal space is used. According to the invention, different types of transmitters may be used, where the output signals of each is a real, continuous function forming a real vector space, whereby each of the output signals is represented in a Euclidean space having a suitably selected dimension. In connection with the present invention, TVS is based on the definition of an N-dimensional vector space by N linearly independent functions $\{\phi_j(j(t))\}$, which are called basis functions. Any arbitrary function in this space is represented by these basis functions. These functions must satisfy the condition for a scalar product $$(\phi_j, \phi_k) = \int_0^T \phi_j(t)\phi_k(t)dt = K_j\delta_{jk}, \qquad (1)$$

$$0 \leq t \leq T, \quad j,k = 1, \ldots, N$$

where $$\delta_{jk} = \begin{cases} 1 & \text{if } j = k \\ 0 & \text{otherwise} \end{cases} \qquad (2)$$

and $\delta_{jk}$ is called Kronecker delta function. When $K_j=1$, the signal space is orthonormal and when this is not the case, the space is orthogonal. The real vector space which is defined with a scalar product is a Euclidean space.

Let X be a vector space with an orthonormal basis $\{\phi_1, \phi_2\}$, let Y be a vector space with an orthogonal basis $\{\alpha_1, \alpha_2, \alpha_3, \alpha_4\}$, and let both the spaces be over a field O. A linear transformation transforms X into two subspaces $Y_1$ and $Y_2$ of Y $$\zeta_1: X \to Y_1, \text{ i.e. } \phi_1 \zeta_1 \phi_1 \text{ and } \phi_2 \to \zeta_1 \phi_2$$

and $$\zeta_2: X \to Y_2, \text{ i.e. } \phi_1 \to \zeta_2\phi_1 \text{ and } \phi_2 \to \zeta_2\phi_2$$

The space Y is obtained as a direct sum of a subspace $Y_1$ with an orthogonal basis $\{\alpha_1, \alpha_2\}$ and a subspace $Y_2$ with an orthogonal basis $\{\alpha_3, \alpha_4\}$. This process is shown on FIG. 2 which graphically represents a mapping from the space X into two orthogonal subspaces suitably selected to design an orthonormal subspace S of dimension 2. Thus, by selecting the subspace S, a decreased dimensionally of the space Y is obtained, which provides the opportunity to design more simple coders and decoders while retaining the error performance of systems using a vector space having the increased dimensionally of the space Y compared to systems using a vector space having the dimensionality of the space X.

In the following, a mathematical explanation is given of how to obtain a design of a digital transmission system in an N-dimensional vector space and how to optimize the error performance of this system. This explanation will illustrate the effect of TVS, and the results will illustrate a method for coding digital information in a manner so as to approach the Shannon bound.

In a preferred embodiment, modulation is performed on the basis of the basis functions of the space X given with equations (3), (4) and (5).

$$\phi_1(t) = \frac{1}{\sqrt{2T_b}} \cos\left(\frac{\pi t}{4T_b}\right) \quad (3)$$

$$\phi_2(t) = \phi_1(t - 4T_b) \quad (4)$$

$$\Pi\left(\frac{t}{4T_b}\right) = \begin{cases} 1 & \text{if } |t| < 2T_b \\ 0 & \text{otherwise} \end{cases} \quad (5)$$

The space X is an orthonormal vector space because of the scalar product $$(\phi_1, \phi_2) = \int_{-2T_b}^{6T_b} \phi_1(t)\phi_2(t)dt = 0 \quad (6)$$

The basis functions of the Euclidean subspace $Y_1$ are obtained by the mapping $\zeta_1: X \to Y_1$, or $$\alpha_1(t) = \zeta_1(t)\phi_1(t) \quad (8)$$

$$\alpha_2(t) = \zeta_1(t)\phi_2(t) \quad (9)$$

and the basis function of the Euclidean subspace $Y_2$ are obtained by the mapping $\zeta_2: X \to Y_2$, or $$\alpha_3(t) = \zeta_2(t)\phi_1(t) \quad (10)$$

$$\alpha_4(t) = \zeta_2(t)\phi_2(t) \quad (11)$$

The mapping functions $\zeta_1(t)$ and $\zeta_2(t)$ are chosen so that the orthonormal space X is mapped into the subspaces $Y_1$ and $Y_2$, which are orthogonal ($Y_1 \perp Y_2$) and form the space Y. The mapping functions $\zeta_1(t)$ and $\zeta_2(t)$ are suitably chosen to be $$\xi_1(t) = \frac{1}{2\sqrt{T_b}} \sin\left(\frac{\pi t}{8T_b}\right) \quad (12)$$

$$\xi_2(t) = \frac{1}{2\sqrt{T_b}} \cos\left(\frac{\pi t}{8T_b}\right) \quad (13)$$

The subspaces $Y_1$ and $Y_2$, which are spanned by basis vectors $\alpha_1, \alpha_2$ and $\alpha_3, \alpha_4$, respectively, of the Euclidean space Y, are orthogonal as each vector in $Y_1$ is orthogonal to each vector in $Y_2$. An arbitrary vector in the space X may be given on the form $$x_i = \sum_{j=1}^{2} a_{ij}\phi_j \quad (14)$$

The vectors $x_i, x_k \in X$ are mapped into the space Y by the mapping functions $\zeta_1$ and $\zeta_2$.

$$y_i = \xi_1 x_i = \sum_{j=1}^{2} a_{ij}\xi_1\phi_j \quad (15)$$

$$y_k = \xi_2 x_k = \sum_{j=1}^{2} a_{kj}\xi_2\phi_j \quad (16)$$

where $a_{ij}, a_{kj}$ are arbitrary scalars. The vector $y_i$ is in the subspace $Y_1$ and the vector $y_k$ is in the subspace $Y_2$, i.e., the vectors $y_i$ and $y_k$ are orthogonal because of the scalar product $$(y_i, y_k) = \int_{-2T_b}^{6T_b} y_i(t)y_k(t)dt = 0 \quad (17)$$

If the value of the scalar $\alpha_{ij}$ is limited to two values $\{+1,-1\}$, there are four possible locations of the vector $x_i$ in the space X. Thus, the coordinates of the vector $x_i$ are ($\alpha_{i1}, \alpha_{i2}$). Therefore, any vector in the space X carries two information values included in its coordinates, which means that the coordinates of four vectors $x_i$, $i=1, \ldots, 4$, contain eight information values: $\alpha_{11}, \alpha_{12}, \alpha_{21}, \alpha_{22}, \alpha_{31}, \alpha_{32}, \alpha_{41}, \alpha_{42}$. These vectors are not linearly independent in the space X. However, as the space X is mapped into the two subspaces $Y_1$ and $Y_2$, which are orthogonal and form the space F of dim Y=4, any two vectors $x_1$ and $x_2$ in X are images in the space Y, i.e., one of these is in the subspace $Y_1$ and the other is in the subspace $Y_2$.

$$y_1 = \zeta_1 x_1 = \zeta_1(\alpha_{11}\phi_1 + \alpha_{12}\phi_2) = \alpha_{11}\alpha_1 + \alpha_{12}\alpha_2 \quad (18)$$

$$y_2 = \zeta_2 x_2 = \zeta_2(\alpha_{21}\phi_1 + \alpha_{22}\phi_2) = \alpha_{21}\alpha_3 + \alpha_{22}\alpha_4 \quad (19)$$

The sum of these vectors is $$s_c = y_1 + y_2 = \alpha_{11}\alpha_1 + \alpha_{12}\alpha_2 + \alpha_{21}\alpha_3 + \alpha_{22}\alpha_4 \quad (20)$$

The vector $s_c$ is given by the basis vectors of the space Y. In the same way the vectors $$y_3 = \zeta_1 x_3 = \zeta_1(\alpha_{31}\phi_1 + \alpha_{32}\phi_2) = \alpha_{31}\alpha_1 + \alpha_{32}\alpha_2 \quad (21)$$

$$y_4 = \zeta_2 x_4 = \zeta_2(\alpha_{41}\phi_1 + \alpha_{42}\phi_2) = \alpha_{41}\alpha_3 + \alpha_{42}\alpha_4 \quad (22)$$

are formed, and the sum thereof is $$s_s = y_3 + y_4 = \alpha_{31}\alpha_1 + \alpha_{32}\alpha_2 + \alpha_{41}\alpha_3 + \alpha_{42}\alpha_4 \quad (23)$$

The vectors $s_c$ and $s_s$ in the space Y are made orthogonal by introducing two additional orthogonal signals $\cos\omega_c t$ and $\sin\omega_c t$, where $\omega_c \gg 2\pi/T_b$. The vectors $s_c$ and $s_s$ together with these two carrier signals form a new eight-dimensional orthogonal signal space. In this case, the information of eight components $\{\alpha_{11}, \alpha_{12}, \alpha_{21}, \alpha_{22}, \alpha_{31}, \alpha_{32}, \alpha_{41}, \alpha_{42}\}$ is carried in the signal $$s(t) = s_c(t)\cos\omega_c t + s_s(t)\sin107_c t \quad (24)$$

Using the mapping functions $\zeta_1(t)$ and $\zeta_2(t)$ which from the signal space X forms a 4D signal space Y, and using the carrier signals $\cos\omega_c t$ and $\sin\omega_c t$, which extend the space Y, an 8D signal space is formed, which gives the possibility of detection of the four vectors of the space X which carry a total of eight bits of information in their coordinates. On the basis of the above, an 8D-4P2C (8-dimension 4 pulses 2 carriers) transmitter may be designed. A system based on the above theory has the potentional of obtaining a lower probability of error compared to the selected space X, which is a two dimensional signal space.

Thus, from the above a system utilizing an 8 dimensional signal space may be obtained, and due to the use of the subspace S, this system will have an error performance which is better than other systems in an 8 dimensional signal space. However, as described above it is presently preferred that the transmitted pulses have energy one. Thus, as these pulses define the basis functions of the subspace S, the $\beta_1(t)$ and $\beta_2(t)$ functions should be normalized. This normalization may be performed as described in the following, where the basis functions of the subspace S are normalized so that $$\|\alpha_{1n}(t)\| = \left[ A_{\alpha_1}^2 \int_{-2T_b}^{2T_b} \xi_1^2(t)\phi_1^2(t)dt \right]^{1/2} = 0.5817 \quad (25)$$

$$\|\alpha_{2n}(t)\| = \left[ A_{\alpha_2}^2 \int_{2T_b}^{6T_b} \xi_1^2(t)\phi_2^2(t)dt \right]^{1/2} = 0.8134 \quad (26)$$

where $P_{\beta_1}=P_{\beta_2}=P_s$ and $T=4T_b$. Equation (24) with the functions $\beta_1(t)$ and $\beta_2(t)$ gives $$s(t)=[\pm\beta_i(t)\pm\beta_j(t)]\cos\omega_c t+[\pm\beta_k(t)]\sin\omega_c t \quad (34)$$

where i, j, k, l=1, 2 according to Table 1. The functions $\beta_i(t)$ and

TABLE 1

| $\alpha_1$ | $\alpha_2$ | $\alpha_5$ | $\alpha_6$ | $(-2T_b,2T_b)$ | $(2T_b,6T_b)$ | $\alpha_9$ | $\alpha_{10}$ | $\alpha_{13}$ | $\alpha_{14}$ | $(6T_b,10T_b)$ | $(10T_b,14T_b)$ |
|---|---|---|---|---|---|---|---|---|---|---|---|
| 1 | 1 | 1 | 1 | $\beta_1$ | $\beta_2$ | 1 | 1 | 1 | 1 | $-\beta_1$ | $-\beta_2$ |
| 1 | 1 | 1 | −1 | $\beta_1$ | $\beta_1$ | 1 | 1 | 1 | −1 | $-\beta_1$ | $-\beta_1$ |
| 1 | 1 | −1 | 1 | $\beta_1$ | $-\beta_1$ | 1 | 1 | −1 | 1 | $-\beta_1$ | $\beta_1$ |
| 1 | 1 | −1 | −1 | $\beta_1$ | $-\beta_2$ | 1 | 1 | −1 | −1 | $-\beta_1$ | $\beta_2$ |
| 1 | −1 | 1 | 1 | $-\beta_2$ | $\beta_2$ | 1 | −1 | 1 | 1 | $\beta_2$ | $-\beta_2$ |
| 1 | −1 | 1 | −1 | $-\beta_2$ | $\beta_1$ | 1 | −1 | 1 | −1 | $\beta_2$ | $-\beta_1$ |
| 1 | −1 | −1 | 1 | $-\beta_2$ | $-\beta_1$ | 1 | −1 | −1 | 1 | $\beta_2$ | $\beta_1$ |
| 1 | −1 | −1 | −1 | $-\beta_2$ | $-\beta_2$ | 1 | −1 | −1 | −1 | $\beta_2$ | $\beta_2$ |
| −1 | 1 | 1 | 1 | $\beta_2$ | $\beta_2$ | −1 | 1 | 1 | 1 | $-\beta_2$ | $-\beta_2$ |
| −1 | 1 | 1 | −1 | $\beta_2$ | $\beta_1$ | −1 | 1 | 1 | −1 | $-\beta_2$ | $-\beta_1$ |
| −1 | 1 | −1 | 1 | $\beta_2$ | $-\beta_1$ | −1 | 1 | −1 | 1 | $-\beta_2$ | $\beta_1$ |
| −1 | 1 | −1 | −1 | $\beta_2$ | $-\beta_2$ | −1 | 1 | −1 | −1 | $-\beta_2$ | $\beta_2$ |
| −1 | −1 | 1 | 1 | $-\beta_1$ | $\beta_2$ | −1 | −1 | 1 | 1 | $\beta_1$ | $-\beta_2$ |
| −1 | −1 | 1 | −1 | $-\beta_1$ | $\beta_1$ | −1 | −1 | 1 | −1 | $\beta_1$ | $-\beta_1$ |
| −1 | −1 | −1 | 1 | $-\beta_1$ | $-\beta_1$ | −1 | −1 | −1 | 1 | $\beta_1$ | $\beta_1$ |
| −1 | −1 | −1 | −1 | $-\beta_1$ | $-\beta_2$ | −1 | −1 | −1 | −1 | $\beta_1$ | $\beta_2$ |

-continued $$\|\alpha_{3n}(t)\| = \left[ A_{\alpha_3}^2 \int_{-2T_b}^{2T_b} \xi_2^2(t)\phi_1^2(t)dt \right]^{1/2} = 0.8134 \quad (27)$$

$$\|\alpha_{4n}(t)\| = \left[ A_{\alpha_4}^2 \int_{2T_b}^{6T_b} \xi_2^2(t)\phi_2^2(t)dt \right]^{1/2} = 0.5817 \quad (28)$$

where $A_{\alpha_1}$, $A_{\alpha_2}$, $A_{\alpha_3}$, $A_{\alpha_4}$ are the normalization constants. FIG. 4 illustrates the functions $\alpha_1$, $\alpha_2$, $\alpha_3$, $\alpha_4$, $\phi_1$, and $\phi_2$ and that $\beta_1(t)$ and $\beta_2(t)$ may be obtained as the sum of the functions $\alpha_1(t)+\alpha_3(t)$ and $\alpha_2(t)+\alpha_4(t)$, respectively. The scalar product is $$(\beta_1, \beta_2) = \int_{-2T_b}^{6T_b} \beta_1(t)\beta_2(t)dt = 0 \quad (29)$$

$$(\beta_1,\beta_1)=(\beta_2,\beta_2)=1 \quad (30)$$

The power of the functions $\beta_1(t)$ and $\beta_2(t)$ is $$P_{\beta_1} = \frac{1}{4T_b} \int_{-2T_b}^{2T_b} \beta_1^2(t)dt = \frac{1}{4T_b} \quad (31)$$

$$P_{\beta_2} = \frac{1}{4T_b} \int_{2T_b}^{6T_b} \beta_2^2(t)dt = \frac{1}{4T_b} \quad (32)$$

and the signal energy is $$E_{\beta_1}=E_{\beta_2}=P_s T=1 \quad (33)$$

$\beta_k(t)$ are defined in the time interval $\{-2T_b, 2T_b\}$ and the functions $\beta_j(t)$ and $\beta_l(t)$ in the time interval $\{|2T_b, 6T_b|\}$. Outside of these time intervals the functions are zero. The properties of the modulation technique 8D-4P2C, which is highly suited for use in transmission of digital signals over bandlimited channels, will in the following be explained together with some important properties of an 8D Euclidean space.

Figure 1:
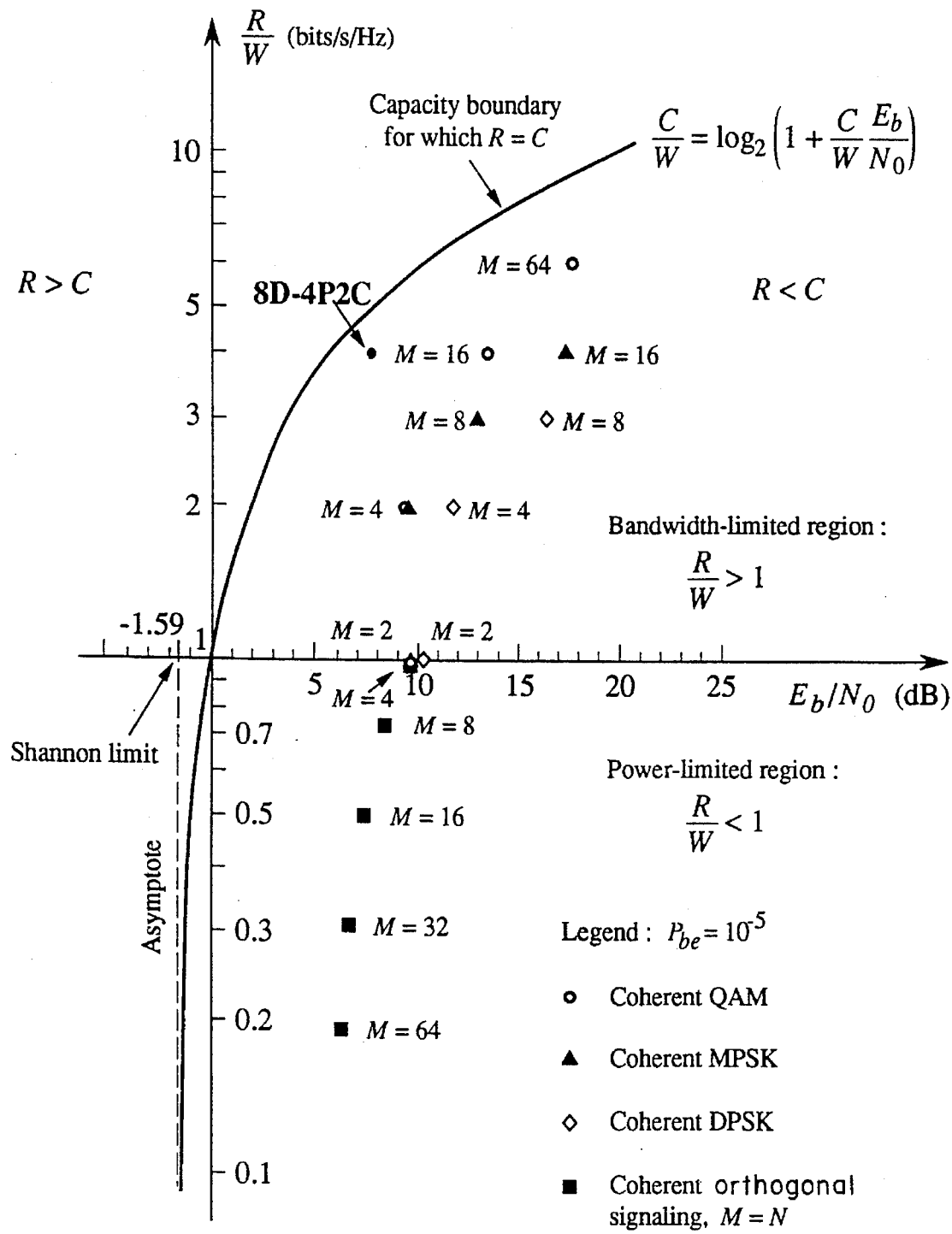
FIG. 1 illustrates the performance of the method according to the invention and of the known methods presently used, compared to the Shannon bound.
Figure 2:
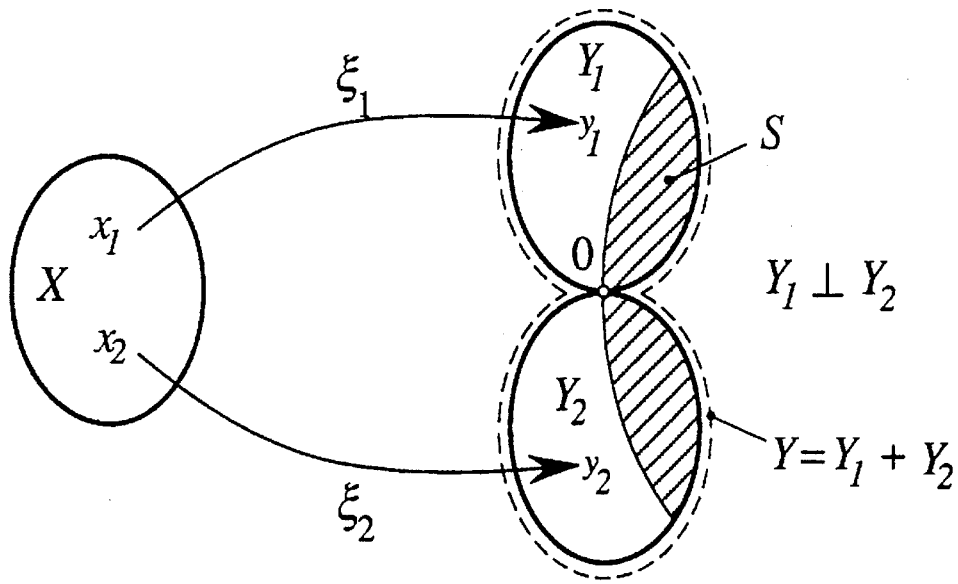
FIG. 2 illustrates the mapping of a space X into a space Y defined by two orthogonal subspaces $Y_1$ and $Y_2$, and a subspace S of Y.

The space X is orthonormal and the subspaces $Y_1$ and $Y_2$ are orthogonal signal subspaces. The space Y, which is obtained as the direct sum of the subspaces $Y_1$ and $Y_2$, is also an orthogonal signal space of dim Y=4. Using the carrier signals $\cos\omega_c t$ and $\sin\omega_c t$, the space Y is extended into an 8D signal space. Inside this space, a 4D orthonormal signal space V exists, which is formed by the subspace S defined by the orthonormal basis functions $\{\psi_1(t), \psi_2(t)\}$ and the carrier signals, respectively, as seen in FIG. 2. The position of this 4D signal space V is coded inside an 8D signal space, because four information symbols are mapped into two symbols in each time interval of $4T_b$. These two mapped symbols are used in the decoder for extraction of the information coded in the pulses.

In the following, a redefinition of the $\beta_1(t)$ and $\beta_2(t)$ functions will be given in order to simplify the below explanations. Thus, new signal spaces defined by the new basis functions $\psi_1(t)$ and $\psi_2(t)$ are considered. If the following presentation of the function $\beta_2(t)=\beta_1(-t)$ is used, which means that two time reversed functions are selected, the following subspaces exist:

$S_1$:  $\psi_1(t) = \beta_1(t)$,         $-2T_b \leq t \leq 2T_b$ $\psi_2(t) = \beta_1(t - 4T_b)$,    $2T_b \leq t \leq 6T_b$ -continued $S_2$: $\psi_1(t) = \beta_2(t),$      $-2T_b \leq t \leq 2T_b$ $\psi_2(t) = \beta_2(t - 4T_b),$      $2T_b \leq t \leq 6T_b$ $S_3$: $\psi_1(t) = \beta_1(t),$      $-2T_b \leq t \leq 2T_b$ $\psi_2(t) = \beta_2(t - 4T_b),$      $2T_b \leq t \leq 6T_b$ $S_4$: $\psi_1(t) = \beta_2(t),$      $-2T_b \leq t \leq 2T_b$ $\psi_2(t) = \beta_1(t - 4T_b),$      $2T_b \leq t \leq 6T_b$ Subspaces $S_5, \ldots, S_8$ are obtained in a similar way, so that they in the time interval $\{|6T_b, 14T_b|\}$ form the functions $\psi_1(t)$ and $\psi_2(t)$ with negative sign. On the basis of Table 1, it is evident that there are four locations of the signals $s_c(t)$ or $s_s(t)$ in each of the subspaces $S_1, \ldots, S_4$. Due to the above, naturally the same applies for the subspaces $S_5, \ldots, S_8$ in the time interval $\{|6T_b, 14T_b|\}$. The space V is a "dynamic" signal space inside an 8D signal space, because it changes its position in each time interval of $8T_b$. The spectral efficiency of SMOSC systems is $$\eta = \frac{R}{W} = \frac{2\log_2 M}{N} \tag{35}$$

where M is the number of signal waveforms in a time interval of $8T_b$ and $N \leq M$ is the rank of the correlation matrix $\rho_{ij}$ and the dimension of the vector space.

$$\rho_{ij} = \frac{1}{E_s} \int_{-2T_b}^{6T_b} \beta_i(t)\beta_j(t)dt \tag{36}$$

where $E_s$ is the signal energy of each waveform $\beta$. In the space V of dim V=4, in an interval of $8T_b$, $M=2^8$ waveforms exist, so that the spectral efficiency $$\eta = 4 \text{ (bits/s/Hz)} \tag{37}$$

so that, in a given time interval of $T=4T_b$, four bits are transmitted in the channel.

The function $\phi_1(t)$ is chosen as an even function; this function contributes to the spectral characteristics of the signal output of the system. If a spectral estimation is made between the signal in the orthogonal space Y and the signal in the orthonormal space V defined by the four orthogonal basis functions with energy one, it is possible to verify that the in-band power spectral density (PSD) function is more compact for the signal obtained in the space Y. How compact the spectrum of this signal is, depends on the functions $\phi_1(t)$, $\zeta_1(t)$, $\zeta_2(t)$ and the constants $A_{\alpha j}$, j=1, 2, 3 and 4. Thus, it is possible to form pulses having energy one and which are able to carry two bits of information. Furthermore, from the above it is clear that a large number of pulses with different shapes still having energy one may carry two bits of information, but with different error probability.

The error probability of a given pulse depends on the detectability of the pulse. The detectability of a pulse is defined by the ability of the detector to recognize the shape of the pulse. In order to simplify the recognition of the pulses, a useful method of obtaining information about the pulse is direct sampling. As the amount of noise introduced in the recognition of the shape of a pulse is increased with increased number of samples, a minimum of samples is preferred in order to reduce this noise and, thus, to decrease the error probability of of the system using this recognition. If two bits of information is coded into a pulse, at least two decisions and, thus, two samplings are required to be able to obtain all the coded information. In the following, an optimization of the pulses is described in order to facilitate recognition of the shape of a pulse using only two samples within the time duration of the pulse.

A suitable choise of pulse shape for a pulse suited for holding one bit of information in its polatity and one bit of information in its shape is a shape which has maximum amplitude in a point in time where the time reverse pulse is zero. An optimization of this type is described in the following.

Since we must discriminate the sign and the type of the β-pulses at the sampling time, we choose our signals so that $\beta_2(t)$ has a maximum while $\beta_1(t)$ is zero. Now, $\beta_1(t)$ is zero at $t=t_0$ where $$\tan v = -q \tag{38}$$

where $$\theta = \frac{\pi t_0}{8T_b} \tag{39}$$

and $$q = \frac{A_{\alpha_2}}{A_{\alpha_1}} \tag{40}$$

Moreover, $\beta_2(t)=-\beta_1(t)$ has a maximum at $t=t_M$, where $t_M$ is the solution of the equation $$\tan^3 v + 5/3 \tan^2 v - 5 \tan v - 1/q = 0 \tag{41}$$

The criterion that $t_0=t_M$ is satisfied when $$q^4 - 10q^2 + 1 = 0 \tag{42}$$

which has two real solutions in the time interval $\{|-2T_b, 2T_b|\}$. One solution provides a maximum of $\beta_2(t)$ while $\beta_1(t)$ is zero:

$$q_1 = -\sqrt{5 - 2\sqrt{6}} \tag{43}$$

which corresponds to the decision time instant $$t_M = \frac{8T_b}{\pi} \arctan\left(-\sqrt{5 - 2\sqrt{6}}\right). \tag{44}$$

Due to Eq. (40), the functions $\beta_1(t)$ and $\beta_2(t)$ can be rescaled without affecting the position of their maxima and zeros. We choose that $\beta_1(t)$ and $\beta_2(t)$ to have unit energy, which implies $$E_{\beta_i} = \int_{-2T_b}^{2T_b} \beta_i^2(t)dt = 1, \quad i=1,2 \tag{45}$$

Thus, the pulses have unit energy, if the constants are $A_{\alpha 1}=A_{\alpha 4}=2.43273$   $A_{\alpha 2}=A_{\alpha 3}=0.77321$ The optimized β-pulses corresponding to this selection of parameters are shown in FIG. 5 wherefrom it is seen that $\beta_2$ has maximum amplitude at $t=\tau_1$ and has zero amplitude $t=\tau_2$. It is furthermore seen that the opposite is the case for $\beta_1$.

Figure 9:
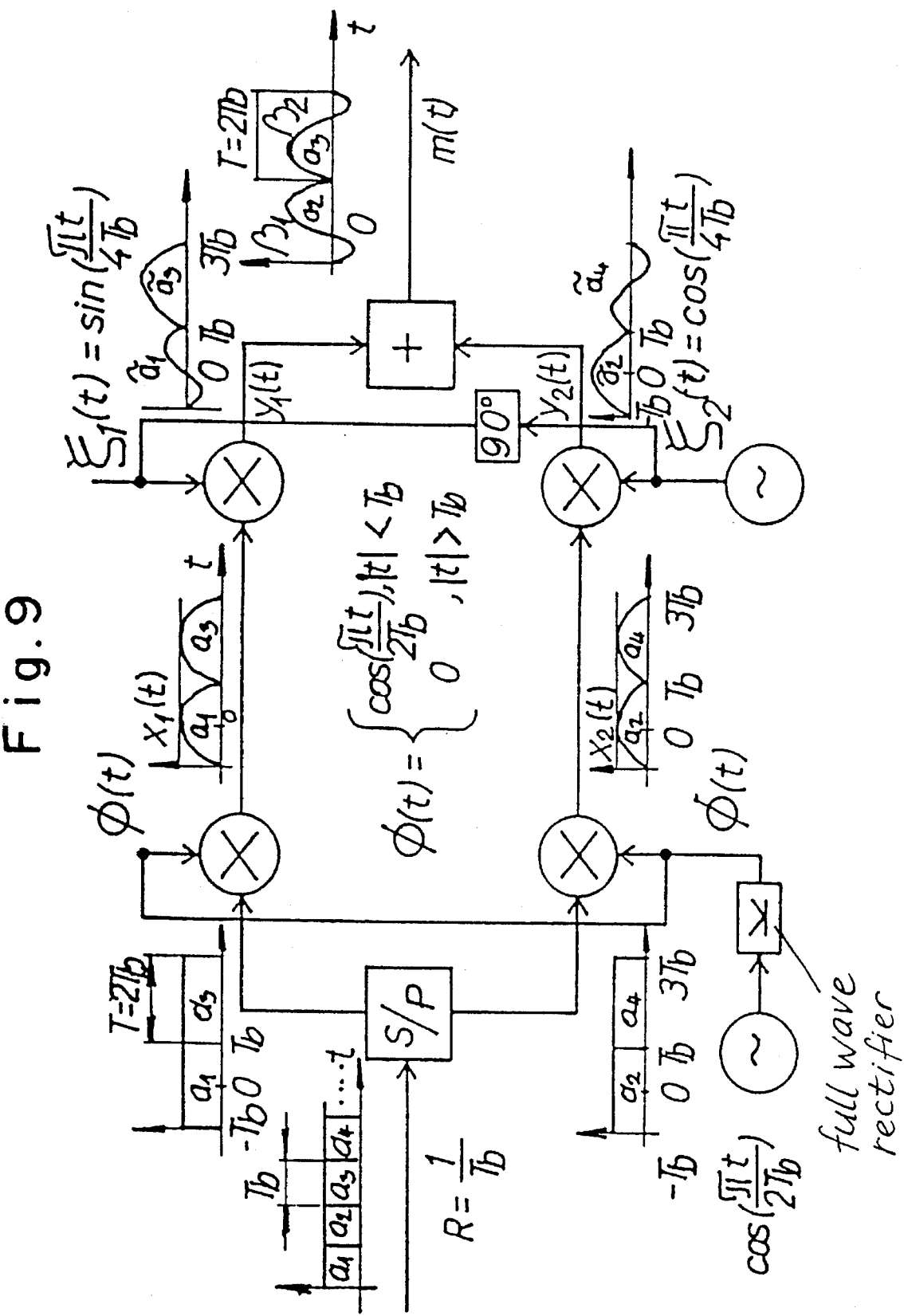
FIG. 9 is a block diagram of a first embodiment of a modulational coder according to the invention.

On the basis of the above-described theory, a very simple design of a modulational coder according to the invention for coding two bits of information into a single pulse carrying two bits of information: one bit of information in the polarity and one bit of information in the shape, may be easily obtained as is evident from FIG. 9. In order to describe the ability the modulational coder of FIG. 9, in the sense of the spectral characteristics of the transmitted signal, in the following a criterion for the selection of the function φ(t) will be given.

$$\phi(t) \neq 0, \quad |t| \leq T_b \quad (46)$$
$$\phi(t) = \phi(-t), \quad |t| \leq T_b$$
$$\phi(t) = 0, \quad |t| > T_b$$

The choise of φ is important as this function mainly defines the spectral characteristics of the transmit.,ed signal. In the present context, the choise is $$\phi(t) = \cos\left(\frac{\pi t}{2T_b}\right) \Pi\left(\frac{t}{2T_b}\right) \quad (47)$$

On the basis of the above function, suitable ζ functions are $$\xi_1(t) = \sin\left(\frac{\pi t}{4T_b}\right) \quad (48)$$

$$\xi_2(t) = \cos\left(\frac{\pi t}{4T_b}\right) \quad (49)$$

The signals $y_1(t)$ and $y_2(t)$ are generated in accordance with formulas (18), (19), (21), and (22) in such a way that the waveforms $\beta_i(t)$ are achieved in each time interval of $2T_b$, and so that it carries two bits of information, one in the polarity and the other in the shape. Due to the selection of waveforms, the transmitted signal has good spectral properties and may e.g. be used to modulate a carrier signal. FIG. 9 illustrates a modulational coder wherein two information symbols are mapped from the input into one symbol having a shape of one of the waveforms $\beta_1(t)$ or $\beta_2(t)$ and a given polarity. The polarity gives one of the information values and the other information value is given by the shape of the waveform.

Now, all necessary information for the explanation of the modulational coder which produces the modulational codes has been given. In the above description, two processes are joined: a coding process, where a mapping of two symbols (in general, k symbols) into one symbol and shaping of the modulation pulse are performed, where the missing symbol (in general, k–1 symbols) is inserted in the type of the waveform. In this manner, waveforms are obtained which have redundancy included in the shape. This is obtained by the coding of k bits into one symbol and the shaping of k symbols with a suitable choise of the shape between k shapes of the transmitted pulse, where the redundancy is included in each shape as the shapes may be distinguished in the detection. Thus, coding and shaping of the pulse are joined into one process. This is evident from FIG. 19.

Figure 12:
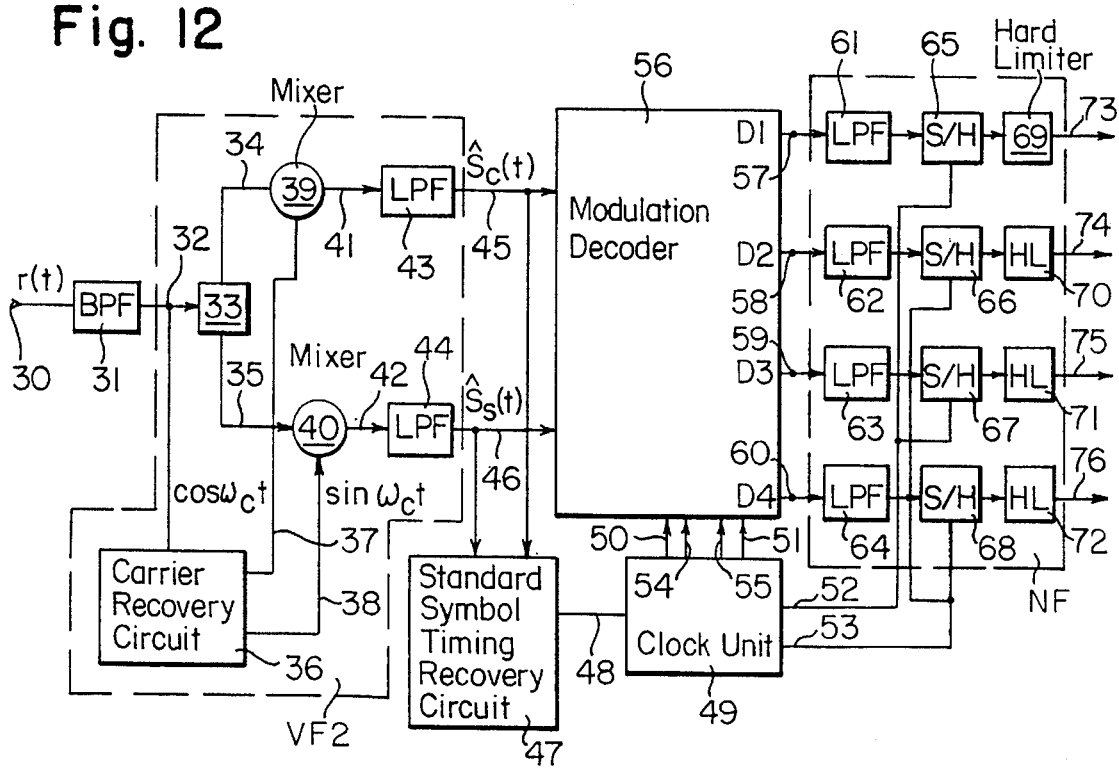
FIG. 12 is a block diagram of a first embodiment of a receiver according to the invention.
Figure 13:
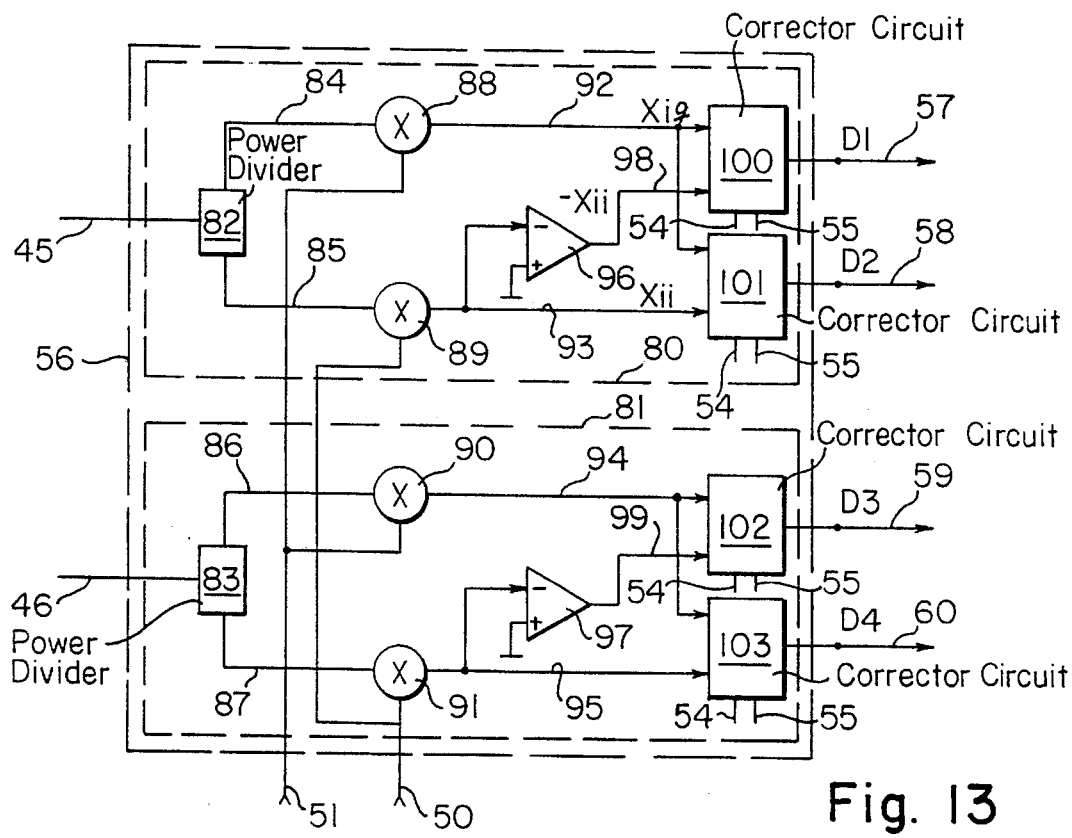
FIG. 13 is a block diagram of a first embodiment of a modulational decoder according to the invention.

For decoding two bits of information, the decoder illustrated in FIG. 13 with correction circuits $C_1$, $C_2$, $C_3$, and $C_4$ as seen in FIG. 14 may be used. The circuit illustrated in FIG. 11 comprises two independent identical or substantially identical circuits of the type illustrated in FIG. 9. The above will be further described in connection with FIGS. 11 and 12.

Figure 11:
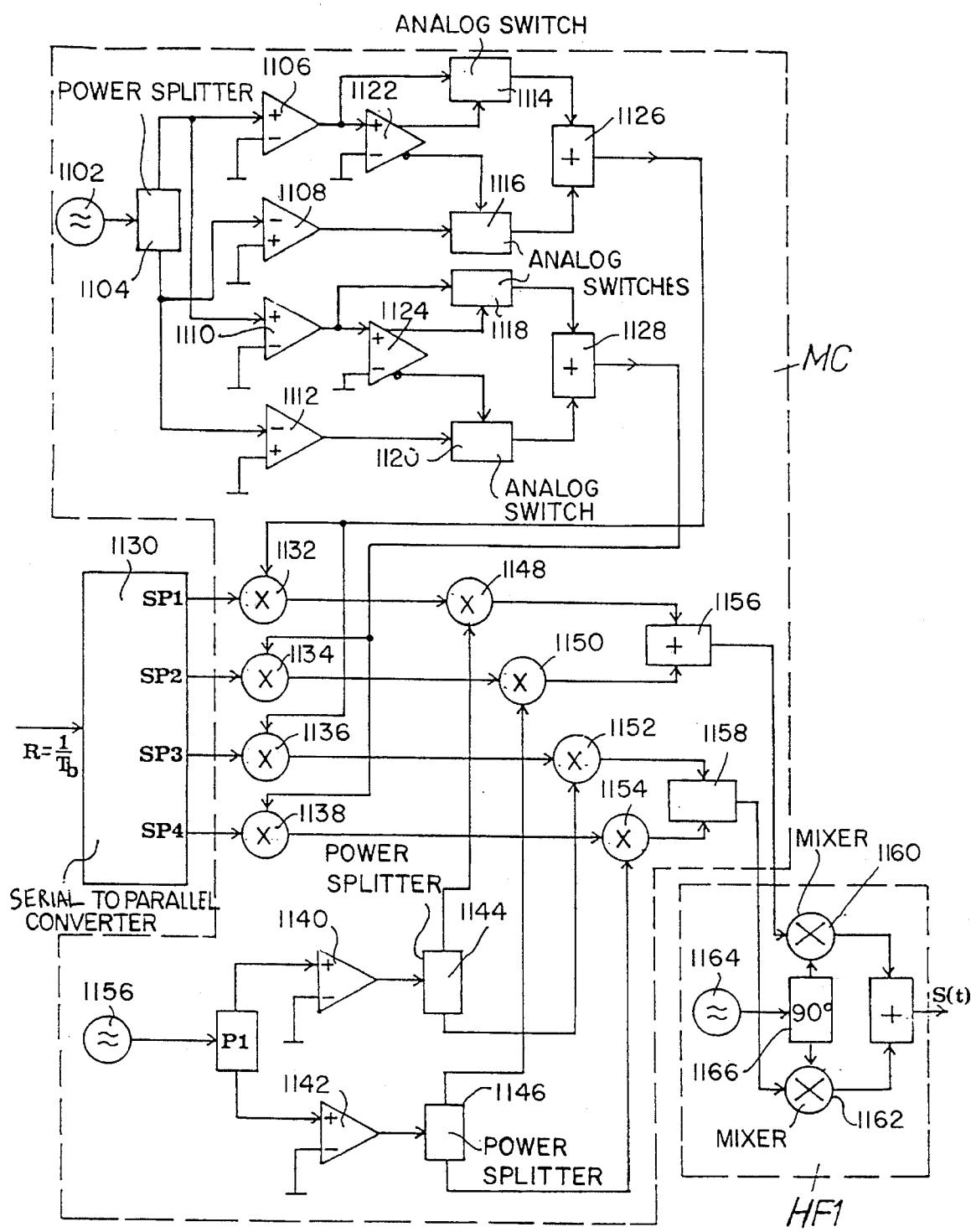
FIG. 11 is a block diagram of a second, presently preferred embodiment of a transmitter according to the invention.

FIGS. 10 and 11 are block diagrams of two similar embodiments of transmitters according to the present invention designed on the basis of the TVS method. In the vector space X of dim X=2, the vectors $x_1$, $x_2$, $x_3$, $x_4$ are firstly formed. After this, these vectors are mapped by the functions $\zeta_1$ and $\zeta_2$ into the vectors $y_1$, $y_2$, $y_3$, $y_4$. The signal vectors $y_1$, $y_3$ are in the space $Y_1$ of dim $Y_1=2$ and $y_2$, $y_4$ are in the space $Y_2$ of dim $Y_2=2$. With the sum of two signal vectors, one of which is in the subspace $Y_1$ and one which is orthogonal to the first and which is in the subspace $Y_2$, the signal vectors $s_c$ and $s_s$, which lie in the subspaces $S_c$ and $S_s$ of dim $S_c$=dim $S_s$=2 are obtained. The subspace $S_c$ is defined with basis $\{\beta_i, \beta_j\}$ and the subspace $S_s$ is with basis $\{\beta_k, \beta_l\}$, where i, j, k, l=1, 2. The subspaces $S_c$ and $S_s$ are 2D Euclidean orthonormal subspaces. From Table 1, it is evident that for each vector with the four components ($\alpha_{11}$, $\alpha_{12}$, $\alpha_{21}$, $\alpha_{22}$), eight locations and eight corresponding antipodal locations which form a total of 16 locations in the subspaces $S_1, \ldots, S_4$ exist. The space $Y_n$ is defined with the basis $\{\alpha_{1n}, \alpha_{2n}, \alpha_{3n}, \alpha_{4n}\}$ which is an orthogonal signal space normalized in such a way that each vector $\beta_i$ has $\|\beta_i\|=1$, i=1, 2. $\beta_i$, i=1, 2 are given by $\{\alpha_{1n}, \alpha_{3n}\}$ and $\{\alpha_{2n}, \alpha_{4n}\}$, respectively, as a consequence of the sum of the vectors $y_1$ and $y_2$ and $y_3$ and $y_4$, respectively. Using the carrier signals $\cos\omega_c t$ and $\sin\omega_c t$, the subspaces $S_c$ and $S_s$ form the orthonormal space V of dim V=4.

For the transmitter thus designed, it is possible to use the complex matched-filter receiver or correlation receiver. In addition to this, the base vectors in an 8D orthogonal signal space have different signal energy. The reasons for designing the nonstandard orthogonal signal space is that this decreases the power spectral density (PSD) of the "sin" components of the basis functions $\alpha_{1n}(t)$ and $\alpha_{4n}(t)$, which decrease the spectrum side lobes of the signal s(t) and that the distance is maximized between the maximum of $\beta_1(t)$ and minimum of $\beta_2(t)$ selected for the sampling instants, as will appear from the description of embodiments of receivers according to the invention.

The signal from the transmitter is the sum of the signals $s_c(t)$ and $s_s(t)$ in the baseband which are multiplied by the corresponding carrier signals according to equation (24), in which $$s_c(t) = A_{\alpha_1}\xi_1(t) \sum_{n=0}^{\infty} a_{8n+1}\phi_1(t-nT) + \quad (50)$$

$$A_{\alpha_2}\xi_1(t) \sum_{n=0}^{\infty} a_{8n+2}\phi_2(t-nT) + A_{\alpha_3}\xi_2(t) \sum_{n=0}^{\infty} a_{8n+3}\phi_1(t-nT) +$$

$$A_{\alpha_4}\xi_2(t) \sum_{n=0}^{\infty} a_{8n+4}\phi_2(t-nT)$$

$$s_s(t) = A_{\alpha_1}\xi_1(t) \sum_{n=0}^{\infty} a_{8n+5}\phi_1(t-nT) + \quad (51)$$

$$A_{\alpha_2}\xi_1(t) \sum_{n=0}^{\infty} a_{8n+6}\phi_2(t-nT) + A_{\alpha_3}\xi_2(t) \sum_{n=0}^{\infty} a_{8n+7}\phi_1(t-nT) +$$

$$A_{\alpha_4}\xi_2(t) \sum_{n=0}^{\infty} a_{8n+8}\phi_2(t-nT)$$

The values of $\alpha_i \in \{-1, +1\}$ and $T=4T_b$. If n=0 and if $\alpha_1, \ldots, \alpha_8=1$ then $$s_c(t)=s_s(t)=\alpha_{1n}\alpha_{2n}+\alpha_{3n}+\alpha_{4n}=\beta_1(t)+\beta_2(t-4T_b) \quad (52)$$

This is one of the possible signal waveforms in a time interval of $8T_b$.

In a preferred transmitter and in a preferred receiver according to the invention, the modulational coder MC and modulational decoder MD are included which make it possible to improve the error performance in comparison with the standard 4D systems. A coding gain CG>1 dB and as high as >5 dB, depending on the actual choise of pulse shape β, is available at $P_{be}=10^{-5}$ compared to a 16QAM (Quadrature Amplitude Modulation) system at the same $P_{be}$ and for the same data rate and channel bandwidth.

Analysis of the system may be performed by introducing a transmitting filter with transfer function $H_T(f)$ to fulfil the requirements for the mask of the spectrum into a model. An equalizing filter $H_E(f)$ was introduced in the receiver followed by a receiving filter $H_R(f)$ which defines the spectral efficiency of the system. The transfer function $H_R(f)$ is suitably chosen to give minimum intersymbol interference, i.e., to minimize the error probability.

For a standard system in an 8D orthonormal space, the spectral efficiency is η=1.5 when two carrier signals are used. A preferred 8D-4P2C system may be designed in such a way that it is formed in the coded orthonormal 4D signal space. Coding of the information of k bits into k shapes gives a pulse duration of $kT_b$, as is also the case for a SMLSC system (e.g. a M-ory $QAM_b$ system) coding k bits of information into $2^k$ amplitudes. Thus, the 8D-4P2C system according to the invention has a spectral efficiency of η=4. Thus, using the modulational coder according to the invention and functioning according to the TVS method, the spectral efficiency of the system is increased from η=1.5 to η=4.

The goal is to use the properties of the SMLSC system in the receiver. The modulation pulses $β_i(t)$ have a time duration of $4T_b$ and carry two information values, one in the polarity and the other in the shape as is evident from Table 1. With this coding technique it is possible in the receiver to obtain both symbol values for each pulse.

A detection strategy may further be made where four amplitude levels ($±c_0, ±3c_0$), where $c_0$ is the properly chosen constant, are used to encode one bit further information. This process is evident from the correction circuit C1 of FIG. 14 and the pertaining text. In this strategy, an original algorithm with the following equations is used.

$$x_l(t) = \{x_s(t)|^{sh}_{t=τ_1+2nT}\}^2 \quad (54)$$

$$x_r(t) = \{x_s(t)|^{sh}_{t=τ_2+2nT}\}^2 \quad (55)$$

$$x_d=x_l(t-T/2)-x_r(t) \quad (56)$$

$$x_c(t)=-sgn\{|x_d(t)|\}-0.5 \quad (57)$$

$$\hat{x}_1(t)=x_c(t)x_s(t-τ_2)+x_{ii}(t-τ_2) \quad (58)$$

where n=0, . . . ∞ and $T=4T_b$, and sgn{$|x_d(t)|$}=0.5, $x_d(t)$>0 and sgn[$x_d(t)$]=−0.5, $x_d(t)$<0. In this way, the signal $\hat{x}_1(t)$ is obtained on the output D1 of the modulation in the receiver decoder MD, which signal represents the estimated signal from the transmitter. The same detection process is used in the circuits C2, C3 and C4 of FIG. 13 which give the signals $\hat{x}_2(t)$, $\hat{x}_3(t)$ and $\hat{x}_4(t)$ on the outputs. Because 4 bits per signal interval T are transmitted through the channel, the 8D-4P2C system is directly comparable with the 16QAM system as both have the theoretical spectral efficiency of 4 bits/s/Hz.

Figure 3:
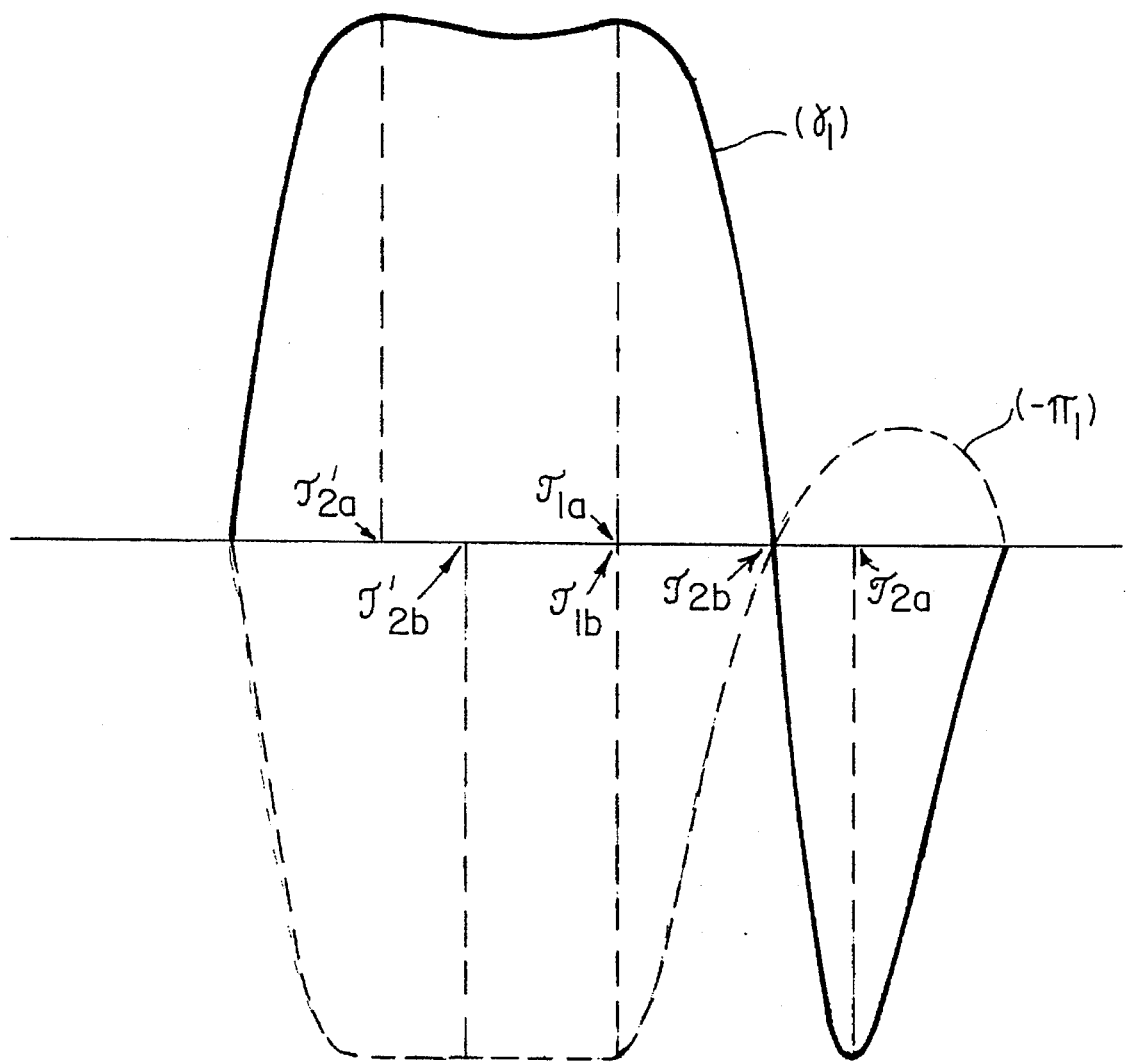
FIG. 3 illustrates two preferred pulse shapes used in the method according to the invention, namely the presently most preferred "camel shape" (a), and another basic shape, (b).
Figure 4A:
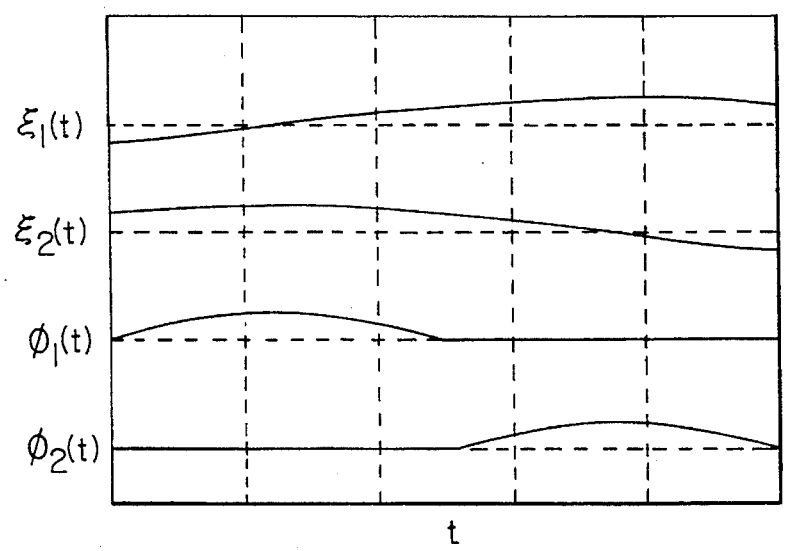
FIGS. 4A, 4B, 4C, 4D, 4E and 4F illustrate an embodiment of a process of obtaining preferred $\beta$-waveforms for use in a system according to the invention.
Figure 4D:
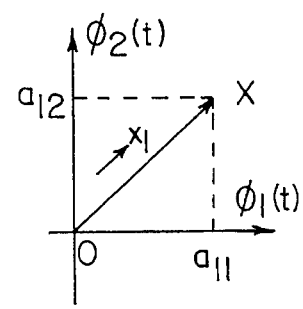
Figure 4B:
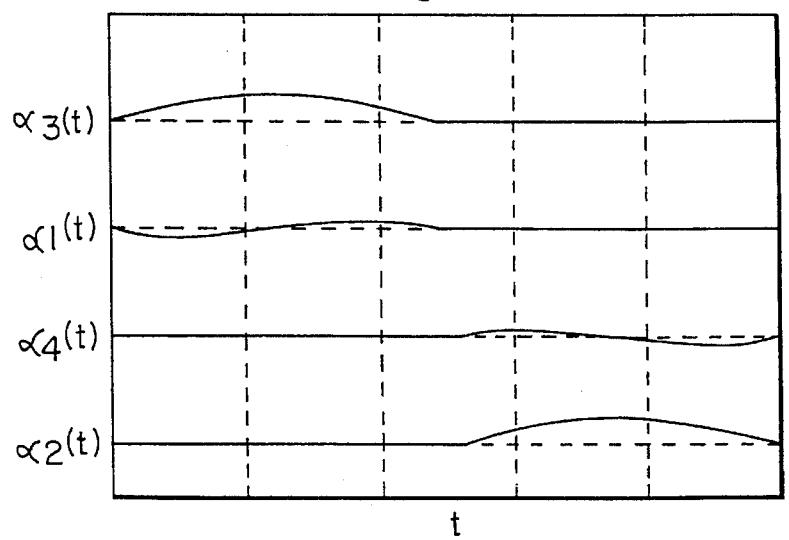
Figure 4E:
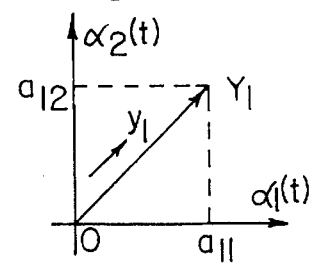
Figure 4F:
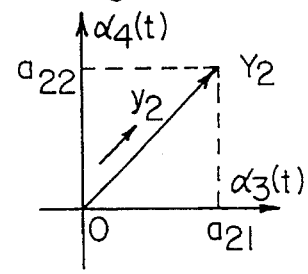
Figure 4C:
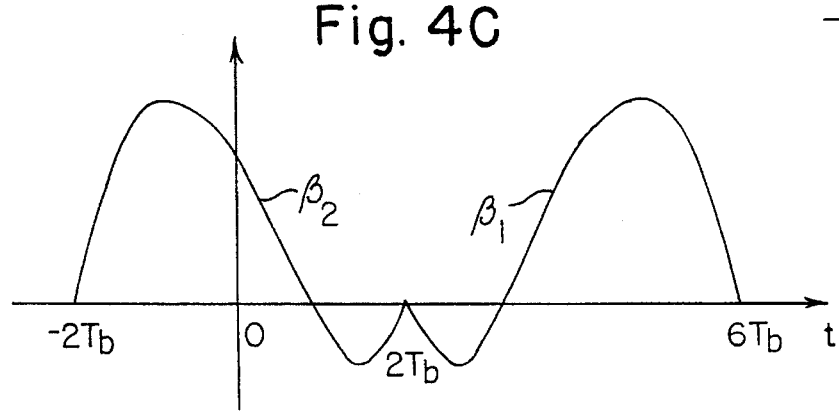

Now, FIGS. 3 and 8–26 will be discussed primarily from a physical/hardware point of view:

FIG. 3 illustrates two pulse shapes, ($γ_1$) and (—$II_{ID}$, which are examples of optimal types of shape for the purposes of the invention as each of these shapes, together with its time reverse and the inverse pulses may be detected by the same algorithm and as these pulses provide easy access to the information coded into the pulses:

Pulse ($γ_1$) (which has positive amplitude in the left part and negative amplitude in the right part) is an example of the so-called "camel shape". It has maximum (and the inverse of the same shape has minimum) at about the middle of the pulse so that detection of the amplitude in this point can be performed by a single sampling at the middle, ($τ_{1a}$), and can directly give one bit of information. Secondly, at the second preferred sampling point, ($τ_{2a}$), this shape has minimum amplitude (and its inverse has maximum amplitude as indicated on the (non-inversed) shape by ($τ'_{2a}$) which provides easy access to the information coded in the shape as only a single sampling is sufficient to obtain the second bit of information.

This kind of pulse shape (the camel shape, exemplified by $γ_1$), gives a signal constellation of only four points for each sampling, whereby the decoding of bit information from this pulse is as simple as possible and gives maximum distance between the points in the constellation. As indicated above, the two bits of information may be obtained directly and independently (in infinite bandwidth of the channel) by two samplings of this pulse, an example of which is described below in connection with FIG. 16. It is interesting to note that with this kind of shape it is possible to use two points in the time axis for direct detection of one of the four possible pulses, which means that two bits of information are extracted directly from the shape of each pulse. This is an illustration of the above-mentioned fact that one of the main contributions of the present invention is to introduce coding in the shape in connection with the time axis where two different sampling points are considered as the minimum number of samples along the time axis within the fixed time duration of the pulse.

Pulse (—$II_1$) (which has negative amplitude in the left part and positive amplitude in the right part): This shape has minimum (and the inverse shape has maximum) at about the middle of the pulse so that detection of the polarity of this pulse and ks time reverse may always be performed by a single sampling at this point ($τ_{1b}$) to obtain the first bit of information. Secondly, at the second preferred sampling point, ($τ_{2b}$), this shape has zero amplitude (and its time reverse has substantially minimum amplitude (and the corresponding inverse shape has substantially maximum amplitude) as indicated on the (non-time reversed) shape by ($τ'_{2b}$) which provides fairly easy access to the information coded in the shape as this information may be obtained on the basis of two samplings.

Figure 8:
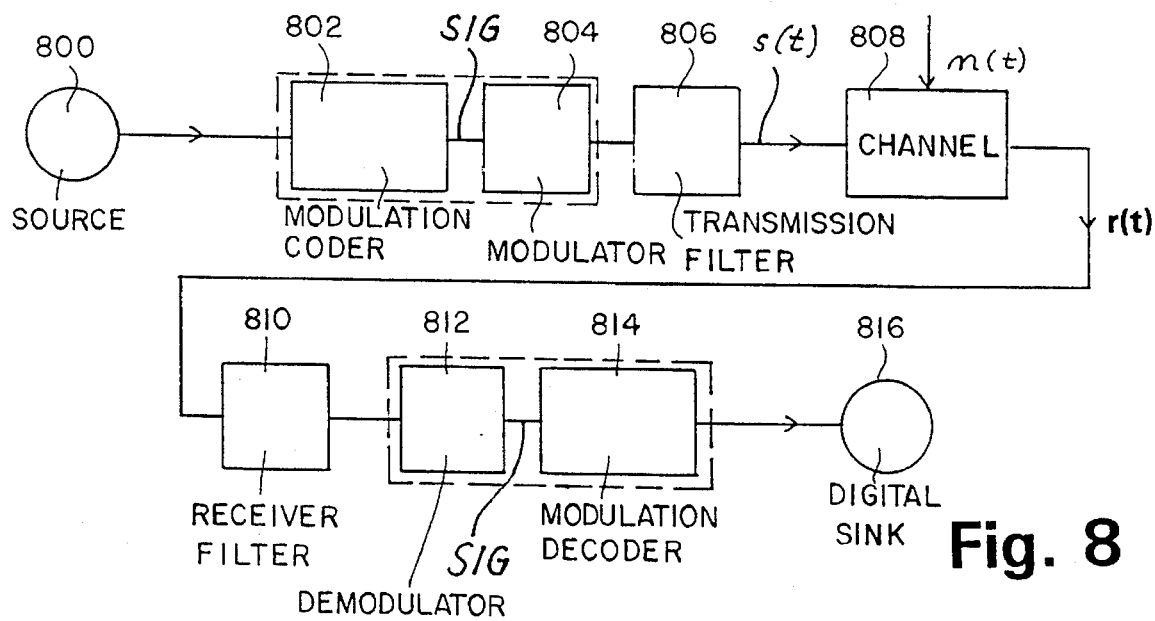
FIG. 8 represents an end-to-end block diagram of an embodiment of a digital communication system according to the invention.

FIG. 8 represents an end-to-end block diagram of an embodiment of a digital communication system operating according to the principles of the invention. Source 800 is a generator of a digital signal in the form of a sequence of bits. This digital signal is coded, modulated, transmitted, demodulated, decoded and used at the other end of the system. Modulation coder 802 codes bits of information into pulses. Modulator 804 modulates a carrier by the signal SIG from the modulational coder 802. In the case of an online system (e.g. an optical transmission system) only one modulational coder and one carrier signal are typically used. In the case of a radio transmission system, at least two modulational coders incorporated in one modulational coder assembly having two output signals for modulating at least two orthogonal carrier signals (e.g. $cosω_ct$, $sinω_ct$) are typically used. In the case of modem communication, almost any number m of modulational coders may be used for generating signals for modulating m carrier signals.

In accordance with normal transmission practice, the modulated signal s(t) is led through a transmitter filter 806 before it is transmitted through the channel 808, wherein noise n(t) with constant noise power spectral density $N_o$, which is usually additive white Gaussian noise (AWGN), inevitably adds to the signal, and the resulting signal r(t)= s(t)+n(t) is received in a receiver filter 810 which eliminates out-of band noise. When a high spectral efficiency is required of a system according to the invention, the received signal is usually equalized by means of an equalizing filter or equalizing stage in order to compensate for distorting influence of the transmitter filter, the channel, and the receiver filter, this negative influence being varying amplitude and phase distortion of the received signal. One way of performing this equalization is to perform a correction of the amplitude and the phase of the received signal on the basis of knowledge of the correct amplitude and phase of the signal. Quite generally, the equalization may be performed using any suitable digital signal processing in the base band.

Demodulator 812 regenerates the signal (SIG) from the input. Modulational, decoder 814 converts one pulse of the input signal into bits of information. A presently preferred embodiment of a modulational decoder is described below in connection with FIG. 13. Finally, the decoded signal is transmitted to a digital sink 816.

For optimal performance of the system, the receiver filter RF should be optimized in accordance with the pulse shapes used in the system, which means that the intersymbol interference in the filter should be reduced to as low a level as possible and at the same time as as much noise as possible is removed from the signal r(t). If the pulse shapes of FIG. 5 are used, a suitable receiver filter RF may, e.g., be a 5'th order elliptical filter having two zeros and three poles and having an equivalent bandwidth $B_{eq}$ of $0.333/T_b$.

FIG. 9 is a block diagram of a first embodiment of a modulational coder according to the invention. To the input part of this modulational coder, an information stream comprising sets of four bits $a_1$, $a_2$, $a_3$ and $a_4$ is led at a data rate of $1/T_b$. The information stream bits are transformed in a serial-to-parallel converter S/P into two streams of symbols with twice the bit duration ($T=2T_b$), corresponding to the bits $a_1$, $a_3$ and $a_2$, $a_4$, respectively.

The symbols in each stream are convened with a function $\phi(t)$ into shaped pulses to form the signals $x_1(t)$ and $x_2(t)$, respectively. In this embodiment, the functions $\phi(t)$ are chosen in the form of even pulses which are half cosines. The even pulses are obtained from a cosine generator, which has a period of $4T_b$ and which is synchronized with the symbols in the streams of symbols, using a full-wave-rectifier (omission of the rectifier would result in the polarity of the bits being altered by the cosine function).

After this transformation, $x_1(t)$ and $x_2(t)$ are further transformed into four new pulses which are pairwise orthogonal, now by two orthogonal signals $\zeta_1$ and $\zeta_2$ having a period of $8T_b$. These signals are generated by a cosine generator and a 90° phase shifter which transforms a cosine function into a sine function.

The resulting functions $y_1(t)$ and $y_2(t)$ are added to form a final function m(t) for modulation or transmission. This function re(t) is a set of two pulses each having a time duration of $2T_b$ and each carrying two bits of information from the input.

It should be noted that when the input is constant (all the input bits having values equal to either +1 or −1), the output of this modulational coder will be a periodical pattern, with period $8T_b$, of pulses $\beta_1$, $\beta_2$, $-\beta_1$, $-\beta_2$ for +1 input and inversely, $-\beta_1$, $-\beta_2$, $\beta_1$, $\beta_2$, for −1 input.

Thus, when a constant input is given, the present modulational coder is a function generator outputting these four pulses in a predetermined manner.

It is evident that in every second time duration of $4T_b$, the polarity of the pulses $\beta_1$ and $\beta_2$ is inverted due to the time variation of the functions $\zeta_1$ and $\zeta_2$.

FIG. 10 is a block diagram of a first embodiment of a transmitter according to the invention. This transmitter comprises two modulational coders, 1 and 2, of the type illustrated in FIG. 9. The input part of the transmitter comprises as its first block a serial to parallel converter S/P in which an input of 8 bits of information is convened into two sets of 4 square pulses $a_1$, $a_2$, $a_3$, $a_4$ and $a_5$, $a_6$, $a_7$, $a_8$, each of a duration of $8T_b$, which are led to the modulational coders 1 and 2, respectively.

The $\phi$-functions of this embodiment are generated at the top of the illustration by dividing the output g(t) of a cosine-generator 3, having a period of $8T_b$ and being synchronized with the square pulses $a_1$... $a_8$, into two signals in a power divider 3. One of these signals is input into the plus input of an operational amplifier 4, and the other signal is input into the minus input of an operational amplifier 4'. The output of the operational amplifier 4 is connected with two analogue switches 6 and 8 and with a block 5 which is a combination of an operational amplifier and a hard limiter. The output of the operational amplifier 4' is connected with two analogue switches 7 and 9. All of the switches 6, 7, 8 and 9 are controlled by two signals 5a and 5b from the operational amplifier/hard limiter 5, the signal 5b being inverse of 5a. This means that the switches 6 and 9 are only open when the signal from the amplifiers 4 and 4' into the switches 6 and 9 is of positive polarity, and that switches 7 and 8 are only open when the signal from the amplifiers 4 and 4' into switches 7 and 8 are of negative polarity, as the switches 7 and 8 invert their output.

Thus, the four output signals from the switches 6, 7, 8 and 9 are normalized by the normalization factors $A_{\alpha 1}$ and $A_{\alpha 2}$ of the operational amplifiers 4 and 4' and adapted through the switches to be used in correct time instants in the two modulational coders 1 and 2.

Even though, in this embodiment of the transmitter, the $\phi$-functions $\phi_1$ and $\phi_2$ are not identical as is the case in the embodiment in FIG. 9, the overall function of these functions is the same in these two embodiments. In the present embodiment, the $\phi$-functions are adapted to give $\beta$ pulses, e.g. as illustrated in FIG. 4.

Thus, the output of the top circuits consists of four different signals constituted by two different signals $\phi_1$ and $\phi_2$ which are orthogonal and which have two different normalization factors $A_{\alpha 1}$ and $A_{\alpha 2}$. Due to the function of the amplifier/hard limiter 5, one of $\phi_1$ and $\phi_2$ is always zero while the other describes a "cosine" half-wave. When the output of switch 6 is "cosine" inside a time interval of $4T_b$, the output of switch 9 is substantially equal to zero, and for the next time interval of $4T_b$, the output of switch 6 is substantially zero and the output of switch 9 is "cosine".

In the serial-to-parallel converter 9', the eight input bits each having time duration of $T_b$ are transformed into eight square pulses $a_1$–$a_8$ having a time duration of $8T_b$. Due to the shape of the $\phi$ functions, the pulses resulting after the multiplication of $a_1$–$a_8$ with the four $\phi$-functions are functions having the polarity of the $a_1$–$a_8$ pulses and the shapes of the outputs of the switches 6–9: a pulse of "cosine" shape with a duration of $4T_b$ and a zero pulse with a duration of $4T_b$. These signals are added in the adders 9" into signals $x_1(t)$, $x_2(t)$, $x_3(t)$ and $x_4(t)$, respectively.

These signals, which are similar to $x_1(t)$ and $x_2(t)$ in FIG. 9, are subsequently multiplied by the two orthogonal $\zeta$-signals generated by a cosine generator and a 90° phase shifter into the resulting signals $y_1(t)$, $y_2(t)$ and $y_3(t)$, $y_4(t)$, respectively. The signals $y_1(t)$ and $y_2(t)$ are added to form signal $s_c(t)$, and signals $y_3(t)$ and $y_4(t)$ are added to form $s_s(t)$, where the signals $s_c(t)$ and $s_s(t)$ constitute the outputs of each of the modulational coders 1 and 2, respectively, which gives a sequence of pulses similar to the signal m(t) of FIG. 9.

Two orthogonal carriers are used in the embodiment of FIG. 10. Each of the output signals from the modulational coders 1 and 2, $s_c(t)$ and $s_s(t)$, each of which contains a series of $\beta$-pulses of duration $4T_b$, is used for the modulation of one of the orthogonal carriers.

It should be noted that the exact order in which the individual bits are coded in the signals $s_c(t)$ and $s_s(t)$ will depend on the serial-to-parallel conversion; this may not be exactly the same as in the embodiment in FIG. 9.

The normalization of the φ-functions may be adapted to the normalization of the ζ-functions so that the average energy of the functions $s_c(t)$ and $s_s(t)$ is one, according to the standard methods for designing the basis functions of the system with multi-orthogonal signal constellation.

Finally, in the present invention, the signals $s_c(t)$ and $s_s(t)$ modulate two orthogonal signals generated by a cosine generator 10 and a 90° phase shifter 11 in multipliers 13 and 14, and the final modulated signals are added in an adder 12 into the signal s(t) which is prepared for amplification and transmission.

FIG. 11 is a block diagram of a second, presently preferred embodiment of a transmitter according to the invention. This transmitter is similar to the transmitter of FIG. 10. The major difference between the embodiments of FIGS. 10 and 11 is the fact that instead of transforming eight serial bits of duration $T_b$ into eight parallel square pulses of duration $8T_b$, as is seen in FIG. 10, two sets of four serial bits of duration $T_b$ are transformed into two sets of four parallel square pulses of duration $4T_b$.

The φ-functions generated at the top of FIG. 11 are generated in exactly the same manner as in the embodiment of FIG. 10. The signal from the cosine generator 1102 is split in power splitter 1104 and fed into two identical blocks comprising two operational amplifiers 1106 and 1108 (1110 and 1112) of which one 1108 (1112) inverts the signal. The signal from 1106 and 1108 (1112) inverts are fed into analogue switches 1114 and 1196 (1118 and 1120), respectively. The switches 1114 and 1116 (1198 and 1120) are controlled by the output and the inverted output, respectively, of a operational amplifier/hard limiter 1122 (1124).

However, in the embodiment illustrated in FIG. 11, one φ-function from the switch 1104 is added to one φ-function from the second switch 1116 in the adder 1126, and correspondingly, one φ-function from the third switch 1118 is added to one φ-function from the fourth switch 1120 in the adder 1128. These functions are added so that the outputs of 1126 and 1128 in a time period of $8T_b$ are two "cosine" half-waves with amplitudes defined by the operational amplifiers 1106–1112 which operate in the same manner as those of FIG. 10 (reference numerals 4 and 4').

In the serial-to-parallel converter 1130 eight input bits are converted into four series of two square pulses: $(a_1, a_5)$, $(a_2, a_6)$, $(a_3, a_7)$, $(a_4, a_8)$, each having duration $4T_b$, $a_1$ being transmitted before $a_5$, etc. These output pulses are multiplied with the combined φ-signals in a manner so that the first square pulse is multiplied with the first pulse in the φ-signal and the second square pulse is multiplied with the second pulse in the φ-signal. In this manner, the outputs of the multipliers 1132, 1134, 1136 represent the signals $x_1(t)$, $x_2(t)$, $x_3(t)$, and $x_4(t)$ of the transmitter in FIG. 10.

The ζ-signals are generated in the same manner as in FIG. 10 with the exception that, in the embodiment of FIG. 11, different normalizations of the ζ-signals may be defined by the two operational amplifiers 1140 and 1142. The outputs of the amplifiers 1140 and 1142 are divided by power splitters 1144 and 1146 used for adapting to the multipliers 1148, 1150, 1152, 1154, 1156 is a cosine generator and 1158 is a 90° phase shifter.

The outputs of the multipliers 1132, 1134, 1136, 1138 are multiplied with the ζ-signals in multipliers 1148, 1150, 1152, 1154 and added in adders 1156 and 1158 in the same manner as in FIG. 10. The final pulses are used for modulation of two carrier signals in mixers 1160 and 1162. The two carrier signals are generated by a cosine generator 1164 and the 90° phase shifter 1166.

Thus, it is evident that the output signal of this embodiment is similar if not identical to the output signals of the embodiment of FIG. 10.

FIG. 12 is a block diagram of a first embodiment of a receiver according to the invention, wherein an input signal r(t) corresponding to the output of a transmitter according to e.g. FIG. 10, but with additional noise from the channel, cf. FIG. 8, is processed. The signal r(t) carries information of 8 bits in a time interval of $8T_b$; in a time duration of $4T_b$ (the pulse duration), this signal carries information of 4 bits, which results in a theoretical spectral efficiency of 4 bits/s/Hz.

The input signal r(t) 30 is input into a receiving filter 31 which is a conventional band-pass filter. The output 32 of the band-pass filter 31 is led into a standard power divider circuit 33 which splits the signal 32 into two signals 34, 35. The signal 32 is furthermore fed into a carrier recovery circuit 36 from which two orthogonal carrier signals 37 and 38 are obtained, of which signal 37 is input into a mixer 39 and signal 38 is input into a mixer 40. The two signals 37 and 38 are represented by a cosine and a sine function, respectively, with each signal having the carrier frequency $\omega_c$ of the output signal of the transmitter s(t) of e.g. FIGS. 10 or 11.

The output signals 41 and 42 of the mixer circuits 39 and 40 are fed into low-pass filters 43 and 44, respectively, in order to obtain two estimated baseband signals $\hat{s}_c(t)$ 45 and $\hat{s}_s(t)$ 46, corresponding to the signals $s_c(t)$ and $s_s(t)$, to be used in a modulational decoder 56.

Thus, in a given observation time interval, the signals 45 and 46 each correspond to a couple of two pulses of the shape generated in the actual transmitter, each pulse having a duration of $4T_b$. For a time period of $16T_b$, the first two pulses are of correct polarity and the second two pulses are of inverse polarity when compared to the actual information of the bit information defining the polarity of these pulses.

The signals 45 and 46 are led into a standard symbol timing recovery circuit 47 which generates a clock signal 48 having a cycle period of $4T_b$. The clock signal 48 is input into a clock unit circuit 49 which produces clock output signals 50 and 51 having a cycle period of $16T_b$, timing signals 52 and 53 having a cycle period of $4T_b$, and timing signals 54 and 55 having a cycle period of $4T_b$.

The signals 50, 51, 54 and 55 are used as input signals for the modulational decoder 56 which furthermore has as input signals the baseband signals 45 and 46.

The two clock signals 50, 51 with cycle periods of $16T_b$ from the clock unit circuit 49 are synchronized with the signals 45 and 46. The signal 51 is $4T_b$ in advance of the signal 50. This is in accordance with the definition of the $\zeta_1$ and $\zeta_2$ given in equations (12) and (13) and the definitions of $\phi_1$ and $\phi_2$ given in equations (3), (4) and (5).

The timing output signals 54 and 55 from the dock unit 49 are narrow pulses emitted at time instances $\tau_1$ and $\tau_2$ with a period of $4T_b$, which correspond to the points in time where $\beta_2$ and $\beta_1$ have their maximum amplitude, respectively, see FIG. 5. These signals 54 and 55 are also synchronized with the signals 45 and 46.

Each of the signals 45 and 46 contain information in the form of a sequence of pulses, each of which carries two bits of information which may be extracted as will be described in connection with FIG. 13. From the input signal 45 two output signals 57 and 58 are obtained and from the input signal 46 two output signals 59 and 60 are obtained, respectively, from the modulational decoder 56. Within a time period of $4T_b$, the two pulses of signals 57 and 58 will be of the same shape but having polarities according to the information bits coded into the pulse of the signal 45, and the two pulses of signals 59, 60 will also be of the same shape and with polarities according to the information bits coded into the pulse of the signal 46.

Each of the four output signals 57, 58, 59 and 60 is input into low-pass filters 61, 62, 63 and 64, respectively, as part of a baseband processing circuit NF, for smoothing the signals. The outputs of the filters 61, 62, 63 and 64 are fed into four sample and hold circuits 65, 66, 67 and 68, respectively, controlled by the timing signals 52 and 53, which may be identical signals in a simplified receiver.

The sample and hold circuits 65, 66, 67 and 68 sample at a point in time corresponding to the middle of the pulse duration time of the corresponding output pulses 57, 58, 59 and 60 to determine the amplitude values of these pulses.

This is the simplest way of deciding the polarity of the output pulses 57–60, but with the pulse shape used in this example (generated as explained in connection with FIG. 11), it introduces a loss in error performance; a better way of deciding the polarity comprises sampling at two different time instants $\tau_1$ and $\tau_2$ and then selecting the largest sampled value. Thus, to obtain a better error performance, the two signals 52 and 53 are not identical.

The outputs of the sample and hold circuits 65, 66, 67 and 68 are fed to four hard limiter circuits 69, 70, 71 and 72, respectively, for determining the value of the pulses (+1 or −1). The outputs of the hard limiter circuits 69, 70, 71 and 72 represent the four information bits received from the transmitter during a time period of $4T_b$. The four parallel output signals 73, 74, 75 and 76 of the hard limiters 69, 70, 71 and 72 are subsequently preferably transformed into a single serial signal containing the four bits of information by conventional parallel to serial conversion.

Thus, in a time interval of $8T_b$, two conversions take place, and eight bits of information are obtained. The correct order in which the decoded bits should be positioned in the serial signal depends on the order in which the bits are coded in the transmitted signal. However, when matching the transmitter and the receiver, this is normally taken into consideration.

FIG. 13 is a block diagram of an embodiment of a modulational decoder 56 suited for use in the receiver illustrated in FIG. 12. The modulational decoder 56 comprises two substantially identical modulational decoding circuits 80, 81 each of which has as input signal one of the estimated baseband signals 45, 46, see FIG. 12. From each of the circuits 80 and 81 two pairs of output signals 57, 58 and 59, 60, respectively, are obtained, see FIG. 12.

Each of the baseband signals 45 and 46 is split into two signals 84, 85 and 86, 87, respectively, by standard power divider circuits 82, 83. Each of the signals 84, 85 and 86, 87 is led into a multiplying circuit 88, 89, 90 and 91, respectively. The multipliers 88 and 90 further have as input the dock signal 51 and the multipliers 89 and 91 further have the clock signal 50 as input, see FIG. 12. The two clock signals 50, 51, which have been described in connection with FIG. 12, are preferably square wave signals, however sine and cosine-like functions may also be applied. The multipliers 88, 89, 90 and 91 output signals 92, 93, 94, and 95, respectively.

The signals 84 and 86 are multiplied by the signal 51, and the signals 85 and 87 are multiplied by the signal 50. Signal 50 is $4T_b$ in advance of signal 51 as described above. Thus, in a time interval of $8T_b$, there is a first time interval of $4T_b$ in which the two signals 51 and 50 have the same polarity, +1, and a second interval of $4T_b$ in which the signal 51 is positive, and the signal 50 is negative. This time interval of $8T_b$ is the first time interval discussed in the description of FIG. 10.

Each of the modulational decoding circuits 80 and 81 further comprises two corrector circuits 100, 101 and 102, 103, respectively. The output signal 92 is connected to each of the corrector circuits 100 and 101 in the modulational decoding circuit 80 and the output signal 93 is directly fed to the circuit 101 and through an inverter 96 to the circuit 100. Similar connections are made in the modulational decoding circuit 81.

For identification of the shape of the pulses in each of the corrector circuits 100, 101, 102 and 103, the timing signals 54, 55, which have been described in connection with FIG. 12, are applied to extract information of the amplitude value of the shape in the form of two samples. The output signals 57, 58, 59 and 60 of the corrector circuits contain pulses from the inputs 45 and 46, respectively, with correct polarity of each the four information bits coded into the pulses. The function of the corrector circuits 100–103 will be further described in connection with FIG. 14.

FIG. 14 is a block diagram of a corrector circuit according to the invention which is suited for use in the modulational decoder of FIG. 13.

In the explanation given below an infinite pseudo random sequence of pulses is considered.

From the description of the modulational coder 56 and the adaption of the selection signal 51, 50 it follows that the baseband signals 45 and 46 are transformed into input signals 92, 98, 93 and 94, 99, 95, respectively, having the following properties:

The demodulated signal 45 contains all of the polarity of the pulses from the signal $y_1(t)$ (see FIG. 10) in the time interval of $4T_b$ beginning at $t=(2u+½)4T_b, u=0, 1, 2, \ldots$ and all of the polarity from the signal $y_2(t)$ (see FIG. 10) in the time interval of $4T_b$ beginning at $t=(2u-½)4T_b$. Correct polarity of the couple of β-pulses in the signal 45 is seen in the time interval $(2u-½)4T_b$ to $(2u+½)4T_b$ for $u=0, 2, 4, \ldots$ and incorrect polarity is seen in the time interval $(2u-½)4T_b$ to $(2u+½)4T_b$ for $u=1, 3, 5, \ldots$ The information of the polarity of the pulses for the part of the pulses having incorrect polarity is included in the shape of the modulational pulse $β_j(t)$, ($j=1, 2$). The polarity of these pulses is recovered on the basis of the information of the shape of the modulational pulse.

Thus, the corrector circuit of FIG. 14 must correct the polarity of a quarter of the pulses with the position in time of these incorrect polarity pulses being known. The pulses in both signals $93=x_{ii}(t)$ and $92=x_{iq}(t)$ in the first time interval of 8Tb have the same polarity when starting at time $t=2T_b$ and opposite polarity when starting at time $t=2T_b$ since both signals are recovered from the estimated baseband signal 45 or 46 using the clock signals 51 and 50. Thus, the same pulse shape is obtained at the same point in time for both the signals $x_{ii}(t)$, $x_{iq}(t)$. On the basis of knowledge as to the function of the modulational coder, it is clear that those pulses in the signal $x_{ii}(t)$ which are constructed as a sum of two pulses with equal polarity should be corrected, and those pulses in the signal $x_{iq}(t)$ which are constructed as a sum of pulses with opposite polarity should also be corrected. In both cases, it has to be decided which pulses of shape $β_2$ should have their polarity corrected.

The operation of the corrector circuit 100 is explained in the following:

The corrector circuit 100 comprises an adder circuit 201 in which the two input signals $98=-x_{ii}(t)$ and $92=x_{iq}(t)$ are added to give a signal $x_s(t)=x_{iq}(t)-x_{ii}(t)$. The corrector circuit 101 comprises an adder circuit in which the two input signals $93=x_{ii}(t)$ and $92=x_{iq}(t)$ are added to give a signal $x'_s(t)=x_{ig}(t)+x_{ii}(t)$. As mentioned above, the pulses of shape $\beta_2$ should be identified by sample and hold circuits 202, 203 which are incorporated in the corrector circuit 100. The timing signal 54 is input to circuit 202 and samplings are performed substantially at the point in time $\tau_1$ when pulses with shape $\beta_2$ have their maximum amplitude, and timing signal 55 is input to circuit 203 where samplings are performed at the point in time $\tau_2$ when pulses with shape $\beta_1$ have their maximum amplitude. After sampling, each of the sampling results is squared in circuits 204 and 205, respectively, in order to eliminate the sign of the sampling result. The output signal $x_L(t)$ of circuit 204 is fed into a delay circuit 208 with a delay of $\tau'=(\tau_2-\tau_1)$ in order to obtain a signal having the same phase as signal $x_r(t)$ which is output from circuit 205. The outputs of circuits 205 and 208, $x_r(t)$ and $x_L(t-\tau')$, respectively, are fed into an operational amplifier 209 incorporating a hard limiter. In circuit 209 the difference $xc(t)$ between the two input signals $X_r(t)$ and $x_L(t-\tau')$ is obtained from the operational amplifier 209 and is subsequently converted in the hard limiter into square wave signals, the amplitudes of which are shifted so that the output signal $x_c(t)$ lies between zero and minus one.

When the pulses are of the shape $\beta_1$, the signal $x_c(t)$ is substantially zero, but for pulses of shape $\beta_2$, the value of $x_c(t)$ is substantially minus one and it is necessary to perform a correction. If no correction is needed the value of $x_c(t)$ is zero. A multiplier 210 multiplies the signal $x_c(t)$ with the delayed signal $x_s(t)$, which is delayed in delay circuit 207 with a delay equal to $\tau_2$ to be adapted to the signal $x_c(t)$. The resulting output signal of the multiplier 210 has inverted pulses with twice the amplitude of the input signal when signal $x_c(t)$ is minus one and is substantially zero when $x_c(t)$ is about zero. An adder circuit 211 adds the output signal of the multiplier 210 to the delayed input signal $x_{ii}(t)$, which has been delayed by delay circuit 206 by a delay equal to $\tau_2$ to be adapted to the signal $x_c(t)$.

The resulting output signal of the adder 211 is a sequence of pulses with polarity corresponding to the corresponding information bit. So, using four correctors 100, 101, 102 and 103, four outputs are obtained, each pulse having correct polarity in a time interval of $4T_b$, corresponding to the polarity of the information bits $a_1$, $a_2$, $a_3$ and $a_4$ in the first time interval of $4T_b$, according to FIG. 10.

The modulational decoder 56 gives four bits of information which are transmitted through the channel in a time duration of $4T_b$. This type of decoder is especially suited for combination with a convolutional coder inserted before the modulational coder. A very good matching is obtained by using a convolutional coder and a modulational coder for each carrier signal in the transmitter and by choosing the convolutional coder to be of rate ½, with a length of 7 and tree bits of quantization. The output rate of the convolutional coder is increased by a factor of 2 compared to its input rate, which means that twice the bandwidth is required in the channel. The necessity of the increased bandwidth is compensated by the modulational coder according to the invention. Thus, the advantage of the convolutional coder (coding gain) may be obtained without incurring the disadvantage of the convolutional coding (the increased bandwidth) as the modulational coder according to the invention "decreases" the bandwidth of the input signal obtained from the convolutional coder.

The error performance obtained by using two convolutional decoders after the two modulational decoders gives a coding gain which is greater than 6 dB at a theoretical spectral efficiency of 2 bits/s/Hz, when compared to the bit error probability of the uncoded QPSK system. This is an important improvement in comparison with standard modulation methods, QPSK+convolutional coder/convolutional decoder, which gives a coding gain of 5.2 dB at a theoretical spectral efficiency of 1 bit/s/Hz.

A simple mathematical description of the function of the correctors 100, 101, 102 and 103 is as follows:

The signal 45 can be expressed in general form as $$45 \hat{s}_c(t)=\beta_i(t)+\beta_j(t-4T_b), \quad i,j=1,2$$

in the corrector 100 and 101, the output signals 57 and 58 can be expressed as $$58: z_1(t)=\hat{s}_c(t)+\sigma_c(t)$$

$$57: z_2(t)=\hat{s}_{c1}(t)+\delta_c(t)$$

The correction signal $x_c(t)$ is expressed in two forms:

$$\sigma_c(t)=-\sigma(t)=-2\beta_i(t) \text{ if } i=2$$

$$\sigma_c(t)=0 \text{ if } i\neq 2$$

$$\delta_c(t)=-\delta(t)=2\beta_j(t-4T_b) \text{ if } j=2$$

$$\delta_c(t)=0 \text{ if } j\neq 2,$$

where $\sigma(t)=x'_s(t)$ and $\delta(t)=x_s(t)$. p As an example according to FIG. 10, if information bits $a_1=a_2=a_3=a_4=1$, then the signals $$\hat{s}_c(t)=x_{ii}(t)=\beta_1(t)+\beta_2(t-4T_b)$$

$$\hat{s}_{c1}(t)=x_{iq}(t)=\beta_1(t)+\beta_2(t-4T_b)$$

$$\sigma(t)=x_{ii}(t)+x_{iq}(t)=2\beta_1(t)$$

$$\delta(t)=x_{iq}(t)-x_{ii}(t)=-2\beta_2(t-4T_b)$$

Using the above definition of $\sigma_c(t)$ and $\delta_c(t)$ are obtained $$\sigma_c=0$$

$$\delta_c=2\beta_2(t-4T_b), \text{ which means that}$$

$$z_1(t)=x_{ii}(t)+\sigma_c(t)=\beta_1(t)+\beta_2(t-4T_b)$$

$$z_2(t)=x_{iq}(t)+\delta_c(t)=\beta_1(t)+\beta_2(t-4T_b).$$

In other words, in this case, there is no correction.

In another example, if information bits $a_1=+1$, $a_2=-1$, $a_3=-1$, $a_4=+1$, then the signals $$\hat{s}_c(t)=x_{ii}(t)=-\beta_2(t)-\beta_1(t-4T_b)$$

$$\hat{s}_{c1}(t)=x_{iq}(t)=-\beta_2(t)+\beta_1(t-4T_b)$$

$$\sigma(t)=x_{ii}(t)+x_{iq}(t)=-2\beta_2(t)$$

$$\delta(t)=x_{iq}(t)=x_{iq}(t)-x_{ii}(t)=+2\beta_1(t-4T_b)$$

Using the above definition of $\sigma_c(t)$ and $\delta_c(t)$ are obtained $$\sigma_c=2\beta_2(t) \quad \delta_c=0$$

$z_1(t)=x_{ii}(t)+\sigma_c(t)=+\beta_2(t)-\beta_1(t-4T_b)$.

$z_2(t)=x_{iq}(t)+\delta_c(t)=-\beta_2(t)+\beta_1(t-4T_b)$.

Figure 15:
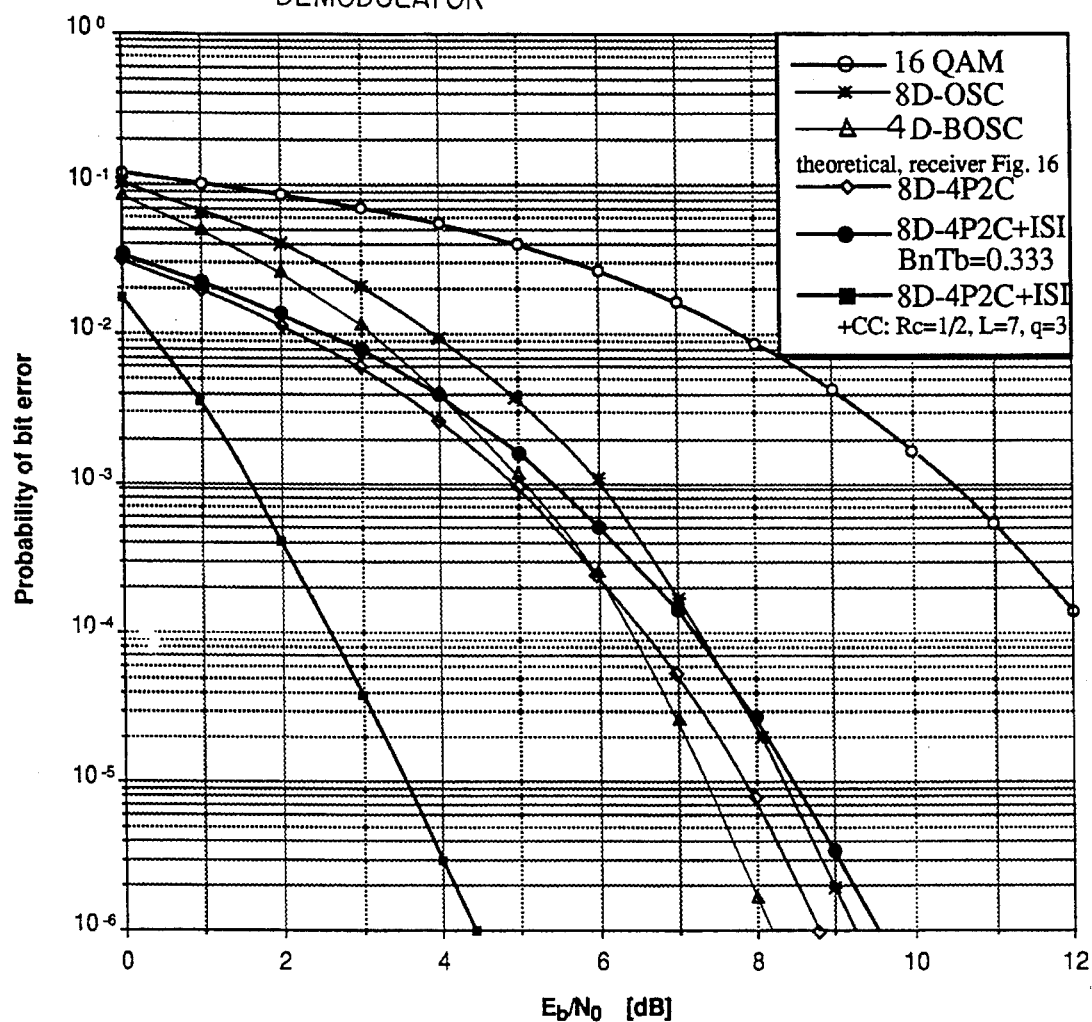
FIG. 15 illustrates the probability of bit error for different digital communication systems.
Figure 16:
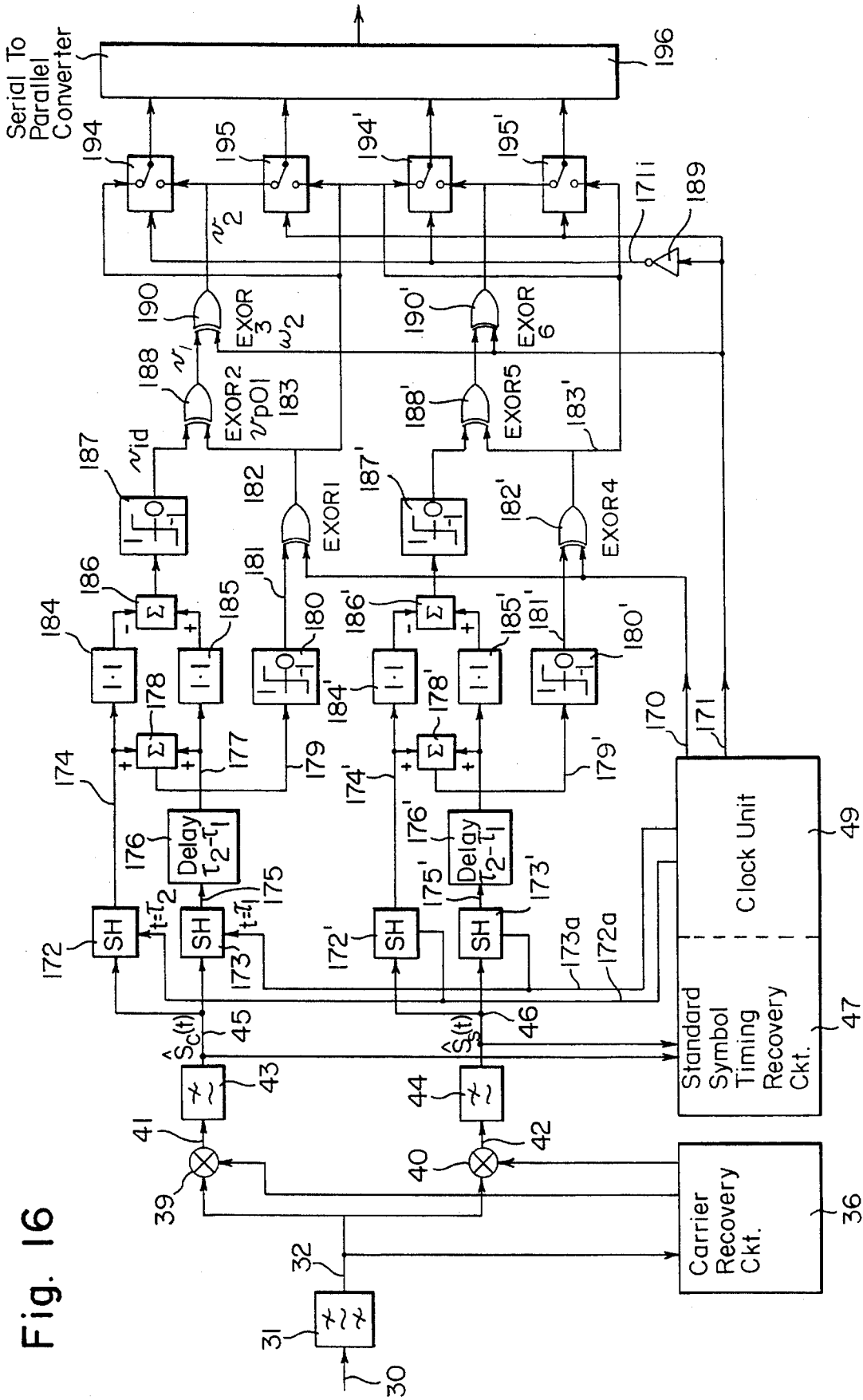
FIG. 16 is a block diagram of a second embodiment of a receiver for detection of a 8D-4P2C signal.

Thus, in this case, the output signals $z_1(t)$ and $z_2(t)$ are corrected when compared to the input signals $\hat{s}_c(t)$ and $\hat{s}_{c1}(t)$, FIG. 15 illustrates the probability of bit error for 6 different digital communication systems, of which 1)–3) are known systems, and 4)–6) are according to the invention:
1) 16QAM,
2) 8D-OSC (8 Dimensions Orthogonal Signal Constellation) M=N
3) 4D-BOSC (4 Dimensions Bi-Orthogonal Signal Constellation) M=2N
4) 8D-4P2C (theoretical) using the optimised pulse shape of FIG. 5 and using a receiver as seen in FIG. 16
5) 8D-4P2C using the optimised pulse shape of FIG. 5, using a receiver as seen in FIG. 16, and in which Inter-Symbol Interference (ISI), having an equivalent noise bandwidth of $Bn=0.333/T_b$, is introduced by the receiver filter
6) system 5)+convolutional codes ($R_c=\frac{1}{2}$, L=7, q=3).

System 1) is a widely used system having a theoretical spectral efficiency of 4 bits/s/Hz and a practical spectral efficiency of 3–3.4 bits/s/Hz. Systems 2) and 3) are theoretical models for obtaining a performance close to the theoretical BER curves in FIG. 15, which theoretical models are difficult to implement in hardware. The spectral efficiency of the systems 2) and 3) is 1.5 bits/s/Hz using the two carrier signals.

System 4) according to the invention is a theoretical system proposed for the implementation of a high-performance system incorporating very simple hardware. System 5) is a simulation of system 4) wherein Inter-Symbol Interference (ISI) and the impairment due to imperfect recovery of the carrier and the dock have been included; it is seen that a small degradation (in the order of 0.6 dB at BER=$10^{-5}$) of the theoretical system 4) is to be expected. The theoretical spectral efficiency for the system 4) is 4 bits/s/Hz and that of a practical system is 3–3.4 bits/s/Hz. The spectral efficiency of system 5) as seen in FIG. 15 is chosen to 3 bits/s/Hz.

System 6) is the system 5) in which convolutional coding and decoding is performed by introducing a suitable convolutional coding before the modulational coder and a suitable convolutional decoder after the modulational decoder. The code rate $R_c$ of the convolutional coder is $\frac{1}{2}$, the length of the convolutional coder L is 7, and 3 bits quantization is used.

From FIG. 15 it is evident that a comparison between the theoretical predictions of systems 2) and 4), both having the same dimension (8), shows that system 4) has a coding gain (CG) of 1.8 dB at BER=$10^{-2}$ and of 0.5 dB at BER=$10^{-6}$, which means that the system 4) in general has a better BER than that of system 2). A comparison of the systems 3) and 4) shows that the BER of the system 4) is better than that of system 3) for $E_b/N_0<6$ dB, and that BER for 4) is 0.6 dB worse than that of 3) at BER=$10^{-6}$. These two comparisons show that the system 4) including the two blocks according to the invention, the modulational coder and the modulational decoder, has an error performance close to that of system 3), but with a larger spectral efficiency compared to that of systems 3) or 2), as system 4) increases the spectral efficiency of 8D systems from 1.5 bits/s/Hz to 4 bits/s/Hz.

Comparing the theoretical systems 1) and 4), it is seen that the CG is 5.65 dB at BER=$10^{-5}$, and that the same CG is 5 dB for system 5). With an optimised pulse shape as any of the shapes shown in FIG. 3, where the shape is optimism to have energy one and for ($\gamma_1$) to have maximum distance between the maximum and minimum amplitude and for ($II_1$) to have only maximum amplitude, it is possible to improve the performance of system 4) so as to get very dose to the Shannon bound, such as 2 dB, from the Shannon bound, at BER=$10^{-5}$.

System 6) has a performance which is $0<E_b/N_0<3.6$ dB in the BER range of $10^{-2}$–$10^{-5}$ at a practically obtainable spectral efficiency of 1.7 bits/s/Hz (theoretically 2 bits/s/Hz). Using convolution coding and decoding in this system 5) compared to 2) and 3) permits the use of additional coding for the same data rate and the same bandwidth of the channel by allowing the spectral efficiency as increased by the modulational coding according to the invention to be decreased by the additional coding to the starting spectral efficiency of 1.5 bits/s/Hz. The above philosophy is similar to that of the TCM method where the number of signal vectors in a two-dimensional signal space is increased to the double and later on applying "set partition" of the signal vectors so as to obtain additional CG between the uncoded and the coded system having the same data rate at the input and the same bandwidth of the channel. The price for using the TCM method is the requirement of a Viterbi decoder, which is very complex for asymptotic CG. Using the TVS method according to the invention, the number of basis functions (the dimensionality) of the signal space is increased to the double signal space, and subsequently decreased to the initial dimensionality whereby new coded basis functions are obtained which are easily detectable by simple detection methods.

The above shows that the systems 4)–6) are very well suited for all types of communication; however, as is clear from FIG. 15, the different systems have different advantages. System 6), for example, has a large number of advantages in mobile telephone communication compared to the present systems due to the better error performance and twice the capacity compared to these present systems. The increased error performance may be utilized by decreasing the output power of the system. As is evident from the figure, the operating range of mobile systems ($10^-$–$10^3$) is $E_b/N_0<1.5$ dB. This increase in performance may be used to either decrease the output power and thereby save battery energy, or to maintain the output power and thereby obtaining longer-reaching mobile telephones.

Below, a comparison of system 1) and system 4) according to the invention is given.

| System: | 1) | 4) |
|---|---|---|
| Pulse shape: | rectangular | Properly selected, e.g. FIG. 5 |
| Transmitter design: | mapping 2 bits into 4 levels | mapping 2 bits into 4 pulses |
| Energy of each pulse: | different | one |
| 2D constellation: | 16 points | 2 × 16 points |
| Theoretical spectral efficiency: | 4 bits/s/Hz | 4 bits/s/Hz |
| Required $E_b/N_0$ at BER = $10^{-5}$ | 13.45 dB | 7.8 dB |

At present, however, it is believed in the known art that the best 4 bits/s/Hz system is a 16QAM system (system 1) using TCM for coding the signals (system 7).

Furthermore, when comparing system 1) to the theoretically optimal 16QAM +TCM system (system 7) ($G_{32CR}$ using 512 states), an asymptotic coding gain (CG) of 6.02 dB is obtained. In comparison, a CG of 5.65 dB is obtained between system 1) according to the invention and system 4). In this connection, it should be mentioned that the $G_{32CR}$ system using 512 states is not practically realizable due to its extreme complexity.

However, performing an optimization of the pulse shape, for example, using a pulse shape of FIG. 3, for the actual purpose, an improvement of the error performance of 0.5 dB will easily be obtained, which means that the CG possible to obtain using the system 4) will be more than 6 dB and will incorporate practically all CG obtained using the TCM method but in addition with a very simple design of the coder and decoder according to the invention.

Thus, it is clear that the system according to the invention has the potential to become the most efficient system worldwide and, in addition, to greatly simplify the design of coders and decoders.

FIG. 16 is a block diagram of a second embodiment of a receiver for an 8D-4P2C signal.

In this figure, the received signal r(t) is demodulated into the two estimated baseband signals 45 and 46, each of which corresponds to one of the signals $s_c(t)$ and $s_s(t)$, to be used in a modulational decoder 56 (see FIG. 12).

Figure 6A:
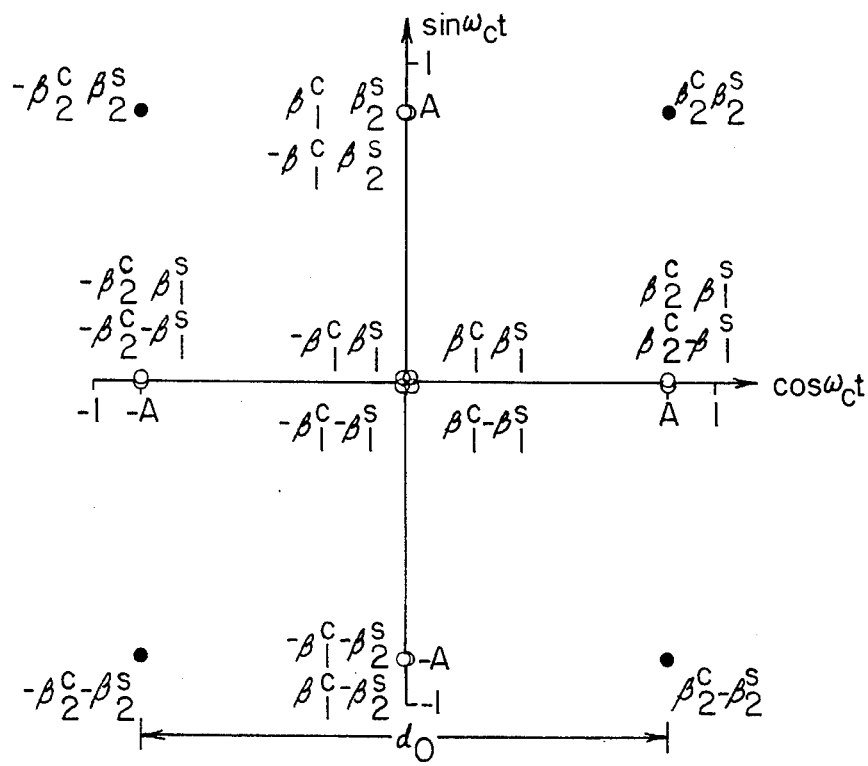
FIG. 6 illustrates a signal constellation for the pulse shape of FIG. 5 with (a) samples taken at the time instant $\tau_1$ and (b) samples taken at the time instant $\tau_2$.
Figure 6B:
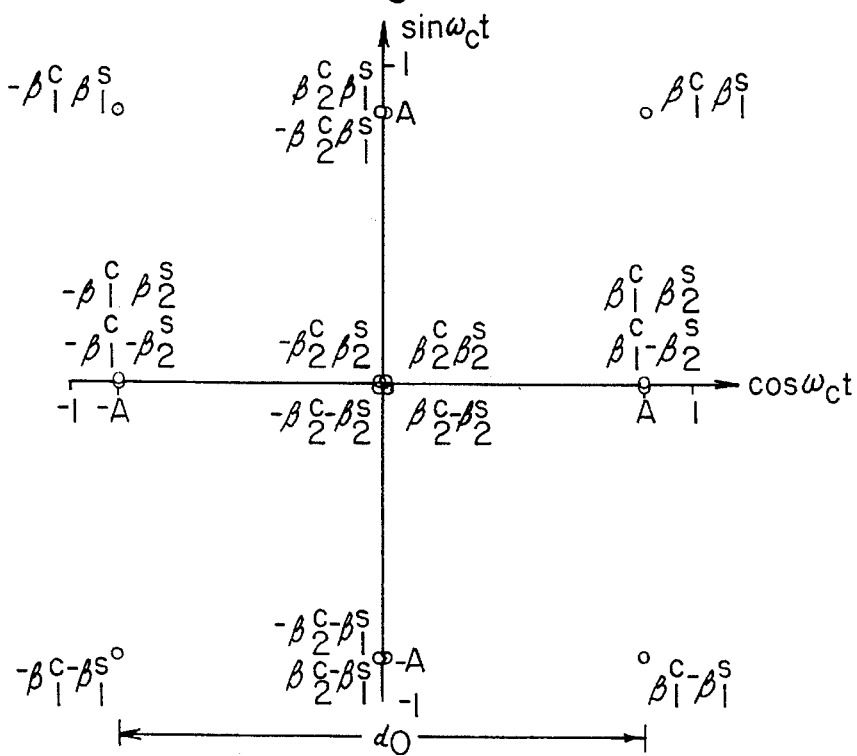
Figure 7:
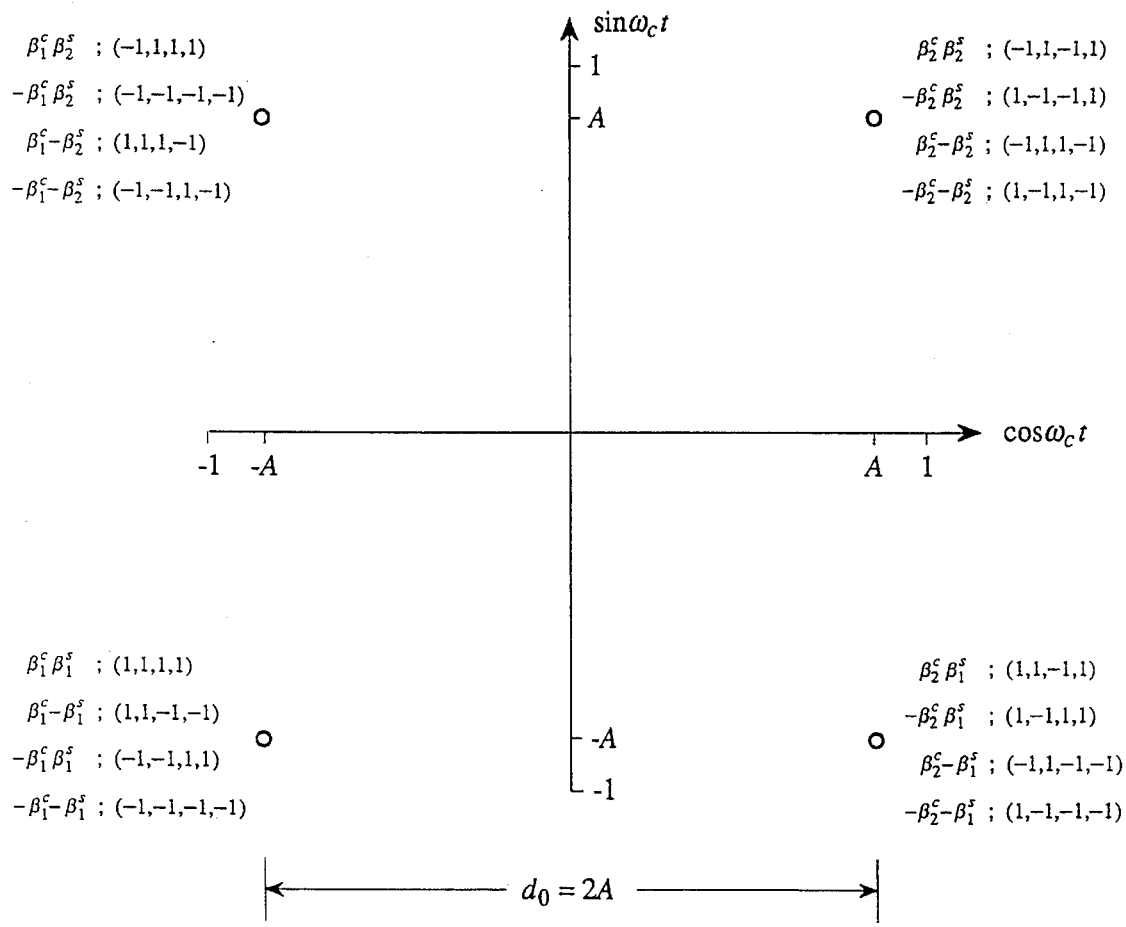
FIGS. 7a and 7b illustrate two possible mappings of the 32 points of the signal constellation of FIG. 6 into four points.

If sampling is performed on the signal 45 in the different time instances $\tau_1$ and $\tau_2$ according to FIG. 5 and the following description, the signal constellation of FIG. 6a is obtained. From FIG. 6a it is evident that the couple of pulses $\beta_1\beta_1$ in the time instance $\tau_1$ are in the center of the coordinate plane of the constellation. In the time instance $\tau_2$, the same couple of pulses $\beta_1\beta_1$ is positioned in (+A, +A) in the coordinate plane of the constellation in FIG. 6b. Thus, the two diagrams FIG. 6a and FIG. 6b provide a simple detection algorithm:

If a summation of the two samplings at $\tau_1$ and $\tau_2$ is performed, the constellation of FIG. 7a is obtained, which means that the 32 points of both constellations (FIG. 6) are mapped in only four points (FIG. 7a) with a maximum distance between two points of 2A, A being the maximum amplitude of the pulses.

Figure 7B:
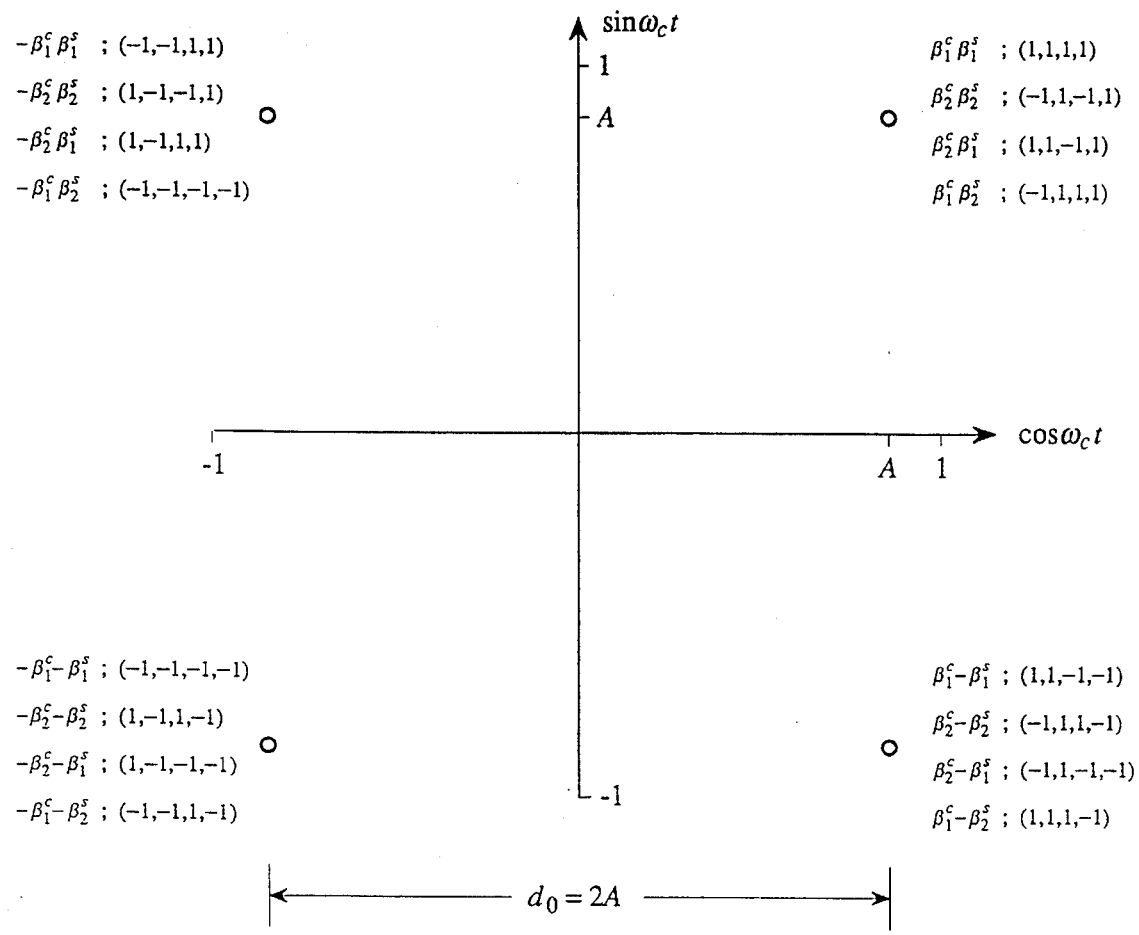

Thus, as the two samplings of a pulse is ±A and a zero, only a very simple detection method is required to determine which sampling gives the ±A value and, thus, the polarity of the pulse. If the absolute value of the two samplings is obtained and these values are subtracted, again 32 points of the constellation are mapped into four points as shown in FIG. 7b, the maximum distance between the points again being 2A. With this simple algorithm, the error performance of the system is improved.

Thus, the signals 45 and 46 each correspond to a couple of two pulses of the shape generated in the actual transmitter, each pulse having a duration of $4T_b$. For a time period of $16T_b$, the first two pulses are of correct polarity and the second two pulses are of inverse polarity compared to the actual information of the bit information defining the polarity of these pulses.

The circuit 47 is able to recover a clock signal from the signals 45 and 46 and to send a signal to a clock unit circuit 49 which produces square clock output signals 170 and 171 having cycle periods of $16T_b$ and $8T_b$, respectively, being synchronized with the signals 45 and 46 so that the phase of the signal 170 changes every $8T_b$ synchronized with the correct polarity of the received pulses. The clock unit circuit 49 further generates timing signals 172a and 173a being narrow pulses at time intervals $\tau_1+m4T_b$ and $\tau_2+m4T_b$ (m=0, 1, 2, . . . ). These signals 172a and 173a are also synchronized with the signals 45 and 46.

The block 36 represents a carrier recovery circuit which extracts the carrier signal from the input signal r(t) using a simple circuit providing the eighth power of the input signal and with a standard Phase-Locked Loop (PLL).

The block 47 represents a symbol timing recovery circuit which extracts the clock signal from the signals 45 and 46 by first squaring both signals and subtracting one from the other, this difference being led to a band-pass filter at clock frequency, and with a standard PLL.

The signals 45 and 46 are furthermore led to two sample and hold circuits 172, 173 and 172', 173', respectively.

In the following, a description of the decoding of the information coded into the signal 45 will be given. Of course, a similar method is applicable for the signal 46.

The sample and hold circuits 172 and 173 receive the timing signals 172a and 173a, respectively. The circuits 172 and 173 are adapted so that when they receive a timing signal, they sample the amplitude of the input signal and hold this amplitude until a new timing signal in input. Thus, the circuit 173 samples the amplitude of the signal 45 at time instance $\tau_1$ and the circuit 172 samples the amplitude of the signal 45 at time instance $\tau_2$. The position of the time instances for sampling a pulse may be varied in the circuit 49. Preferably, when using pulses of the shape of FIG. 5, samplings are performed at the time instances $\tau_1$ and $\tau_2$ shown in this figure. Thus, these are the two samples necessary for obtaining the information coded in a pulse in the signal 45.

In order to be able to process the outputs 174 and 175 of the circuits 172 and 173, respectively, the output 175 is delayed a time of $\tau_2-\tau_1$ in a circuit 176 to form a signal 177 as the samplings are performed at different times.

The now concurrent signals 177 and 174 are added in adder 178 to give a signal 179 directly corresponding to the polarity of the detected pulse of signal 45. The polarity of the detected pulse is obtained by transmitting the signal 179 through a hard limiter 180 which on output 181 generates the polarity of the detected pulse of signal 45. This is a direct detection of a ¼ of the bit information, and information concerning another ¼ of the bits is obtained from the output of the hard limiter 180'.

However, as described above, the polarity of the second of two pulses in a time interval of $8T_b$ is inverted compared to the bit information coded into this polarity. Thus, in the first period of $8T_b$, the polarity directly corresponds to the information of the bit defining the polarity, and in the second period of $8T_b$, the inverted polarity directly corresponds to the information of the bit. Inversion of the polarity to obtain the correct polarity of the bit is performed in an XOR-gate 182 which receives the signal 181 and the clock signal 170. The clock signal should be generated so that it is −1 in the first period of $8T_b$ and +1 in the next $8T_b$ so that the signal 181 is led directly through the XOR-gate 182 in the first $8T_b$ and where the polarity of the signal is inverted by the gate 182 in the next $8T_b$.

Thus, the polarity of the output 183 of the gate 182 corresponds directly to the polarity of the bit coded into the polarity of the pulse.

In order to obtain information about the shape of the pulse, the absolute values of the signals 174 and 177 are generated in circuits 184 and 185, respectively, and the output of the circuit 184 is subtracted from the output of the circuit 185 in circuit 186 and transferred into a hard limiter 187 for determination of the polarity of the result of the subtraction. As described above, when using the pulse shape shown in FIG. 5 the sign of the output of the circuit 186 will generate information about the shape of the pulse ($\beta_1$, corresponding to −1 or $\beta_2$, corresponding to +1).

In order to obtain the last bit of information, the output of the hard limiter 187 and of the gate 182 are input into an XOR-gate 188, the output of which is input into a second XOR-gate 190 together with the clock output signal 171 to finally generate a signal having the correct polarity compared to the information of the second bit coded into the pulse, as is seen from the below tables 3 and 4:.

TABLE 3

The time interval is $\{(16n - 2)T_b,(16n + 2)T_b\}, n = 0,1, \ldots, \infty$.

| Received pulse | $v_{id}$ | EXOR2 | $v_{pol}$ | $v_1$ | EXOR3 | $7_2$ | $v_2$ |
|---|---|---|---|---|---|---|---|
| $+\beta_1$ | −1 | ⊕ | +1 | +1 | ⊕ | −1 | +1 |
| $-\beta_1$ | −1 | ⊕ | −1 | −1 | ⊕ | −1 | −1 |
| $+\beta_2$ | +1 | ⊕ | +1 | −1 | ⊕ | −1 | −1 |
| $-\beta_2$ | +1 | ⊕ | −1 | +1 | ⊕ | −1 | +1 |
|  |  |  | ⇑ |  |  |  | ⇑ |

TABLE 4

The time interval is $\{(16n + 2)T_b,(16n + 6)T_b\}, n = 0,1, \ldots, \infty$.

| Received pulse | $v_{id}$ | EXOR2 | $v_{pol}$ | $v_1$ | EXOR3 | $7_2$ | $v_2$ |
|---|---|---|---|---|---|---|---|
| $+\beta_1$ | −1 | ⊕ | +1 | +1 | ⊕ | +1 | −1 |
| $-\beta_1$ | −1 | ⊕ | −1 | −1 | ⊕ | +1 | +1 |
| $+\beta_2$ | +1 | ⊕ | +1 | −1 | ⊕ | +1 | +1 |
| $-\beta_2$ | +1 | ⊕ | −1 | +1 | ⊕ | +1 | −1 |
|  |  |  | ⇑ |  |  |  | ⇑ |

Finally, the bit information is preferably converted into a single signal. In order to obtain the correct order of the bits into a parallel-to-serial converter, the output of the gates 190 and 182 are transferred to switches 194 and 195, which are controlled by the signal 171*i* and the signal 171, respectively, the signal 171*i* being signal 171 inverted in an inverter 189.

The output of the switches 194, 195, 194', and 195' are finally fed into a serial-to-parallel converter 196 which converts the four streams of square pulses with duration $4T_b$ to an output of serial bit information of duration $T_b$.

When the pulse shape is the camel shape shown in FIG. 3 ($\gamma_1$), the decoding may be performed extremely simply by means of only two sample and hold circuits for each carrier at time instances $\tau_{1a}$ and $\tau_{2a}$, respectively, each followed by a hard limiter. For each pulse shape out of the four possibilities ($\pm\gamma_1$, $\pm\gamma_2$), the output from the hard limiters is directly the combination of the two bits coded in the shape in the transmitter. This means that when the camel shape is used, the blocks 172 and 173 can be directly connected to the hard limiters 187 and 180, respectively, for the first carrier, and the blocks 172' and 173' can be directly connected to the hard limiters 187' and 180', and the four hard limiters can be connected directly to the parallel to serial converter 196, omitting all the other blocks shown. However, for bandlimited channels, it may be preferable to keep the distance between maximum and minimum unchanged by including equalizer blocks, as described above, to decrease possible intersymbol interference introduced by the bandpass filters at the output of the transmitter and at the input of the receiver.

Figure 17:
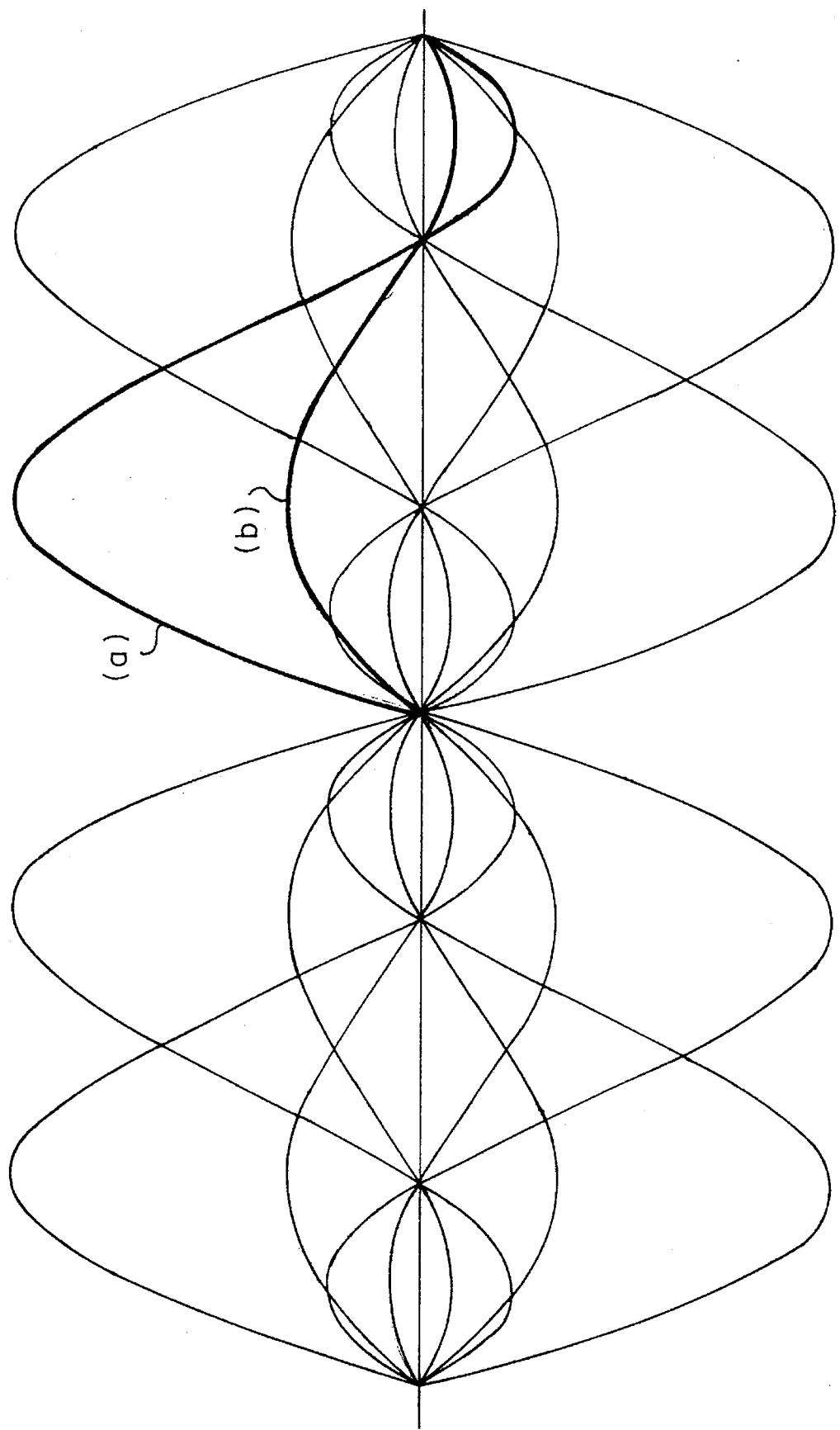
FIG. 17 illustrates an eye pattern of a 4A8D (4 Amplitudes, 8 Dimensions) signal.

FIG. 17 illustrates an eye pattern of a 4A8D (4 Amplitude level, 8 Dimension) signal, wherefrom it is obvious that four different amplitudes are present in the transmitted signal: two different amplitudes (see pulse (a) and (b)) in two different polarities. It is seen that the pulses (a) having the larger amplitude differ only in amplitude from the lower amplitude pulses (b). However, due to the larger number of bits encoded in each pulse, the pulses may be generated with a longer duration. The longer duration of the pulses produces a more narrow spectrum of the transmitted signal.

Furthermore, since in this embodiment three bits of information are encoded in each pulse, and because two orthogonal carrier signals are used, the spectral efficiency of a system using this strategy is 6 bits/s/Hz.

Figure 18:
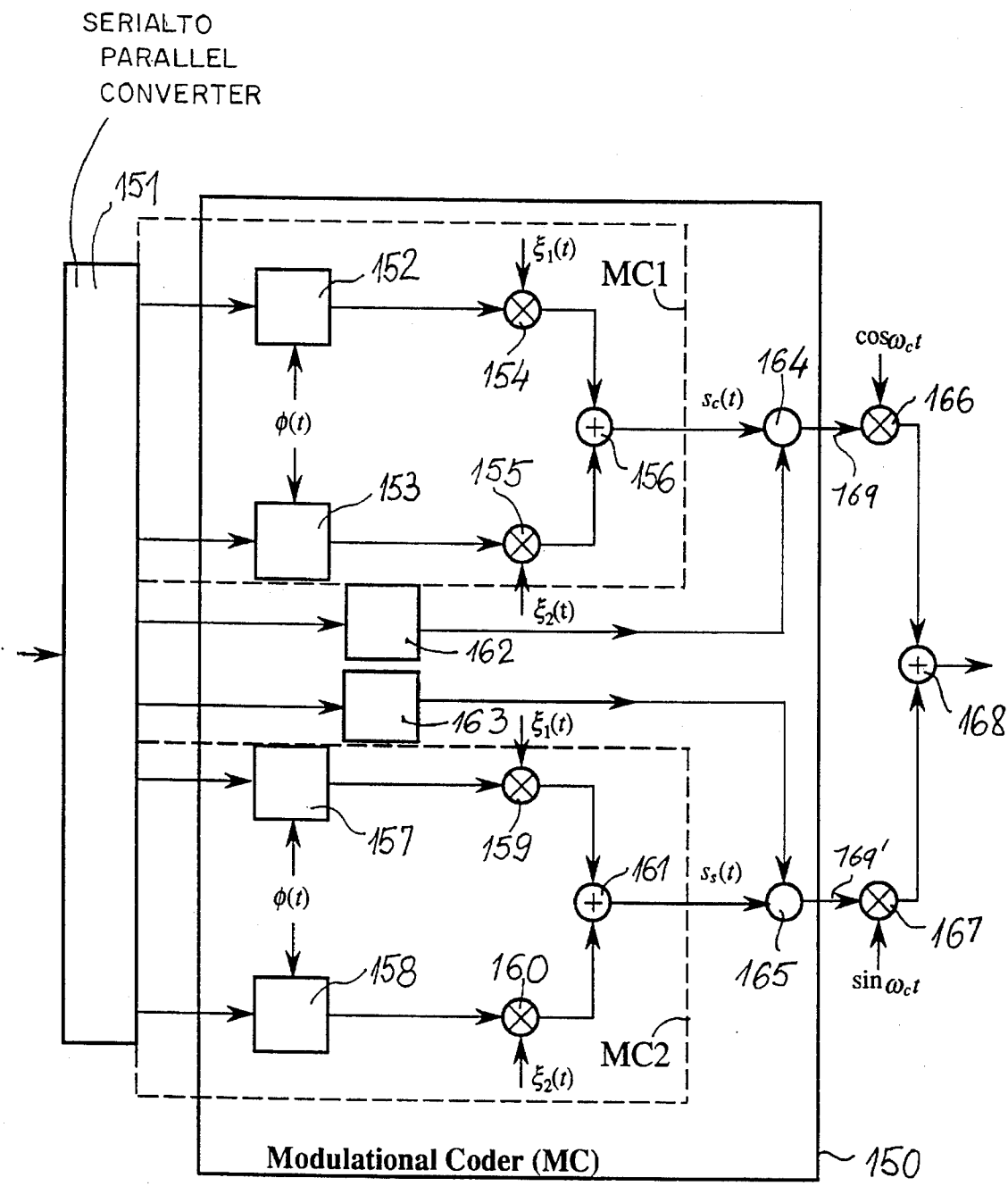
FIG. 18 is a block diagram of a 4A8D transmitter according to the invention.

FIG. 18 is a block diagram of a 4A8D transmitter, wherein additional bit information is coded into the amplitude of the pulses modulating the carrier signal.

This transmitter comprises a modulational coder 150 wherein two identical blocks MC1 and MC2 are incorporated: the first block MC1 comprising circuits 152, 153, 154, 155, and 156 and the second block MC2 comprising circuits 157, 158, 159, 160, and 161, respectively, both blocks having as inputs two signals from the serial to parallel converter S/P. Each pulse in the outputs $s_c(t)$ and $s_s(t)$ of the blocks MC1 and MC2, respectively, comprise two bits of information as described in connection with e.g. FIG. 9.

A third bit of information is coded in the amplitude of a generated pulse from $s_c(t)$ or $s_s(t)$ by converting the third bit of information from a value of −1 or +1 into a value of e.g. 1 or 3.

In the present embodiment, this conversion is in connection with the first block MC1 performed in the converter 162 where a constant 2 is added to the information of a bit. The result of this conversion is multiplied in multiplier 164 with the pulse output from the adder 156, whereby the resulting pulses 169 output from the multiplier 164 now contain three bits of information: two bits of information in the waveform in the signal $s_c(t)$ and one bit in the amplitude.

The same applies in connection with the second block MC2, wherein the third bit of information is convened in converter 163 and the multiplication of the pulse and the converted bit of information is performed in multiplier 165 to form output 169'.

Instead of the conversion performed in circuits 162 and 163 and the multiplication performed in 164 and 165, a simple operational amplifier may also be used for the amplification of the signals $s_s(t)$ and $s_c(t)$. The amplification of the amplifier may be controlled by controlling the resistor in the feedback loop of the amplifier by e.g. a switch operated in accordance to the information of the third bit so that if the bit is −1, no amplification is performed: the amplifier simply works as a voltage follower, and if the bit is +1, a different amplification, such as 3, is selected and the signal is amplified.

In this embodiment, the outputs 169 and 169' of the modulational coder 150 are used for modulation with two carrier signals in the mixers 166 and 167; the carrier signals are in the form of orthogonal sine-signals. The outputs of the mixers 166 and 167 are added by circuit 168 to give the output signal of the transmitter.

FIG. 19 illustrates a preferred embodiment of a modulational coder wherein a number of different pulse shapes may be used for the transmission of the information.

In this embodiment, a series of k bits $a_1-a_k$ of duration $T_b$ are transformed in a serial-to-parallel converter S/P into k square-wave pulses of duration $kT_b$. These pulses are led to a signal selector for selecting one of k=N waveforms $\zeta_1-\zeta_N$. The signal selector selects one output $x_i(t)$ with a pulse having a polarity of one of the k bits, a shape determined by the information of k−1 bits, and selected from the waveforms $\zeta_1-\zeta_N$, and having a duration of $kT_b$. The function v(t) selects which of the symbols $a_i \ldots a_k$ defines the polarity.

The different waveforms input into the signal selector may be generated in any suitable way, such as by means of synthesizers with gate area logic circuits designed for this purpose or by signal processing.

The embodiment of the invention illustrated in FIG. 19 does not only implement the use of more than two different shapes of pulses and, thus, the ability of generating and transmitting pulses having energy one and containing the information of more than two bits; it also incorporates the possibility of encrypting the transmitted information.

Encryption of the encoded information may be obtained both by varying the function v(t) so that different bits are used to define the polarity of the resulting pulse, and by using varying pulse shapes in the transmission.

Thus, when controlling the function v(t) with a selecting key of a random generator, a single bit of the information is the code to decryption of the signal with the possibility to make the k–1 bits dependent on the one bit selected by the function v(t). When this bit is randomly changed, decryption of the signal by unauthorized parties is difficult. In addition hereto, when the set pulse shapes $\zeta_1 \ldots \zeta_N$ used to carry the information is altered frequently, which may be performed by using only a part of the available number N of shapes for transmission, and replacing this part with other shapes from the N possible shapes, decryption of the signal by unauthorized parties is virtually impossible. On the other hand, decryption of the signal in the receiver used by the authorized person who has access to the key which is included in the function v(t) and optionally in the signal waveform generation may be performed in a number of ways.

Thus, an aspect of the invention relates to a system wherein encryption of the encoded information is obtained through means varying a pseudo-random function controlling a multiplexer wherein is selected one symbol of k input symbols, the one symbol carrying the information of one bit mapped into the polarity of the symbol and representing a key for the k–1 symbols, whereby, if the symbol is decoded incorrectly, all k–1 symbols are decoded incorrectly, authorized decryption of the encrypted information being performed in the decoding means on the basis of information on the pseudo-random function. The means varying the pseudo-random function is suitably a programmable circuit generating the pseudo-random function, permitting different patterns of the pseudo-random function. In such a system, the decoding means will suitably comprise a programmable circuit identical to the circuit generating the pseudo-random function, the function generated by the identical circuit being syncronized with the signal received. When the system is both a transmitter and a receiver, comprising both a coding means and a decoding means, the circuit generating the pseudo-random function may be one circuit which drives both the coder and the decoder, the synchronization of the function with which the decoder is driven being obtained from the received signal.

Figure 20:
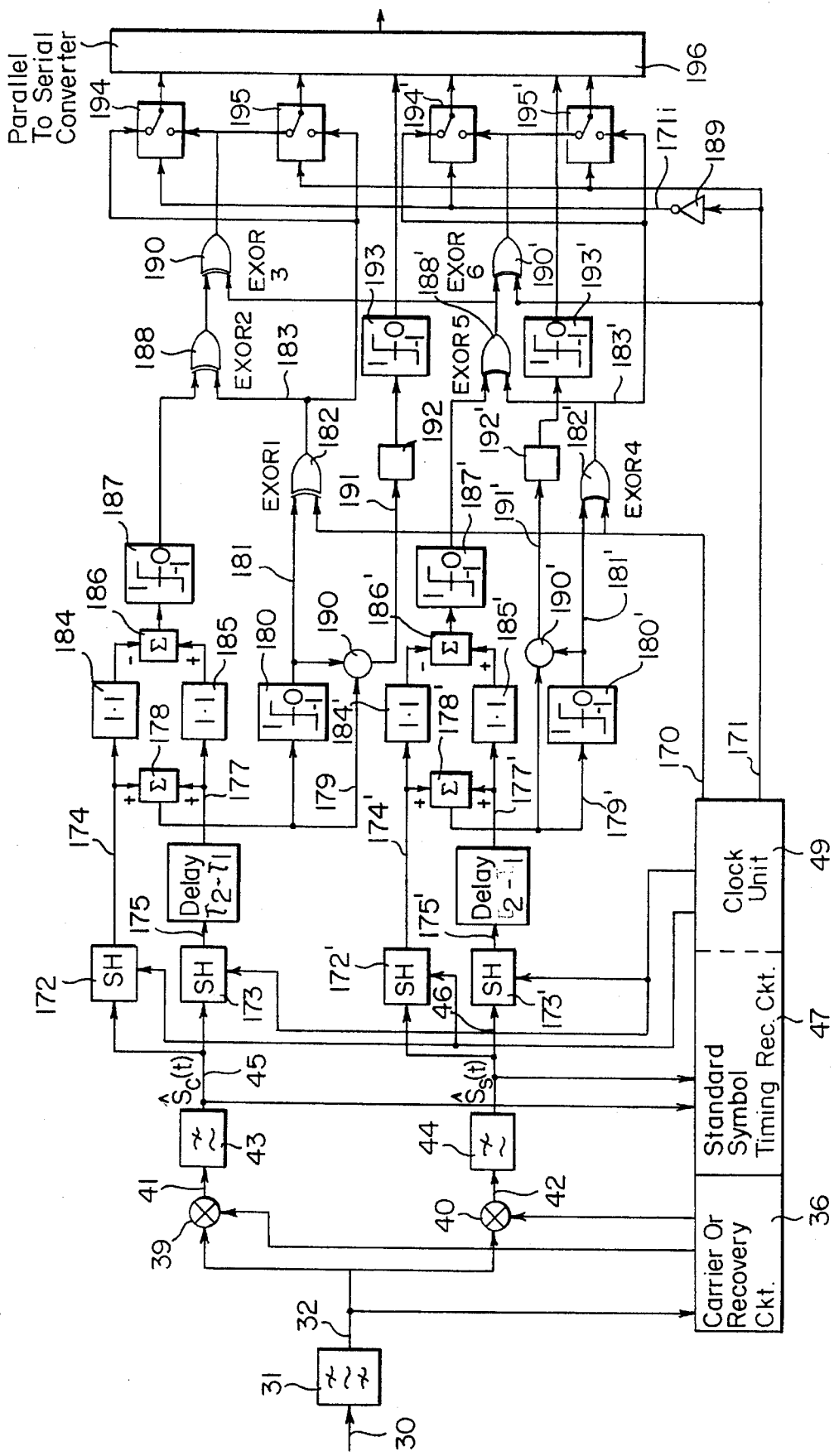
FIG. 20 is a block diagram of a 4A8D receiver according to the invention.

FIG. 20 is a block diagram of a 4A8D receiver, which is similar to that of FIG. 16. The difference between the embodiment of FIG. 16 and the present embodiment is that in each channel a multiplier 190 (and 190') is used to obtain the absolute value of the signal 179 (179') by multiplying the Signal 179 (179') with the signal 181 (181') which is a replica of itself. This absolute value 191 (191') is level shifted in a level shifter 192 (192') where a suitable selected constant value, typically in the order of 2 for amplitude values 1 and 3, is subtracted from the value 191 (191').

The output of level shifter 192 (192') is fed into a hard limiter 193 (193') which extracts the third bit of information coded into the amplitude of the signal, as the hard limiter 183 (193') outputs −1 if the amplitude of the signal 179 (179') is lower than the subtracted constant and +1 if the amplitude of the signal 179 (179') is higher than the constant.

When the pulse shape is the camel shape shown in FIG. 3 ($\gamma_1$), the decoding may be performed extremely simply by means of only two sample and hold circuits for each carrier at time instances $\tau_{1a}$ and $\tau_{2a}$, respectively, each followed by a hard limiter.

For each pulse shape out of the four possibilities ($\pm\gamma_1$, $\pm\gamma_2$), the output from the hard limiters is directly the combination of the two bits coded in the shape in the transmitter. This means that when the camel shape is used, the blocks 172 and 173 can be directly connected to the hard limiters 187 and 180, respectively, for the first carrier, and the blocks 172' and 173' can be directly connected to the hard limiters 187' and 180', and the four hard limiters can be connected directly to the parallel to serial converter 196, omitting all the other blocks shown, except that the multipliers 190 and 190', the level shifters 192 and 192' and two additional hard limiters 193 and 193' are included. Thus, from the six hard limiters 187, 180, 193, 187', 180' and 193', six bits of information are led directly to the parallel to serial converter 196. Also in this case it is preferred for bandlimited channels to keep the distance between maximum and minimum unchanged by including carefully designed equalizer blocks to decrease possible intersymbol interference introduced by the bandpass filters at the output of the transmitter and at the input of the receiver.

Figure 21:
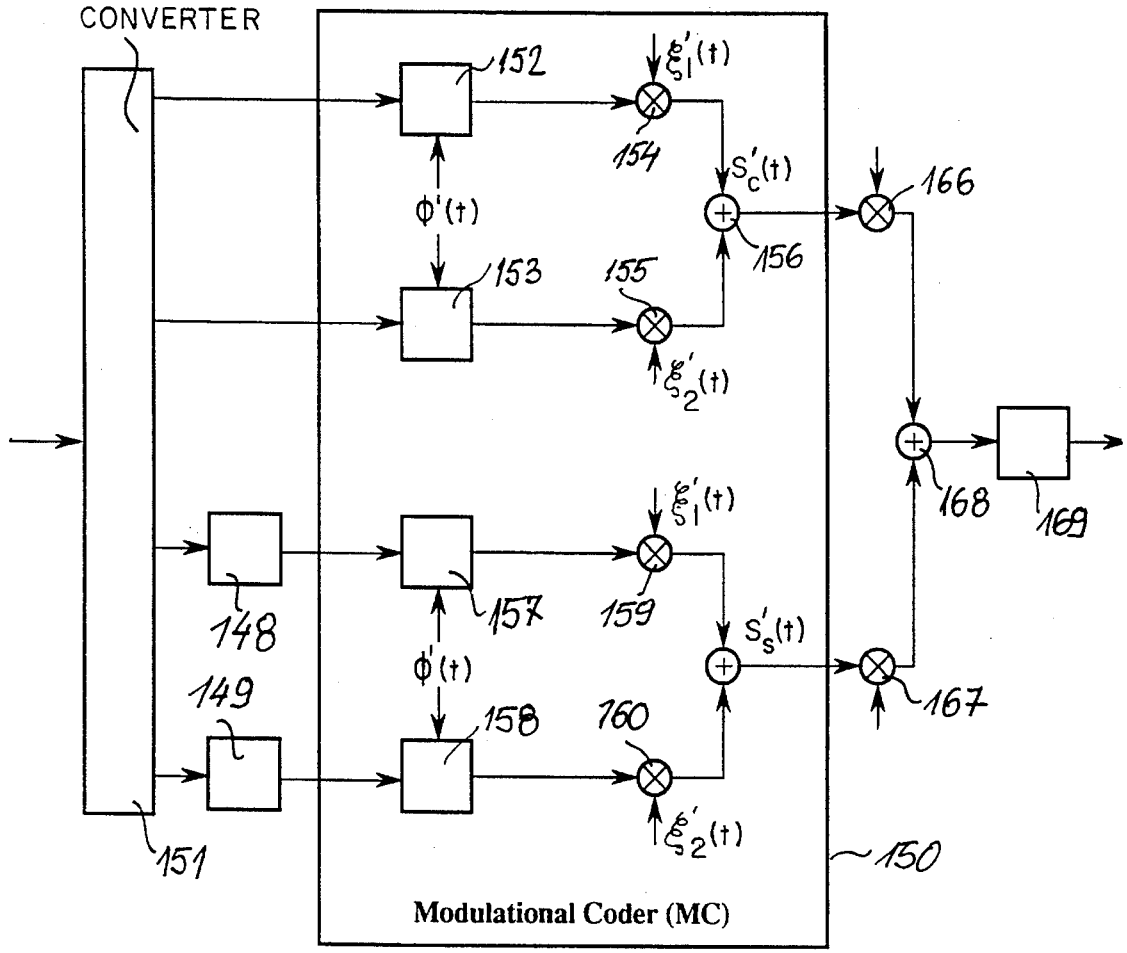
FIG. 21 is a block diagram of an 8DCE (8 Dimensions, Constant Envelope) transmitter according to the invention.

FIG. 21 is a block diagram of an 8DCE (8 Dimensions, Constant Envelope) transmitter wherein the envelope of the output signal is constant.

The problem in amplifying signals for transmission over large distances, such as from ground to space and reverse and terrestrial communication, is that a large amplification is typically required which means that the amplifier is preferably driven close to the saturation level of the amplifier. The amplifier used for this purpose is typically a TWTA (Travelling Wave Tube Amplifier) or a class C amplifier. Driving an amplifier at the saturation point requires the signals on the input to have a constant envelope as this signal is less sensitive to distortion introduced by the amplifier.

Degradation of a signal with a non-constant envelope is produced by the TWTA, because AM/AM and AM/PM conversion is introduced in the transmitted signal.

Thus, to avoid this effect, signals having non-constant envelope are generally amplified at a point where the characteristic of the amplifier is linear. This situation is normally not preferred, as relatively larger amplifiers are required to obtain a certain output power.

The signal generated by the preferred embodiments of the transmitters according to the invention do not have constant envelopes. This problem is solved by a simple hard limiter which converts the non-constant envelope to a constant envelope as is evident in FIG. 24.

The present embodiment comprises a modulational coder MC of any type described above and outputting two signals $s_c(t)$ and $s_s(t)$ which are to be used for modulation.

The signals input into MC are generated by a serial-to-parallel converter 151 from a serial signal as described earlier. Two of the square pulses from the output of S/P converter are delayed a period of $2T_b$ in delay circuits 148 and 149 before being coded into the signal $s_s(t)$ in the modulational coder 150. Thus, the signal $s_s(t)$ is delayed $2T_b$ compared to the signal $s_c(t)$ at the output of 150 (e.g. the signals $\phi'(t)$, $\zeta_1'(t)$, $\zeta_2'(t)$ and $s_s'(t)$ are delayed by $2T_b$ with respect to $\phi(t)$, $\zeta_1(t)$, $\zeta_2(t)$ and $s_c(t)$).

These signals are used for modulation as described above, and the modulated signal is transmitted through a hard limiter 169 which forms the output to the transmitter. This final signal has constant envelope.

Figure 22:
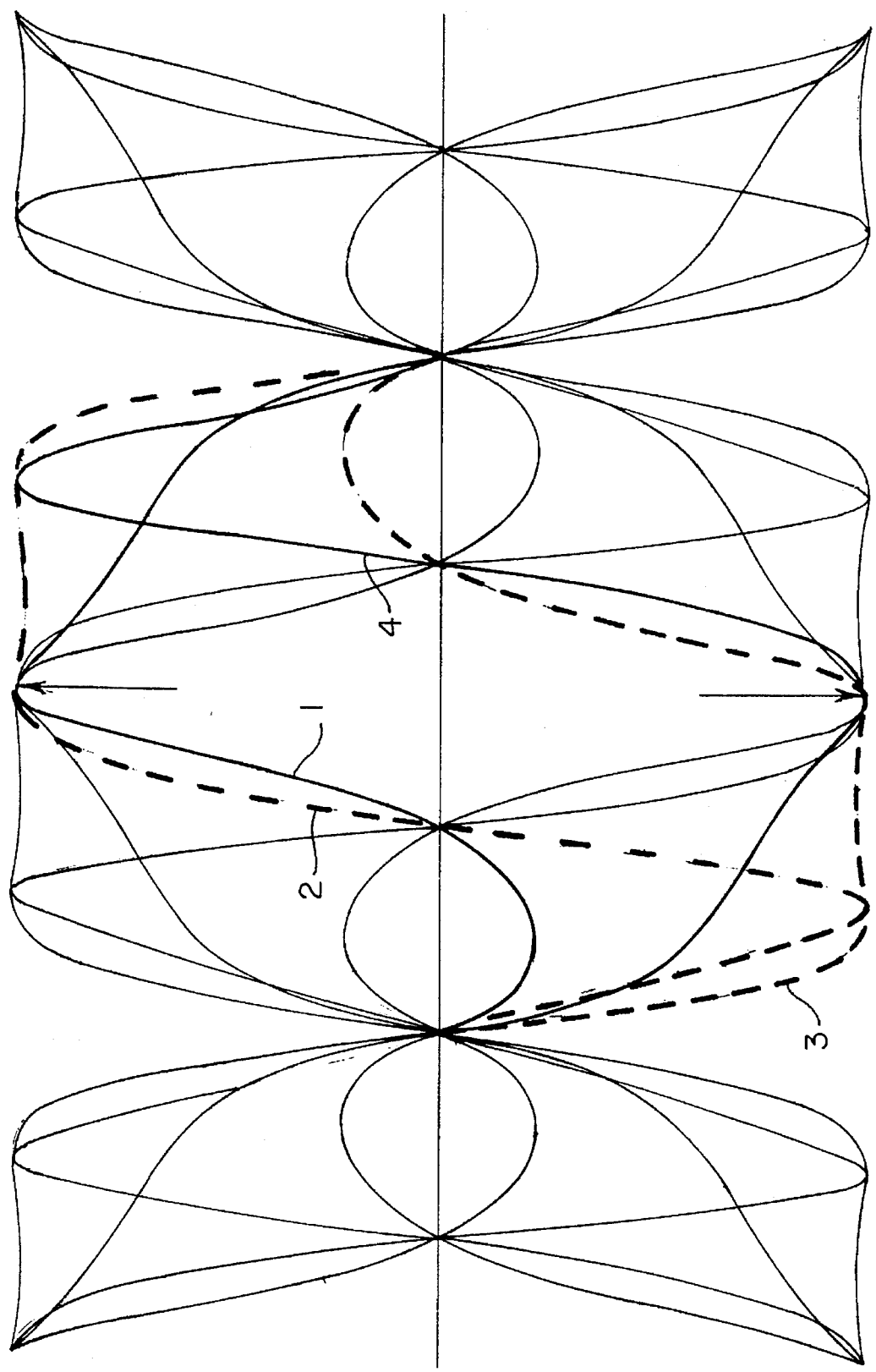
FIG. 22 illustrates an eye pattern of an 8DCE signal.

FIG. 22 illustrates an eye pattern of an 8DCE from which k is seen that the signal transmitted into the hard limiter (see FIG. 25) is altered: each of the β-waveforms is transformed into four basic waveforms of the types illustrated in FIG. 22. The basic waveforms are obtained in the time interval of $4T_b$ as one waveform (1) in this time interval in one channel modified by influence from two waveforms (the last $2T_b$ of one waveform (1') and the first $2T_b$ of a third waveform (1")) in another channel.

|  | (a) | (b) |
|---|---|---|
| type 1: | $(1) = \pm\beta_1$ | $(1) = \pm\beta_2$ |
|  | $(1') = |\beta_1|, (1") = |\beta_2|$ | $(1') = |\beta_1|, (1") = |\beta_2|$ |
| type 2: | $(1) = \pm\beta_1$ | $(1) = \pm\beta_2$ |
|  | $(1') = |\beta_2|, (1") = |\beta_2|$ | $(1') = |\beta_1|, (1") = |\beta_1|$ |
| type 3: | $(1) = \pm\beta_1$ | $(1) = \pm\beta_2$ |
|  | $(1') = |\beta_1|, (1") = |\beta_1|$ | $(1') = |\beta_2|, (1") = |\beta_2|$ |
| type 4: | $(1) = \pm\beta_1$ | $(1) = \pm\beta_2$ |
|  | $(1') = |\beta_2|, (1") = |\beta_1|$ | $(1') = |\beta_2|, (1") = |\beta_1|$ |

The pulses in column (a) are the time reverse of those of column (b). It is seen that the polarity is defined by the pulse (1) and that the shape is defined by all three β pulses (1), (1'), and (1").

Pulse 1 in the figure is a type 1 pulse from column (a) having positive polarity, pulse 2 is a type 4 pulse from column (a) having positive polarity, pulse 3 is a type 3 pulse from column (b) having negative polarity, and pulse 4 is a type 4 pulse from column (b) having negative polarity.

Figure 23:
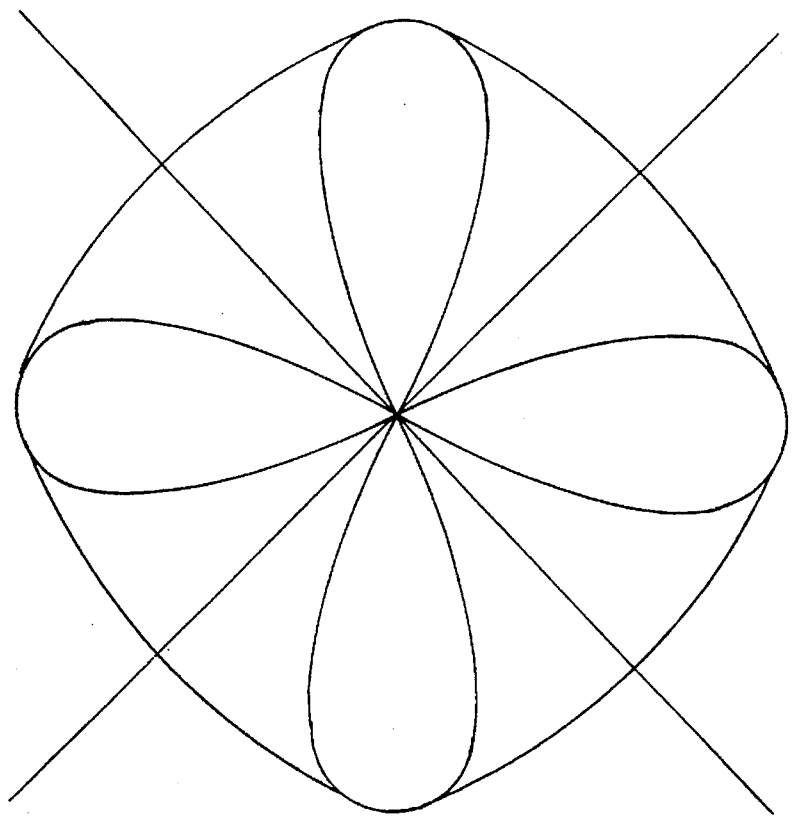
FIG. 23 is an IQ diagram for a 8D-4P2C signal.

FIG. 23 is an IQ diagram for a 8D-4P2C signal as transmitted by a transmitter as is shown e.g. in FIGS. 10 or 11 which has a non-constant envelope when a pulse shape as seen in FIG. 5 is used.

Figure 24:
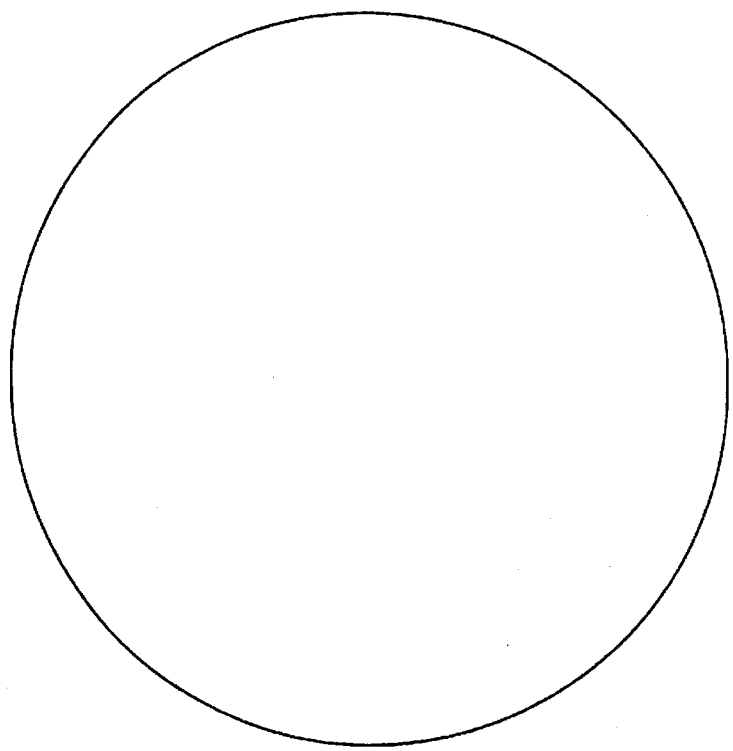
FIG. 24 is an IQ diagram for a 8DCE signal.

FIG. 24 is an IQ diagram for a 8DCE signal as transmitted by a transmitter as seen in FIG. 21 in which a constant envelope has been generated when a pulse shape as seen in FIG. 5 is used.

Figure 25:
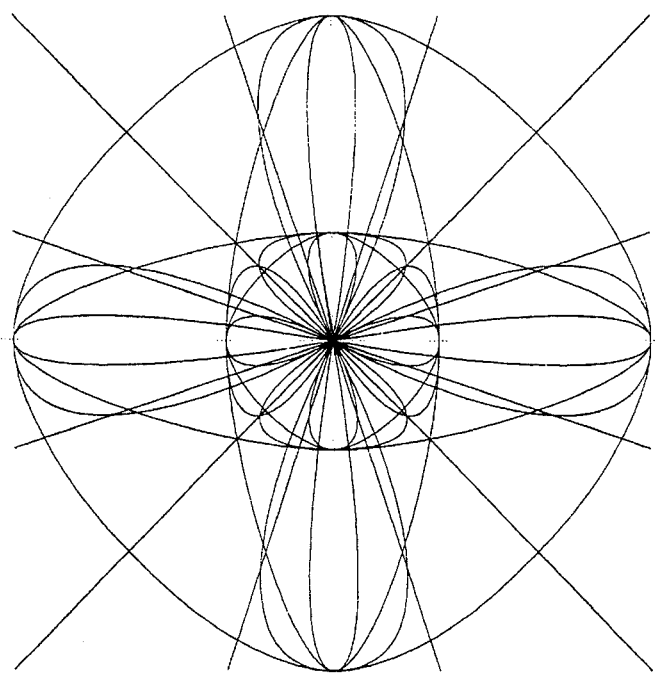
FIG. 25 is an IQ diagram for a 4A8D signal.

FIG. 25 is a IQ diagram for a 4A8D signal as transmitted by a transmitter as seen in FIG. 18 not having a non-constant envelope, and using a pulse shape as seen in FIG. 5 and amplitude-amplification factors 1 and 3 as illustrated in FIG. 17.

Figure 26:
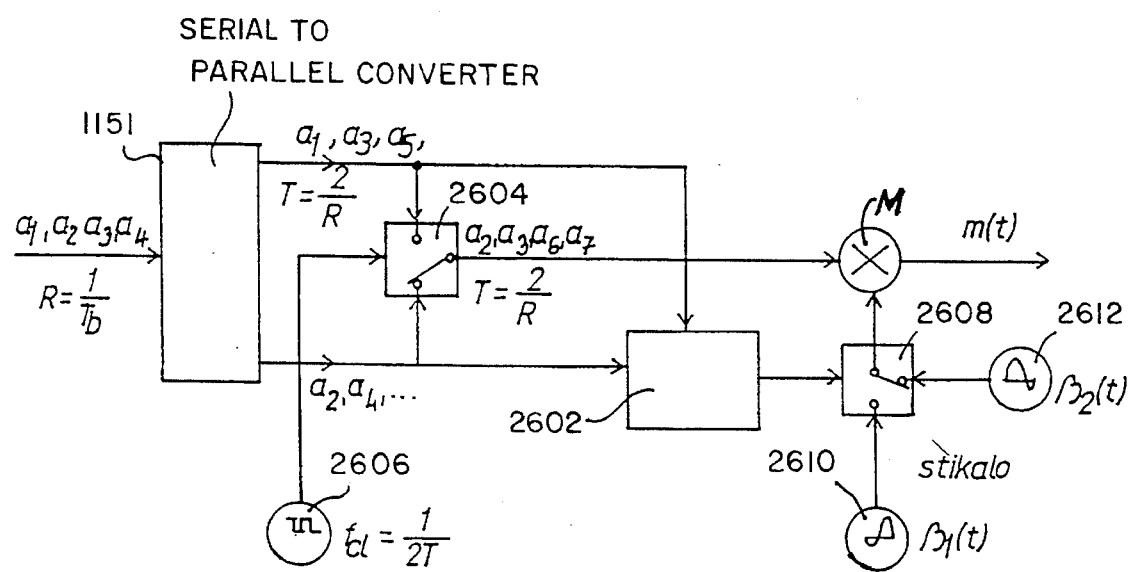
FIG. 26 is an embodiment of a modulational coder according to the invention.

FIG. 26 is an embodiment of a simple modulational coder according to the invention, representing an alternative solution to FIG. 9. In the modulational coder of FIG. 26, a serial signal of bits $a_1-a_4$ of duration $T_b$ is convened in a serial-to-parallel converter 151 into two parallel streams of square pulses: $a_1, a_3, a_5, \ldots$ and $a_2, a_4, a_6, \ldots$, respectively, each pulse having pulse duration $2T_b$. These streams of pulses are input into a switch 2604 and into a selector 2602. The switch 2604 is controlled by a square wave function generator 2606 having a period of $4T_b$, whereby every second square pulse in the streams of pulses is selected: $a_2, a_3, a_6, \ldots$.

The selector 2602 performs a selection on the basis of the input pulses of the two streams of square pulses and outputs a signal for controlling a second switch 2608. This switch 2608 selects one of the two waveforms $\beta_1(t)$ or $\beta_2(t)$ generated by two waveform generators 2610 and 2612, respectively.

The waveform chosen by the second switch SW2 is multiplied in a multiplier M with the square pulse selected by the switch SW1 and thereby obtains a polarity corresponding to that of the square pulse from SW1 to form a final output m(t). Thus, this final output m(t) is a pulse containing two bits of information: one bit of information in the polarity of the pulse, and a waveform determined by the two square pulses input into SL, depending on the selection method incorporated in selector SL.

We claim:

1. A method for performing transmission of digital information by generating coded signals in the form of pulses on the basis of binary digital information and decoding the coded signals into the binary digital information, comprising the steps of:

generating pulses of at least two distinctly different shapes, coding in each pulse one bit of information in a polarity of each pulse and coding bit information in a shape of each pulse and decoding from each pulse the one bit information from the polarity of each pulse and the further bit information from the shape of each pulse.

2. A method for performing transmission of digital information by generating coded signals in the form of pulses on the basis of binary digital information and decoding the coded signals into the binary digital information, comprising the steps of:

generating pulses of at least two distinctly different shapes, coding in each pulse, at least two bits of information, at least one bit of information being coded in a shape of each pulse, and decoding from each pulse the an least two bits of information, the at least one bit of information being decoded from the shape of each pulse.

3. The method of claim 2, wherein the decoding of the bit information from the shape of each pulse is based on an amplitude of each pulse.

4. The method of claim 2, wherein each pulse begins or ends with an amplitude of substantially zero.

5. The method of claim 2, wherein each pulse begins and ends with an amplitude of substantially zero.

6. The method of claim 2, wherein the shape of each pulse is are synthesized.

7. The method of claim 2, wherein the pulses are electrical pulses.

8. The method of claim 2, wherein at least part of the pulses are normalized to energy one.

9. The method of claim 8, wherein additional bit information is coded in the shape of each pulse by generating pulses of additional shapes corresponding to basic shapes of energy one, each of the additional shapes differing by at least one amplitude level from an amplitude level of a corresponding basic shape, and the additional bit information is decoded from each additional shape.

10. The method of claim 9, wherein one additional bit information is coded in the shape of each pulse by generating pulses of additional shapes corresponding to basic shapes of energy one, each of the additional shapes differing by one amplitude level from the amplitude level of an adjacent basic shape, and the additional one bit information is decoded from each additional shape.

11. The method of claim 9, wherein, when one additional bit information is coded in the shape of each pulse, a difference between an amplitude of the basic shape and an amplitude of each additional shape is larger than one, and when more than one additional bit information is coded in the shape of each pulse a difference between amplitudes of two additional shapes is larger than one.

12. The method of claim 2, wherein the shape of each pulse defines at least two different amplitudes distinguishable by decoding each pulse.

13. The method of claim 12, wherein the shape of each pulse defines two different amplitudes distinguishable by decoding each pulse.

14. The method of claim 13, wherein each pulse has at least two distinctly different shapes that have substantially maximum amplitudes at the same point.

15. The method of claim 12, wherein each pulse has at least two distinctly different shades such that a first of the at least two distinctly different shape has a substantially maximum amplitude where a second of the at least two distinctly different shapes has a substantially minimum amplitude.

16. The method of claim 15, wherein the at least two distinctly different shapes are a time reverse of each other.

17. The method of claim 16, wherein each pulse is obtained by addition or subtraction of a sine- and a cosine-like function, a frequency of a first of the sine- and cosine-like functions being substantially twice that of a frequency of a second of the sine- and cosine-like functions.

18. The method of claim 12, wherein each pulse has at least two distinctly different shapes such that a first of the at least two distinctly different shapes has a substantially maximum amplitude where another of the at least two distinctly different shapes has an amplitude which is substantially zero.

19. The method of claim 2, wherein each pulse is generated by converting a set of k bits, where k is an integer greater than 1, from one or more input signals into a pulse having a polarity corresponding to information of one bit of the set of k bite and having one shape out of at least k possible shapes which corresponds to information of the remaining k–1 bits of the set of k bits.

20. The method of claim 19, wherein, before each pulse is generated, each set of the k bits is converted into k pulses having a duration time of substantially k times a time duration of the k bits from the one or more input signals.

21. The method of claim 19, wherein k is 2.

22. The method of claim 21, wherein each pulse is generated by transforming two bits with two even functions into two pulses, transforming the two pulses with two orthogonal functions into two orthogonal pulses and subsequently adding or subtracting the two orthogonal pulses to form a final pulse.

23. The method of claim 22, wherein the two even functions are substantially identical.

24. The method of claim 22, wherein the two orthogonal functions are a sine- and a cosine-like function, respectively.

25. The method of claim 24, wherein the two orthogonal functions are sine and a cosine function, respectively.

26. The method of claim 22, wherein the orthogonal pulses have at least twice a bit duration of the information bits when the information bits are input in one input signal and at least one bit duration when the information bits are input in two input signals.

27. The method of claim 21, wherein each pulse is generated by converting one bit of a pair of bits into a pulse with at least twice a bit duration of the information bite when the information bits are input in one signal and at least once the bit of duration when the information bits are input in two input signals and having a polarity corresponding to the information of a first bit of the pair of bits and a shape corresponding to the information of a second bit of the pair of bits.

28. The method of claim 2, wherein each pulse is obtained from a sine- or cosine-like functions.

29. The method of claim 28, wherein each pulse is obtained by addition or subtraction of sine- and cosine-like functions.

30. The method of claim 28, wherein each pulse is obtained by addition or substraction of a sine- and a cosine-function.

31. The method of claim 28, wherein the sine- or cosine-like functions are substantially zero at a beginning and at an end of each pulse.

32. The method of claim 2, wherein input information of mk bits is converted into m information inputs, where m is an integer, of each of k symbols, and each of the m information inputs is transformed into coded pulses, a stream of the coded pulses modulating a signal of a set of m sine- and cosine-like signals, and the m modulated signals are summed as a single signal to be transmitted.

33. The method of claim 32, wherein pairs of sine- and cosine-like signals of the m sine- and cosine-like signals are mutually orthogonal.

34. The method of claim 32, wherein the sine- and cosine-like signals are sine and cosine signals.

35. The method of claim 32, wherein k is 2.

36. The method of claim 32, wherein the transmitted signal is demodulated by a set of m sine- and cosine-like signals coherent with the set of m sine- and cosine-like signals used in modulation for transmission.

37. The method of claim 32, wherein m is 2.

38. The method of claim 37, wherein an input information of 4 bits is converted into 2 information inputs of each of 2 symbols, and each of the 2 information inputs is transformed into coded pulses, a stream of the coded pulses modulating an orthogonal set of sine- and cosine signals, and the 2 modulated signals are summed as a single signal to be transmitted.

39. The method of claim 38, wherein one of the coded pulses modulating a carrier signal is offset in time with respect to another carrier modulating pulse.

40. The method of claim 39, wherein one of the coded pulses modulating a carrier signal is offset half a pulse duration.

41. The method of claim 39, wherein a non-constant envelope signal of a transmitter from which a signal including the two summed modulated signals is transmitted is converted into a constant envelope signal by a limiter at an output of the transmitter.

42. The method of claim 41, wherein the limiter is a hard limiter.

43. The method of claim 2, wherein decoding of each pulse includes identifying a shape of each pulse and converting information contained in the shape of each pulse into corresponding input information bit or bits.

44. The method of claim 43, wherein one bit of information is decoded from a polarity of each pulse.

45. The method of claim 44, wherein conversion of the polarity and the shape of each pulse into corresponding input information bits is obtained by comparing the polarity and the shape of each pulse with a predefined relationship between each particular combination of polarity and shape and a corresponding set of values of information bits.

46. The method of claim 44, wherein the predefined relationship is stored in memory having a number of inputs for inputting information relating to the shape and polarity of each pulse and a number of outputs for outputting information on the bits, the number of inputs and outputs being at least equal to a number of information bits carried in each pulse.

47. The method of claim 44, wherein the polarity and the shape of each pulse are identified by sampling an amplitude of each pulse in a time interval represented by a duration of each pulse.

48. The method of claim 47, wherein the sampling is performed at least as many times per time interval as bits coded in each pulse.

49. The method of claim 48, wherein the sampling is performed as many times per time interval as bits coded in each pulse.

50. The method of claim 48, wherein two bits are coded in each pulse, and the sampling is performed at least twice per time interval.

51. The method of claim 50, wherein two bits are coded in each pulse, and sampling is performed twice per time interval.

52. The method of claim 51, wherein a first sampling result is obtained at a first point in time and a second sampling result is obtained at a second point in time, the polarity of each pulse being determined by comparing the first sampling result and the second sampling result, and the shape of each pulse being identified by comparing absolute values of the first sampling result and the second sampling result.

53. The method of claim 52, wherein each coded pulse includes a first and a second shape each having two possible polarities, wherein the two shapes being so adapted the first shape has a maximum amplitude where the second shape has an amplitude which, is substantially zero, and the second shape has a maximum amplitude where the first shape has an amplitude which is substantially zero, and wherein the first sample is obtained at a point in time corresponding to a point in time where the first shape has substantially maximum amplitude, and the second sample is obtained at a point in time corresponding to a point in time where the second shape has substantially maximum value.

54. The method of claim 53, wherein the polarity of the first and second shapes is positive when the sum of the first and the second sampling results is positive, the polarity of the first and second shapes is negative when the sum is negative, the shape of each coded pulse is the first shape when an absolute value of the second sampling result is greater than an absolute value of the first sampling result, and the shape of each coded pulse is the second shape when the absolute value of the first sampling result is greater that the absolute value of the second sampling result.

55. The method of claim 43, wherein the shape of each pulse is such that all shapes have substantially maximum amplitude at the same point, and the polarity of each pulse is determined by a single sampling at the same point.

56. The method of claim 55, wherein the shape of each pulse is such that all shapes have substantially maximum amplitude at a point (A) and the shape of each pulse is such that one shape has a maximum amplitude at a point (B) where another shape has an amplitude which is substantially zero, and wherein the polarity and the shape of each pulse are determined on the basis of two samples, one sampling determining an amplitude at the point (A) where both shape have substantially maximum amplitude, the other sampling determining the amplitude at point (B) where one shape has a maximum amplitude at a point where the other shape has an amplitude which is substantially zero, and the polarity is determined from sample (A) and the shape is determined from the absolute values of sample (A) and sample (B).

57. The method of claim 56, wherein the polarity is determined from a sign of sample (A) and the shape is determined from a sign of a difference between the absolute values of sample (A) and sample (B).

58. The method of claim 43, wherein the decoding of each pulse is performed by directly converting information contained in the shape of each pulse into the corresponding input information bits.

59. The method of claim 58, wherein each pulse has energy one and shapes of each pulse are such that all shapes have a substantially maximum amplitude at a same point (A) and the shape of each pulse are such that one shape has a substantially maximum amplitude at a point (B) where another shape has a substantially minimum amplitude, and wherein two bits of information are determined on the basis of two samplings, one sampling determining an amplitude at the point (A), and a second sampling determining an amplitude at the point (B), information from the two samplings directly representing two bits of information.

60. A system for performing transmission of digital information by generating coded signals in the form of pulses based on binary digital information of bits and decoding the coded signals into the binary digital information, the system comprising:

coding means adapted to receive as an input, sets of at least two bits of information and to generate as an output, pulses of at least two distinctly different shapes, coding into each pulse at least two bits of information, at least one bit of information being coded in a shape of each pulse, transmitter means for transmitting each pulse, receiving means for receiving each transmitted pulse, and decoding means adapted to decode from each received pulse the at least two bits of information, at least one bit of information being decoded from the shape of each pulse.

61. The system of claim 60, wherein the at least one bit of information coded into the shape of each pulse is coded as amplitude information at a particular point in a time duration of each pulse adapted to be a sampling point in the decoding of each pulse.

62. The system of claim 60, wherein said coding means is adapted to code one bit of information into a polarity of each pulse and further bit information into a shape of each pulse, and said decoding means is adapted to decode one bit of information from the polarity of each pulse and further bit information from the shape of each pulse.

63. The system of claim 60, wherein said coding means is adapted to code two bits of information into the shape of each pulse, and said decoding means is adapted to decode the two bits of information from the shape of each pulse.

64. The system of claim 60, wherein said coding means includes means for transforming two bits of information into two pulses, means for transforming the two pulses into two orthogonal pulses, and means for adding the two orthogonal pulses into a single pulse.

65. The system of claim 60, wherein said decoding means includes means for sampling an amplitude of each pulse for obtaining amplitude information at at least one point in time during a duration of each pulse.

66. The system of claim 60, wherein said decoding means includes means for sampling an amplitude of each pulse for obtaining amplitude information at at least two points in time during a duration of each pulse.

67. The system of claim 60, wherein said coding means further includes a hard limiter for converting a non-constant envelope signal into a constant envelope signal.

68. The system of claim 60, wherein said coding means is adapted to code k bits into k−1 shapes, where k is an integer greater than 1, and 2(k−1) amplitude levels.

69. The system of claim 68, wherein said coding means is adapted to code 3 bits into 2 shapes and 4 amplitudes.

70. The system of claim 60, wherein encryption of the encoded information is obtained by means for varying a pseudo-random function controlling a multiplexer wherein one symbol of k input symbols is selected, where k is an integer greater than 1, the one symbol carrying information of one bit mapped into a polarity of the one symbol and representing a key for the k−1 symbols, whereby, when the one symbol is decoded incorrectly, all k−1 symbols are decoded incorrectly, and authorized decryption of the encrypted information is performed in said decoding means based on information on the pseudo-random function.

71. The system of claim 70, wherein said means for varying the pseudo-random function is a first programmable circuit generating the pseudo-random function, permitting different patterns of the pseudo-random function.

72. The system of claim 71, wherein said decoding means includes a second programmable circuit identical to the first programmable circuit generating the pseudo-random function, a function generated by the second programmable circuit being synchronized with a signal received.

73. The system of claim 71 wherein said system is a transmitter-receiver and includes both said coding means and said decoding means, the first programmable circuit generating the pseudo-random function being one circuit which drives both said coding means and said decoding means, a synchronization of a function with which said decoding means is driven being obtained from a received signal.

74. The system of claim 60, wherein said coding means is adapted to convert k bits of information, where k is an integer grater than 1, into pulses of k shapes, said system further comprising modulation means which modulates a carrier with each pulse from said coding means, and said decoding means includes demodulator means adapted to extract the carrier from each pulse and wherein said decoding means is adapted to convert each of the k pulses into k bits of information.

75. The system of claim 74 wherein said system is an optical system where bit information is first transformed into coded pulse information which then modulates light emitted from a light source, and the light emitted from the light source is transmitted to and through an optical fibre and is received by a light detector wherein an output of the light detector is decoded into the bit information.

76. The system of claim 75, wherein k is 2, whereby said optical system has twice a capacity and an identical error performance for about double distance between two optical systems compared to a standard optical system, the 2 bits of information being input either from one channel or from two parallel channels.

77. The system of claim 75, wherein additional bit information is included by coding information into an amplitude of each pulse by generating pulses of distinctly different levels of amplitude, thereby increasing a capacity of said system by a factor of k which is larger than 2, said system having an identical error performance for about double distance between two optical systems compared to a standard optical system.

78. The system of claim 77, wherein k is 3, and a capacity of said optical system is tripled, said optical system having an identical error performance for about double distance between two optical systems compared to a standard optical system.

79. The system of claim 60, wherein said system is a modem system in which k bits are converted into k pulses with duration $k\ T_b$.

80. The system of claim 79 having a capacity which is at least doubled compared to a corresponding standard modem system.

81. The system of claim 79, which uses two carrier signals and has a gain of at least 5 db compared to a standard modem system.

* * * * *